US012580749B2

(12) United States Patent
Nix

(10) Patent No.: US 12,580,749 B2
(45) Date of Patent: *Mar. 17, 2026

(54) CONFIGURATION SYSTEMS AND METHODS FOR SECURE OPERATION OF NETWORKED TRANSDUCERS

(71) Applicant: Network-1 Technologies, Inc., New Canaan, CT (US)

(72) Inventor: John A. Nix, Evanston, IL (US)

(73) Assignee: Network-1 Technologies, Inc., New Canaan, CT (US)

( * ) Notice: Subject to any disclaimer, the term of this patent is extended or adjusted under 35 U.S.C. 154(b) by 240 days.

This patent is subject to a terminal disclaimer.

(21) Appl. No.: 18/111,307

(22) Filed: Feb. 17, 2023

(65) Prior Publication Data

US 2023/0208626 A1 Jun. 29, 2023

Related U.S. Application Data

(63) Continuation of application No. 16/980,987, filed as application No. PCT/US2019/022184 on Mar. 14, 2019, now Pat. No. 11,621,832.

(Continued)

(51) Int. Cl.
*H04L 9/08* (2006.01)
*G06F 13/20* (2006.01)
(Continued)

(52) U.S. Cl.
CPC ............ *H04L 9/0841* (2013.01); *G06F 13/20* (2013.01); *H04L 9/0861* (2013.01);
(Continued)

(58) Field of Classification Search
CPC .............. H04L 9/0841; H04L 63/0823; H04L 63/0435; H04L 63/061; H04L 67/125;
(Continued)

(56) References Cited

U.S. PATENT DOCUMENTS 10,204,233 B2    2/2019  Nix
2002/0024419 A1 *  2/2002  Dunn ..................... G06V 40/13
                                                              340/5.82

(Continued)

OTHER PUBLICATIONS

International Search Report and Written Opinion for application No. PCT/US19/22184, mailed May 27, 2019.

*Primary Examiner* — Farid Homayounmehr
*Assistant Examiner* — Brian William Avery
(74) *Attorney, Agent, or Firm* — Amster, Rothstein & Ebenstein LLP

(57) ABSTRACT

A device can include an internal secure processing environment (SE) and communicate with a configuration system. The device may utilize a near field communications (NFC) radio. A mobile handset can connect with the SE in the device using NFC. The mobile handset can communicate with the configuration system and receive configuration data and a software package for the device. The SE can derive a PKI key pair and send the derived public key to the configuration system via the mobile handset. The SE and the configuration system can mutually derive an encryption key using the derived PKI key pair. The configuration data can be transmitted over the NFC radio, and the mobile handset can establish a Wi-Fi access point. The software package can be encrypted using the encryption key and transmitted to the device over the established Wi-Fi access point, thereby completing a configuration step for the device.

20 Claims, 11 Drawing Sheets

Related U.S. Application Data

(60) Provisional application No. 62/644,195, filed on Mar. 16, 2018.

(51) Int. Cl.

| | |
|---|---|
| *G16Y 30/10* | (2020.01) |
| *H04L 9/30* | (2006.01) |
| *H04L 9/32* | (2006.01) |
| *H04L 9/40* | (2022.01) |
| *H04W 12/03* | (2021.01) |
| *H04W 12/06* | (2021.01) |

(52) U.S. Cl.
CPC .......... *H04L 9/3013* (2013.01); *H04L 9/3247* (2013.01); *H04L 9/3263* (2013.01); *H04L 63/0435* (2013.01); *H04W 12/03* (2021.01); *H04W 12/06* (2013.01); *G16Y 30/10* (2020.01)

(58) Field of Classification Search
CPC ..... H04L 67/34; H04L 9/0861; H04L 9/3013; H04L 9/3247; H04L 9/3263; G06F 13/20; H04W 12/03; H04W 12/0471; H04W 12/06; G16Y 30/10
See application file for complete search history.

(56) References Cited

U.S. PATENT DOCUMENTS

| | | | | |
|---|---|---|---|---|
| 2006/0239459 | A1 * | 10/2006 | Yamamichi | H04L 9/3093 |
| | | | | 380/255 |
| 2012/0222101 | A1 * | 8/2012 | Iwasaki | G06F 21/31 |
| | | | | 726/7 |
| 2013/0139198 | A1 * | 5/2013 | Okimoto | H04N 21/4623 |
| | | | | 725/31 |
| 2016/0234020 | A1 * | 8/2016 | Nix | H04L 9/321 |
| 2017/0013022 | A1 * | 1/2017 | Buckley | H04L 9/3297 |
| 2017/0063810 | A1 * | 3/2017 | Bruce | H04L 63/126 |
| 2017/0339120 | A1 | 11/2017 | Zakaria et al. | |
| 2017/0373845 | A1 | 12/2017 | Nix | |
| 2018/0144147 | A1 | 5/2018 | Nix | |

* cited by examiner

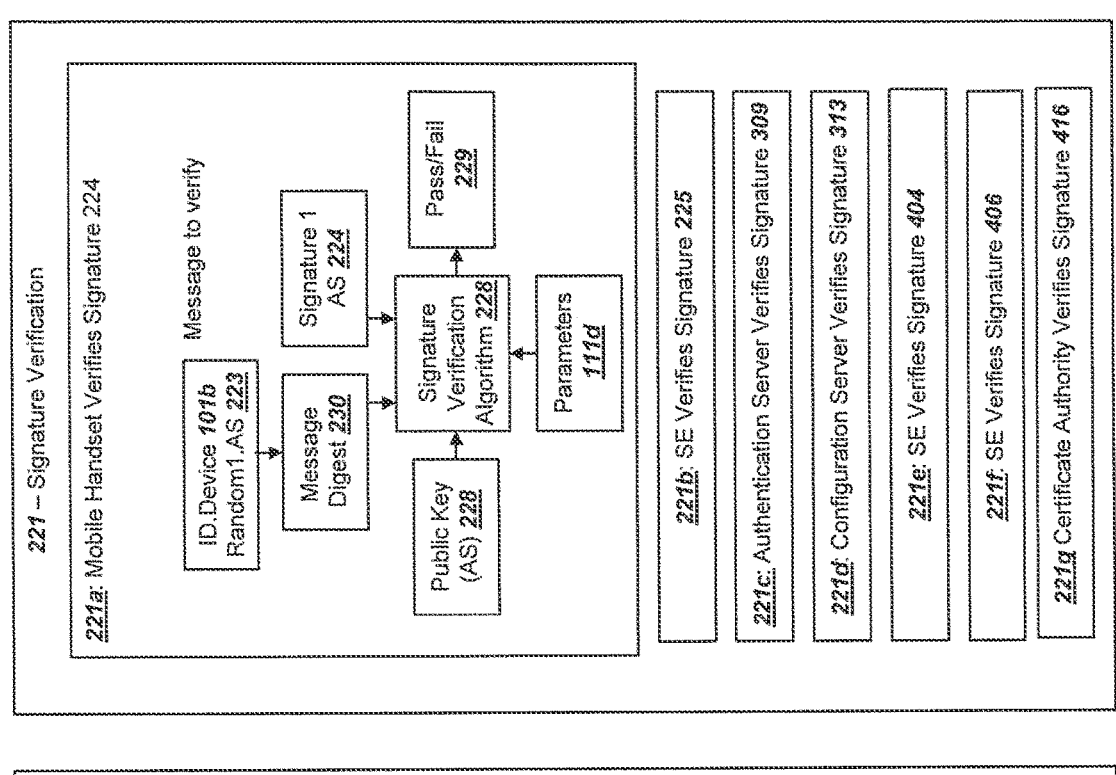

220 – Signature Creation

220a: Authentication Server Creates Signature 224

Message to sign

ID.Device 101b Random1.AS 223

Message Digest 230

Signature Algorithm 227

Parameters 111d

Signature 1 AS 224

Private Key (AS) 226

220b: Authentication Server Creates Signature 225

220c: SE Creates Signature 309

220d: Authentication Server Creates Signature 313

220e: Configuration Server Creates Signature 404

220f: Configuration Server Creates Signature 406

220g: SE Creates Signature 416

221 – Signature Verification

221a: Mobile Handset Verifies Signature 224

Message to verify

ID.Device 101b Random1.AS 223

Message Digest 230

Signature 1 AS 224

Signature Verification Algorithm 228

Parameters 111d

Pass/Fail 229

Public Key (AS) 228

221b: SE Verifies Signature 225

221c: Authentication Server Verifies Signature 309

221d: Configuration Server Verifies Signature 313

221e: SE Verifies Signature 404

221f: SE Verifies Signature 406

221g: Certificate Authority Verifies Signature 416

Figure 4d

SE Certificate cert1.SE *419* (with PK1.SE and Signed by CA1 115)

256 bit Elliptic Curve Key with SHA 256 Signature ( "..." is long text removed)

```
Version: 3 (0x2)
        Serial Number: 20486 (0x5006)                                    114
407 ──────>  Signature Algorithm: ecdsa-with-SHA256
        Issuer: C=US, ST=Illinois, L=Chicago, O=Configuration System 114, <─────
115 ──────>OU=CA 115, CN=Certificate Authority 115 for Configuration System 114
        /emailAddress=ca-115@configuration-system-114.org
        Validity
        Not Before: Aug 31 21:15:16 2017 GMT
407' ──────>  Not After : Aug 30 21:15:16 2022 GMT
        Subject: C=US, ST=Illinois, L=Chicago, O=Device Manufacturer 101x,
            O=JNIX, OU=Secure Processing Environment Type-Model,
102m ──────>    CN=SE ID 102m (Plus Optional Certificate Sequence Number)
        Subject Public Key Info:
            Public Key Algorithm: id-ecDH
            Public Key: (256 bit)   <─────  407'
                00:c6:f2:1f:b0:ec:78:ed:d5:5a:f9:c2:2b:03:54
410a   {
                ...
                39:05:82:41:6a:43:95:99:da:19:2e
407' ──────>  ASN1 OID: secp256r1
        NIST CURVE: P-256
        X509v3 extensions:
            X509v3 Subject Key Identifier:
                F9:03:6E:48:99:CE:04:AB:1C:6B:18:B1:CA:B2:3B:6A:19:4B:81:8D
            X509v3 Authority Key Identifier:
                keyid:46:AC:7F:83:C9:27: ... :A0:B8:E5:B3:1A:3A:48
                DirName:/C=US/ST=Illinois/L=Chicago/O=Configuration System 114
                    /OU=CA 115/CN=Certificate Authority 115 for Configuration System 114
                    /emailAddress=ca-115@configuration-system-114.org
                serial:02
            X509v3 Key Usage:
                Digital Signature, Non Repudiation, Key Encipherment, Data Encipherment
            X509v3 CRL Distribution Points:
                URI:http://www.ca-115-for-configuration-system-114.org/ca/crl/ref_ca.crl
        Signature Algorithm: ecdsa-with-SHA256
            26:35:bb:aa:ff:29:7d:ee:3d:8d:e4:a3:b5:14:94:4d:13:ee:
220   {
                ...
            c8:ba:f2:38:18:7d:81:0a:66:1e:8c:19:2a:cc:e5:ae:9c:32:
            32:c3:5e:4d
        -----BEGIN CERTIFICATE-----
        MIIGMzCCBRugAwIBAgICUAYwDQYJKoZIhvcNEFBQAwgaoxCzAJBgNVBAYTAIVT
            ...
        5Ww3GBO1SxbgDihKnSGUAMXWY1IaLXJSiKEGZSBmBByLryOBh9gQpmHowZKszl
        rpwyMsNeTQ==
        -----END CERTIFICATE-----
```

CONFIGURATION SYSTEMS AND METHODS FOR SECURE OPERATION OF NETWORKED TRANSDUCERS

CROSS-REFERENCE TO RELATED APPLICATIONS

This U.S. Non-Provisional Applications is a continuation of U.S. National Stage application Ser. No. 16/980,987, filed on Sep. 15, 2020, that claims the benefit of the filing date of International PCT Application No. PCT/US19/22184, filed on Mar. 14, 2019, that in turn claims the benefit of the filing date of U.S. Provisional Patent Application Ser. No. 62/644, 195, filed Mar. 16, 2018, that are all hereby incorporated by reference in their entirety.

BACKGROUND

Technical Field

The present systems and methods relate to configuration and operation of networked transducers, and more particularly, to systems and methods for securely configuring a secure processing environment within a transducer device, where the transducer device can communicate with a configuration system, a reporting system, and a mobile handset in order to complete configuration.

Description of Related Art

The ability to connect transducers such as sensors and actuators with a network is a growing field with many economical applications. As the costs for both electronic hardware and bandwidth continues to decrease, the use of networked transducers is expected to continue increasing over the coming decades. Connecting transducers to a network can be referred to as "machine-to-machine (M2M) communications" or "the Internet of Things (IoT)." Among many potential benefits, IoT technologies allow automated monitoring and/or control of assets, equipment, personnel, or a physical location where manual monitoring may not be economical. Many applications for the "Internet of Things" significantly reduce costs by using automated monitoring instead of manual techniques. Prominent examples of IoT applications today include monitoring and control for building heating/air-conditioning, automobiles, alarm systems, and tracking devices. Fast growing markets for IoT applications today include health applications such as the remote monitoring of a person's fitness activity, heartbeat, or glucose levels, monitoring of industrial equipment deployed remotely in the field, and also security systems.

IoT communications can provide remote control over actuators that may be connected to a device, such as turning on or off a power switch, locking or unlocking a door, adjusting a speed of a motor, or similar remote control. A decision to change or adjust an actuator associated with a connected device can utilize one or a series of sensor measurements. As one example, an IoT device for a truck can periodically report engine status to a remote server, and if the engine is operating outside specifications such as being too hot, including potentially an "alarm" condition, then temperature and an alarm code can be reported to a central server for the IoT device. The server can subsequently instruct the driver and/or a specified mechanic to investigate the engine for potential mechanical malfunctions or other causes. The previous example is just one of many possible applications for IoT technology.

Many IoT applications can leverage wireless networking technologies, in addition to wired technologies such as Ethernet. Wireless technologies such as wireless local area networks and wireless wide area networks have proliferated around the world over the past 20 years, and usage of these wireless networks is also expected to continue to grow. Wireless local area network (LAN) technologies include Wi-Fi and wireless wide area network (WAN) technologies include 3rd Generation Partnership Project's (3GPP) 3rd Generation (3G) Universal Mobile Telecommunications System (UNITS) and 4th Generation (4G) Long-term Evolution (LTE), LTE Advanced, and Narrow-band Internet of Things (NB-IoT). The many options to connect a transducer device to a network creates opportunities for new products and services, but also creates several classes of problems that need to be solved. Many of these problems or needs in the art pertain to enabling users to securely and efficiently configure the transducer devices. A need exists in the art to allow a user to securely upload to the device a set of network access credentials for the wireless network.

A need exists in the art to support the configuration of transducer devices for installation and operation, including deployment in the field or with monitored units by a user or a technician. A manufactured transducer device can include (i) a secure processing environment which could record a "root of trust" or secret key for the device as well as certificates and cryptographic parameters, and (ii) installed firmware and software. The secure processing environment is often by design isolated in order to enhance security, but device users may need to update the secret key, certificates, and cryptographic parameters. The isolation creates problems for users or device owners to readily access and update the secure processing environment and software for the device. A need exists in the art to allow users or device owners to efficiently change or update for a device both (i) the secret key, certificates, and cryptographic parameters, and (ii) installed firmware and software. A need exists in the art for the users to also efficiently load or transfer network access credentials for a wireless network, in order for the device to obtain network connectivity. A need exists in the art for a configuration system and/or a reporting system to securely record values and identities pertaining to operation of the device, such as a list of transducers attached, the identity of a monitored unit for the device, as well as the physical location of the device.

Devices with an ARM™-based processor may include a secure processing environment for security operations such as recording keys and certificates. Other processor manufacturers have related security architectures, such as a secure enclave from Apple™ or Intel™. These exemplary processors can be included in a wide variety of devices for machine-to-machine communications, or also applications of "The Internet of Things". Manufacturers of networked devices with transducers may also sell products with secure elements to increase the secure operation of devices, networks, and servers, where secure operation can comprise confident authentication of users and device, authorization, data confidentiality, and data integrity. Manufacturers of devices may provision a default set of cryptographic values for secure processing environments, secure enclaves, and secure elements, but a need exists in the art to allow device users to update the cryptographic values in order to support the user's application or environment. In addition, the device and cryptographic values such as keys may have physically been in the hands, possession, or control of third parties before delivery of the device to the user, with the result that the cryptographic values such as keys were also in the hands, possession, or control of the third parties and thus security for a device user could be reduced. A need exists in the art to support a user updating cryptographic values for a secure environment after receipt of the device from a third party.

With conventional technology for configuration and installation of networked devices, a frequent challenge can be that that public key infrastructure (PKI) keys and parameters for default or manufactured configuration of a device may not match the requirements for a configuration system or a reporting system. In other words, the "root of trust" installed by manufacturers of devices and secure enclaves within those devices may not have certificates and cryptographic parameters that are not compatible with an operating environment in which the device will be deployed (e.g. use of different elliptic curve names, different algorithms supported such as ECC vs. RSA, requirement for more bits of security in the device secret key than that manufactured, etc.) A need exists in the art such that device private keys, cryptographic algorithms, and cryptographic parameters for a user's application can be securely updated after device manufacturing. A need exists in the art to support the update through a highly automated configuration step.

In addition, devices designed for machine-to-machine communications, or the "Internet of Things", can frequently be shipped to an end user in a state that is not fully configured for the user. The lack of a full configuration could include incomplete information for any of the following: (i) current, running firmware or configuration files for the device, (ii) network access credentials, (iii) credentials for access to remote servers, and (iv) proper configuration to support transducers that are actually connected with a device. As one example, hospitals, health clinics, or doctor's offices can receive health monitoring equipment designed to be networked, but without both (i) the networking configured for the equipment, and (ii) updated or patched firmware for the equipment. A need exists in the art to allow general users (e.g. not requiring expert IT skills) to securely configure equipment designed to be networked, including securely updating the device's firmware and credentials for both accessing a network and remote servers.

Many other examples exist as well for needs in the art to support efficient yet secure device configuration by users, and the above are examples are just a few and intended to be illustrative instead of limiting.

SUMMARY

Methods and systems are provided for configuration of networked transducers in order to support secure operation of the networked transducers. The methods and systems can support secure operation of devices for "The Internet of Things (IoT)" which is also known as "Machine to Machine (M2M)" communications. An objective of the invention is to address the challenges noted above for securing the deployment and operation of devices that have radios and transducers, where the devices connect to servers using networks based on Internet protocols.

A device can have a transducer for monitoring a monitored unit, and the device can connect with an access network in order to communicate data for the transducer with a server. The connection with the access network can be via wireless and a radio, or could be through a wired connection such as Ethernet. The device, transducer, and monitored unit can have identifiers such as bar codes, QR codes, MAC addresses, serial numbers, or other identifiers. The device can be produced by a device manufacturer and include a secure processing environment. The secure processing environment can contain a processor and nonvolatile memory, where the manufacturer records a certificate for the device with a PKI public key, cryptographic parameters associated with the certificate, and a private key. The secure processing environment can also include a set of cryptographic algorithms in order to process cryptographic operations such as a key exchange algorithm, a symmetric ciphering algorithm, and also a digital signature algorithm. The secure processing environment can also record a series of certificate authority certificates, such as a certificate authority certificate for the certificate of the device and a root certificate for the certificate authority, plus any intermediate certificates between the certificate authority certificate and the root certificate.

A device owner or device user may prefer the device transition from a manufactured state or delivered state to an operational state, where the transition for the device can comprise a configuration step. Or, after initial operation of the device, a device owner or device user may prefer the device transition from a first configured state to a second configured state, and the transition could also comprise a configuration step. In general, the security of a configuration step can be important because the overall configuration of a system can depend on the security of a configuration step. The configuration step can preferably be completed in a relatively automated manner using secure steps and hardware that is both (i) available for low cost and also (ii) readily easy to obtain or source. A mobile handset such as a smartphone could be used to connect a device in the manufactured state to an IP network, such that the device in the manufactured state could securely communicate with a reporting system after conduction a configuration step with a configuration system.

The configuration step with the configuration system can comprise a first collection of steps for the mobile handset to work in conjunction with the configuration system to prepare for authentication of the device and then configuration with the device. The first collection of steps may be depicted in FIG. 2a below. A mobile handset can be operated by a configuration user, which could also be the device user. The first collection of steps can comprise the mobile handset (i) reading a tag or code for the device, where the tag includes a URL and an identity for the device, (ii) sending the tag to a discovery server and (iii) receiving a response from the discovery server with configuration data for provisioning the device with service, credentials, and software. The configuration data can include a URL for an authentication server and the name or location of configuration software (or "configuration app" for the mobile handset operating system). The mobile handset can use the configuration software in order to establish communication between the device and a configuration system. The mobile handset can download the configuration app if not already installed on the mobile handset. The configuration data can also include a certificate for the authentication server and authentication parameters. The mobile handset can conduct a first authentication with the authentication server, where the first authentication comprises the configuration user authenticating with the authentication server. The mobile handset can send device identity information to the authentication server and the authentication server can receive a certificate for the device. The authentication server can send a random number and a signature for the random number to the mobile handset.

The configuration step with the configuration system can also comprise a second collection of steps for the device to communicate with the mobile handset and the mobile handset to communicate with the configuration system. The second collection of steps may be depicted in FIG. 3 below. The mobile handset and device can establish a NFC peer-to-peer session using the NFC radios in each, and the NFC radio for the device can be dedicated to the secure processing environment for the device. Benefits from using an NFC session include the radio cost can be low and security is higher due to the close physical proximity for the device and mobile handset. The mobile handset can forward the random number and the signature for the random number to the device over the NFC session, as well as a certificate for the authentication server. The device can verify the signature and the certificate. The device can issue sign the random number received and also generate a second random number.

Continuing with the second collection of steps in a configuration step, the device can send (i) the signature for the random number from the authentication server and (ii) the second random number to the mobile handset, which can forward to the authentication server. The authentication server can sign the second random number, and verify the signature received from the device. The device can verify the signature for the second random number from the authentication server. In this manner, both the authentication server and the device can be mutually authenticated. The authentication server can send the second random number received from the device to a configuration server. The mobile handset can collect a list of identities, which can include an RF sweep analysis to measure all available wireless networks as the location of the device in the form of a networks available list. The mobile handset can send a list of identities to the configuration system pertaining to the device, transducers, and monitored unit, and the configuration system can record the list of identities in a configuration database.

The configuration step with the configuration system can also comprise a third collection of steps for data transferred between the device and the configuration server. The third collection of steps may be depicted in FIG. 4a below. A configuration server in the configuration system can also sign the second random number in order to authenticate the configuration server. The configuration server can generate an ephemeral PKI key pair and sign the ephemeral public key, and the data can be sent to the mobile handset in order to forward to the device. The device can verify the signature using a public key in a certificate for the configuration server. The configuration server and the device can use the device PKI key pair plus the ephemeral PKI key pair from the configuration server in a key exchange algorithm in order to mutually derive a symmetric encryption key. The device can generate a new PKI key pair and send a first ciphertext to the configuration server, where the first ciphertext includes encrypted plaintext of initial configuration information for the device plus the newly derived public key. The device can encrypt the first ciphertext using the derived symmetric encryption key and the configuration server can decrypt the first ciphertext using the derived symmetric encryption key. The configuration server can have a certificate authority sign the newly derived public key for the device. The configuration server can use the identities list to collect a software package for the device. The configuration server can send the new certificate for the device, plus configuration files and network access credentials to the mobile handset in the form of a second ciphertext, and the mobile handset can forward the second ciphertext to the device. The configuration server can send a set of Wi-Fi access point credentials, in an encrypted format, to both the mobile handset and the device via the mobile handset.

The configuration step with the configuration system can also comprise a fourth collection of steps for data transferred between the device and the configuration server. The fourth collection of steps may be depicted in FIG. 5 below. The device can receive the new certificate for the device as well as the configuration files from the configuration server via the mobile handset. The device can apply the configuration files and begin using the new certificate and associated derived private key in subsequent cryptographic operations. After receipt of the Wi-Fi access point credentials, the mobile handset can activate a Wi-Fi access point using the credentials, and the Wi-Fi access point may be operated at low power due to the proximity of the device. The device can activate a Wi-Fi client also using the credentials for the Wi-Fi access point received from the configuration server. The configuration server can conduct a key exchange using the new, second, derived public key for the device and the ephemeral private key in order to derive a second symmetric encryption key. The device can conduct the corresponding key exchange in order to derive the second symmetric encryption key. The configuration server can encrypt the software package using the second symmetric encryption key and transfer to the device via the mobile handset. The device can decrypt the software package and apply the files and reboot, using both the configuration files and software package. The device can connect with the access network using the received network access credentials, and conduct a key exchange with a reporting system. The device can subsequently transfer encrypted transducer data and a report regarding configuration to the reporting system, thereby completing the configuration step for the device. The mobile handset can check with the reporting system that transducer data has been successfully transmitted between the reporting system and the device, and display to the end user that the configuration step is successful and completed.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1b is a graphical illustration of hardware, firmware, and software components for a device, including a secure processing environment, in accordance with exemplary embodiments;

FIG. 2b is a flow chart illustrating exemplary steps for creating and verifying a digital signature using PKI keys, parameters, and data input, in accordance with exemplary embodiments;

FIG. 4*d* is an illustration of a certificate for a device public key, where the device derived the public key and a corresponding private key, in accordance with exemplary embodiments;

DETAILED DESCRIPTION

FIG. 1*a*

Figure 1A:
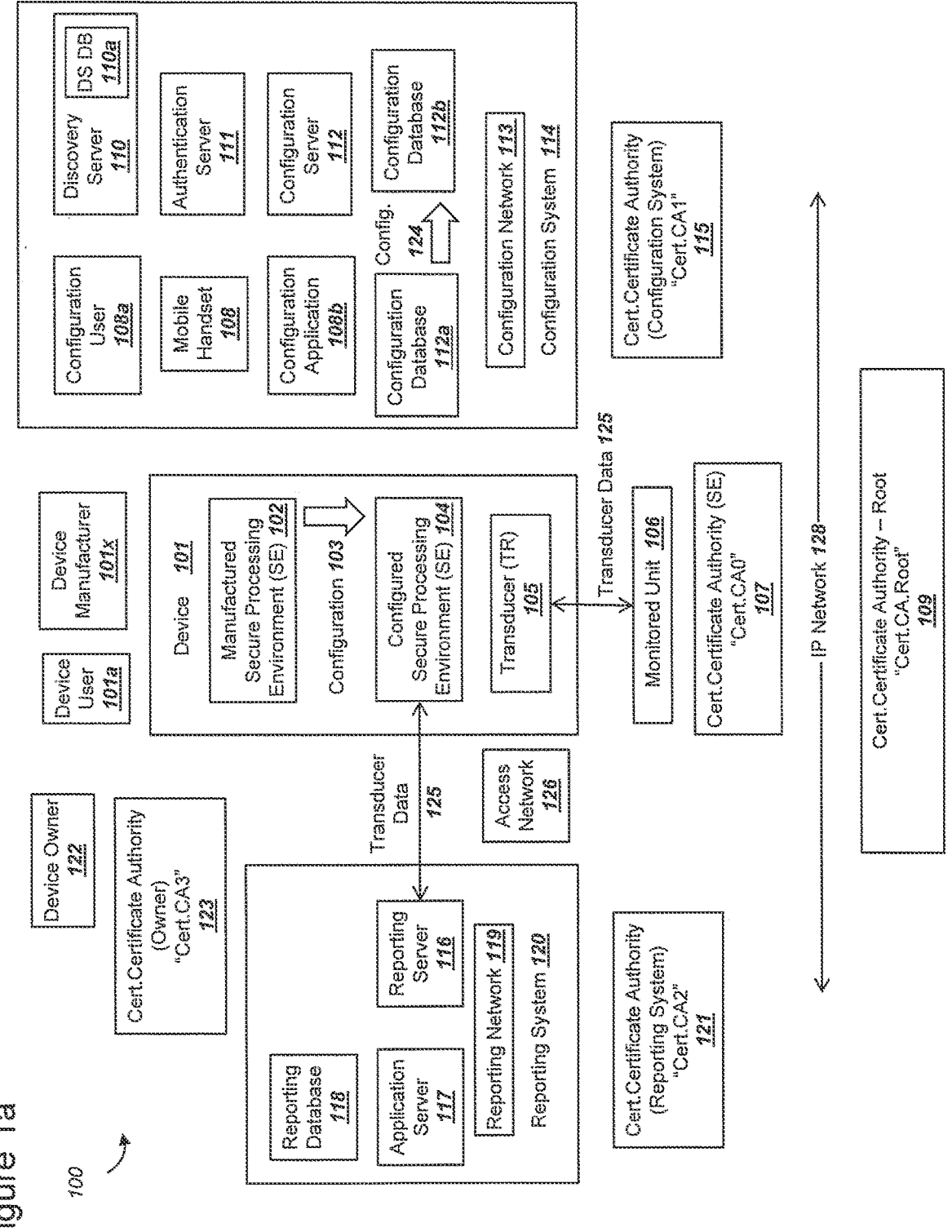
FIG. 1a is a graphical illustration of an exemplary system, where a device with a transducer communicates with a configuration system and a reporting system, in order to conduct a configuration step, in accordance with exemplary embodiments.

FIG. 1*a* is a graphical illustration of an exemplary system, where a device with a transducer communicates with a configuration system and a reporting system, in order to conduct a configuration step, in accordance with exemplary embodiments. The system 100 can include a device 101, a configuration system 114, and a reporting system 120. Device 101 can communicate with the configuration system 114 and reporting system 120 via Internet Protocol (IP) network 128. IP network 128 could be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 128 could utilize globally routable IP addresses, and a private IP network 128 could utilize private IP addresses which could also be referred to as an Intranet. Other possibilities for IP Network 128 exist as well without departing from the scope of the invention. Device 101 could utilize an access network 126 in order to communicate with the reporting system 120 using the IP network 128. After a configuration step 103 described in the present invention and in multiple figures below, device 101 can communicate transducer data 125 with reporting system 120 through access network 126. Note that the security of transducer data 125 for device owner 122, device user 101*a*, and reporting system 120 during operation of device 101 may generally depend on the security of a configuration step 103.

Access network 126 could be either a Local Area Network (LAN) or a Wide Area Network (WAN), or potentially a combination of both. Device 101 and access network 126 can utilize a variety of wireless technologies to communicate, including IEEE 802.11 (Wi-Fi), Low Power Wide Area (LPWA) technology, 3rd Generation Partnership Project (3GPP) technology such as, but not limited to, 3G, 4G Long-Term Evolution (LTE), or 4G LTE Advanced, NarrowBand—Internet of Things (NB-IoT), LTE Cat M, proposed 5G networks, and other examples exist as well. A wired device 101 can connect to the access network 126 via a wired connection such as, but not limited to, an Ethernet, a fiber optic, or a Universal Serial Bus (USB) connection (not shown). Device 101 could be powered via any of (i) traditional "wall power" potentially with an AD/DC adapter, (ii) a battery which may be periodically recharged, (iii) power over a wired LAN connection such as "power over Ethernet", and other possibilities exist as well.

Device 101 can include manufactured secure processing environment (SE) 102. The manufactured secure processing environment 102 can also be referred to as a secure enclave or secure element, which will also be designated herein as "SE 102". Examples of SE 102 as of 2018 can include the secure processing environment in FIG. 3 of the ARM® document "Platform Security Architecture Overview" (v. 1.1) which is incorporated by reference. Other examples for a secure processing environment exist as well, including a "Trusted Execution Environment" according to the standards promoted by Global Platform. SE 102 can comprise functionality of a processor such as an ARM or Intel® based processor to secure cryptographic key materials including private keys in public key infrastructure (PKI) key pairs, secret shared keys, cryptographic parameters, cryptographic algorithms, a certificate 107 for the secure processing environment certificate authority, a root certificate 109, etc. In other words, although root certificate 109 is depicted as external to SE 102 in FIG. 1*a*, in exemplary embodiments a copy of this root certificate 109 is stored within nonvolatile memory of manufactured SE 102 and configured SE 104. Additional details for components within a SE 102 are provided below in FIG. 1*b*. As depicted in FIG. 1*a*, the configuration step 103 can covert the manufactured SE 102 into a configured SE 104. In addition, although not depicted in FIG. 1*a*, a configuration step 103 can also be applied at a subsequent time on a previously configured SE 104. In other words, a configuration step 103 may take place multiple times over the life of device 101, such as either (i) when device owner 122 changes or (ii) a certificate for device 101 (e.g. certificate cert0.SE 102*k* depicted below in FIG. 1*b*) expires. An exemplary embodiment for a first configuration 103 of a device 101 is depicted in FIG. 1*a*.

Device 101 can also include a transducer 105, and may also be referred to herein as a "transducer device 101". Transducer 105 can be a sensor or an actuator and may be either passive or active. Transducer 105 could be internal within the physical housing of device 101, such as (i) a digital image sensor inside a camera. Transducer 105 could be external to the physical housing of device 101, such as a thermocouple or probe extending from device 101 to a monitored unit 106. Additional details for transducer 105 are also provided in FIG. 1*b* below. Although device 101 is depicted in FIG. 1*a* with a single transducer 105, device 101 could include multiple transducers 105. In addition, although a single device is depicted in FIG. 1*a*, a system 100 can include a plurality of devices 101.

Examples of a monitored unit 106 can include an ATM or vending machine, a truck or automobile, a refrigerated or standard ("dry") shipping container, or industrial equipment such as, but not limited to, an oil field pump, a transformer connected to an electrical grid or a escalator in a building. Additional examples of a monitored unit 106 include can also include a pallet for shipping or receiving goods, a refrigerator with food, a health monitoring device attached to a person such as, but not limited to, a heart monitor, and a gate or door for opening and closing. Device 101 can utilize a sensor to measure and collect data regarding a parameter of monitored unit 106 such as, but not limited to, temperature, humidity, physical location potentially including geographical coordinates from a Global Positioning System (GPS) receiver, surrounding light levels, surrounding RF signals, vibration and/or shock, voltage, current, and/or similar measurements.

Monitored unit 106 could also be controlled by device 101 via a transducer 105 that is an actuator, where device 101 can change the actuator in order to change a state for monitored unit 106. For example, if monitored unit 106 is a door, then a transducer 105 could include a relay to activate a lock for the door. If monitored unit 106 is a lighting system in a building, then transducer 105 could comprise a switch to turn the lighting level up or down. Other examples exist for monitored unit 106 as well, and the above are intended to be illustrative instead of limiting. In the case where transducer 105 is either an actuator or a sensor, (X) device 101 could connect transducer 105 to the reporting system 120, and (Y) reporting system 120 can both (i) receive transducer data 125 input from sensors with monitored unit 106 and (ii) transmit transducer data 125 output to actuators in order to control monitored unit 106. Thus, in operation and after the configuration step 103, reporting system 120 can remotely monitor and control monitored unit 106 using device 101 and transducer 105.

As depicted in FIG. 1a, device 101 can include a device user 101a, a device manufacturer 101x, and a device owner 122. Device user 101a could be a person, group of people, or business entity associated with the operation of device 101. If device 101 monitors a building, then device user 101a could be a building engineer or building manager. If device 101 monitors a home, then device user 101a could be a home owner. Device manufacturer 101x can be the manufacturer or supplier of device 101 to device user 101a. Device manufacturer 101x could purchase the manufactured secure element 102 and integrate it into a housing plus other components in order to produce device 101. In exemplary embodiments, device owner 122 is the owner of device 101. Device owner 122 may be the same as device user 101a in some embodiments, but device owner 122 also may be different than device user 101a in other embodiments. For exemplary health care applications in a hospital where device 101 is a medical device to monitor patient health, device owner 122 could be the hospital and device user could be a nurse, doctor, or medical technician. Device owner 122 may have a certificate 123 from a certificate authority associated with the device owner 122.

Each of the different entities depicted for system 100 of device owner, device user, and device manufacturer may control or operate device 101 and SE 102 at different times for the life cycle of device 101. In addition, a device owner or device user may change during the life of device 101 after manufacture and some initial configuration step that could be different than a configuration step 103. This change in control and operation over time, plus potential prior operation in an insecure manner, can create challenges for ensuring secure operation of device 101. A prior party in control of device 101 may not have supported the security procedures or requirements for device owner 122. For example, device owner 122 may require that device 101 is configured after delivery from device manufacturer 101x or possibly after delivery from a previous device owner 122. A configuration step 103 with configuration system 114 can ensure that device 101 is configured to the standards or requirements of device owner 122, without depending on previous security procedures or steps of device manufacturer 101x or device user 101a.

In order to conduct a configuration step 103, system 100 can utilize a configuration system 114. As depicted in FIG. 1a, configuration system 114 can include a configuration user 108a, a mobile handset 108, a configuration application 108b, a discovery server 110, an authentication server 111, a configuration server 112, a first configuration database 112a, and a second configuration database 112b. Discovery server 110 can include a discovery server database 110a. A configuration step 124 can convert the first configuration database 112a into the second configuration database 112b, where the second configuration database 112b can record data pertaining to a device 101 and reporting system 120 after a configuration step 103. The configuration step 124 can comprise the server/network-side equivalent step of configuration step 103 depicted for device 103. The elements within a configuration system 114 can be connected via a configuration network 113. Configuration network 113 could be similar to IP network 128 described above. Configuration system 114 can utilize a certificate 115 for a certificate authority associated with configuration system 114. The certificate authority associated with configuration system 114 may or may not be the same as the certificate authority associated with SE 102, or owner 122, or reporting system 120. Although a certificate authority is not depicted for certificate 115 in FIG. 1a, each of the certificates 107, 115, 121, and 123 preferably have a "parent" certificate authority or signed public key associated with the certificates. Certificates 107, 115, 121, and 123 can be formatted similar to SE certificate 419 depicted in FIG. 4d below, with different values appropriate for each certificate depicted in FIG. 1a. Root certificate 109 may also be similar to SE certificate 419, except the signature in a root certificate 109 may be self-signed by the public key in root certificated 109.

A configuration system 114 can use a mobile handset 108 operated by a configuration user 108a. Details and components for a mobile handset 108 are depicted and described below in connection with FIG. 2a. In some exemplary embodiments, a mobile handset 108 can comprise a smart phone, such as based on the Android or IOS operating systems. In other embodiments, instead of using a "mobile handset 108", a configuration user 108a can operate a "configuration unit 108", or simply "unit 108", which can provide the same or equivalent functionality as a "mobile handset 108" as depicted herein. In these other exemplary embodiments, a unit 108 could comprise a portable device, such as laptop, tablet, wearable device such as a smart watch, a USB stick, etc. For embodiments where device 101 is configured in a manufacturing facility or potentially a location away from monitored unit 106, including the location where SE 102 is inserted into device 101, then the element or node depicted as "mobile handset 108" in the present invention could comprise the unit 108 where the unit 108 could operate normally in a fixed location instead of being mobile. For example, unit 108 could be a configuration server to conduct a configuration step 103 for a plurality of devices 101 in sequence. Other possibilities exist as well for a unit 108 that is not a mobile handset to provide the functionality of a "mobile handset 108" herein and below, without departing from the scope of the present invention.

The servers shown for configuration system 114 can be co-located within the same data center or geographically dispersed. A configuration system 114 can also include a plurality of the elements depicted in FIG. 1b. Further, some elements of a configuration system 114 could be combined, such (i) as the discovery server 110 could be combined with the authentication server 111 or configuration server 112, or (ii) the configuration server 112 could be combined with the authentication server 111. Other possibilities exist for the arrangement of elements within a configuration system 114 without departing from the scope of the invention. For an alternative exemplary embodiment to that depicted in FIG. 1*a*, discovery server 110 could be operated external to configuration system 114, such as discovery server being associated with device manufacturer 101*x*, device owner 122, or reporting system 120. Additional details regarding the components and operation of a configuration system 114 will be described below. In some exemplary embodiments, reporting system 120 and configuration system 114 can be combined.

A reporting system 120 in system 100 can include a reporting server 116, an application server 117, and a reporting database 118. Although not depicted in FIG. 1*a*, a reporting system 120 and a configuration system 114 can include a firewall to filter packets received through an IP network 128. The elements within a reporting system 120 can be connected via reporting network 119, which could comprise a network similar to IP network 128. Similar to configuration system 114, the servers for reporting system 120 can be co-located within the same data center or geographically dispersed. The servers and databases shown for both reporting system 120 and configuration system 114 can be either different physical computers such as rack-mounted servers, or different logical or virtual servers or instances operating in a "cloud" configuration. The elements within reporting system 120 can operate in conjunction to collect data from a plurality of devices 101 through access network 126 and present data or reports to device owner 122, device user 101*a*, or potentially another user or manager of system 100. Reporting system 120 could also take input from device owner 122 or device user 101*a* to send control transducer data 125 to device 101 in order to operate a transducer 105 in order to control monitored unit 106. Reporting system 120 could also send control transducer data 125 to device 101 without requiring user input, such as for automated control. Reporting system 120, or elements in reporting system 120, can have a certificate 121 signed by a certificate authority associated with reporting system 120. Certificate 121 may be associated or verified using root certificate 107, although in some exemplary embodiments the root certificate for certificate 121 may be different than root certificate 107. The various servers depicted in FIG. 1*a* could comprise multiple individual physical servers or multiple virtual servers operating in a coordinated manner to provide the functionality shown. In other words, although a single reporting server 116 is depicted in FIG. 1*a*, a reporting server 116 could comprise multiple different physical or virtual servers.

FIG. 1*b*

Figure 1B:
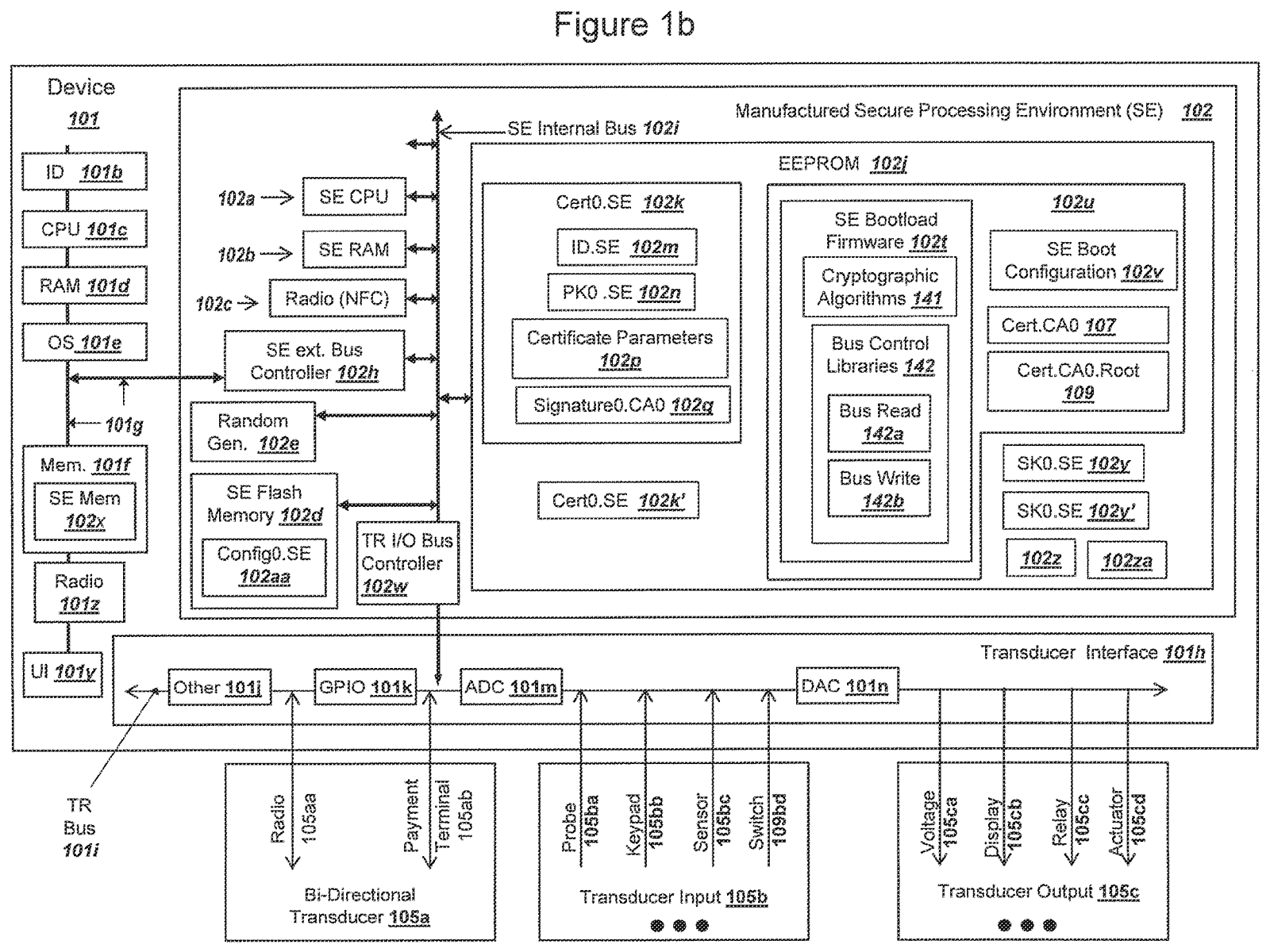

FIG. 1*b* is a graphical illustration of hardware, firmware, and software components for a device, including a secure processing environment, in accordance with exemplary embodiments. FIG. 1*b* is illustrated to include several components that can be common within a device 101 and a manufactured secure processing environment 102 or secure enclave 102 (SE 102). Device 101 may consist of multiple components in order to collect and transmit transducer data 125 (shown in FIG. 1*a*) associated with a monitored unit 106. In exemplary embodiments and as depicted in FIG. 1*b*, device 101 can include a device identity 101*b*, a processor 101*c* (depicted as "CPU 101*c*"), random access memory (RAM) 101*d*, an operating system (OS) 101*e*, storage memory 101*f*, a system bus 101*g*, a transducer interface 101*h*, a transducer bus 101*i*, a radio 101*z*, and a user interface (UT) 101*y*.

Device identity 101*b* could comprise a preferably unique alpha-numeric or hexadecimal identifier for device 101, such as an Ethernet MAC address, an International Mobile Equipment Identity (IMEI), an owner interface identifier in an IPv6 network, a serial number, or other sequence of digits to uniquely identify each of the many different possible units for device 101. Device identity 101*b* can preferably be recorded in a non-volatile memory or written directly to hardware in device 101 by device manufacturer 101*x* upon device manufacturing. The CPU 101*c* can comprise a general purpose processor appropriate for typically low power consumption requirements for a device 101, and may also function as a microcontroller. CPU 101*c* can comprise a processor for device 101 such as an ARM® based process or an Intel® based processor such as belonging to the Atom or MIPS family of processors, and other possibilities exist as well. CPU 101*c* can utilize bus 101*g* to fetch instructions from RAM 101*d* and operate on the instruction. CPU 101*c* can include components such as registers, accumulators, and logic elements to add, subtract, multiply, and divide numerical values and record the results in RAM 101*d* or storage memory 101*f*, and also write the values to an external interface such as radio 101*z*.

RAM 101*d* may comprise a random access memory for device 101. RAM 101*d* can be a volatile memory providing rapid read/write memory access to CPU 101*c*. RANI 101*d* could be located on a separate integrated circuit in device 101 or located within CPU 101*c*. The RANI 101*d* can include data recorded in device 101 for the operation when collecting and communicating transducer data 125 regarding monitored unit 106. The system bus 101*g* may be any of several types of bus structures including a memory bus or memory controller, a peripheral bus, and a local bus using any of a variety of bus architectures including a data bus. System bus 101*g* connects components within device 101 as illustrated in FIG. 1*a*, such as transferring electrical signals between the components illustrated. System bus 101*g* can also connect SE 102 to the other elements in device 101 including CPU 101*b*, storage memory 101*f*, and transducer interface 101*h*. Device 101 can include multiple different versions of bus 101*g* to connect different components, including a first system bus 101*g* between CPU 101*b* and RAM 101*d* (which could be a memory bus), and a second system bus 101*b* between CPU 101*b* and transducer interface 101*h*, which could be an I2C bus, an SPI bus, a USB, Dallas 1 wire, or similar data busses, which could also comprise a transducer bus 101*i*.

Figures 6A, 6B:
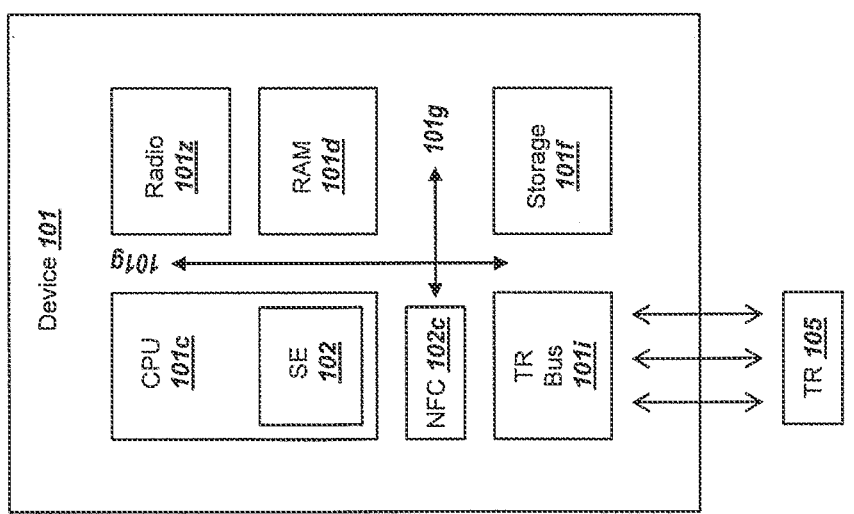
FIG. 6*a* is a graphical illustration of components for a device, in accordance with exemplary embodiments.

Memory 101*f* within device 101 can comprise a non-volatile memory for storage of data when device 101 is powered off. Memory 101*f* may be a NAND flash memory and record firmware for device 101. Memory 101*f* can record long-term and non-volatile storage of data or files for device 101. In an exemplary embodiment, OS 101*e* is recorded in memory 101*f* when device 101 is powered off, and portions of memory 101*f* are moved by CPU 101*b* into RAM 101*d* when device 101 powers on. Memory 101*f* (i) can be integrated with CPU 101*b* into a single integrated circuit (potentially as a "system on a chip" as depicted in FIG. 6*b* below), or (ii) operate as a separate integrated circuit or a removable card or device, such as a removable SD card. Memory 101*f* may also be referred to as "device storage" and can include exemplary file systems of FAT16, FAT 32, NTFS, ext3, ext4, UDF, or similar file systems. As depicted in FIG. 1*b*, non-volatile memory 101*f* may also contain SE Memory 102*x*. SE Memory 102*x* can be a portion of memory 101*f* that is allocated to SE 102. In exemplary embodiments, the two sets of memory 101*f* and 102*x* can be segmented logically, where memory 102*x* is encrypted with a symmetric ciphering key 102*z* within SE 102 by a memory controller for SE 102 (not shown). SE 102 could use a symmetric ciphering algorithm such as the Advanced Encryption Standard (AES-128), AES-192, Triple Data Encryption Algorithm (3DES), or similar algorithms. In other words, CPU 101c would not normally be able to read plaintext data in memory 102y since that memory is encrypted by SE 102.

The operating system (OS) 101e can include Internet protocol stacks such as a User Datagram Protocol (UDP) stack, Transmission Control Protocol (TCP) stack, a domain name system (DNS) stack, etc., and the operating system 101e may include timers and schedulers for managing the access of software to hardware resources within device 101, including SE 102 and transducer interface 101h. The operating system shown of 101e can be appropriate for a low-power device with more limited memory and CPU resources (compared to a server such as reporting server 116 and configuration server 112). Example operating systems 101e for a device 101 includes Linux, Android® from Google®, IOS from Apple®, Windows® 10 IoT Core, or Open AT® from Sierra Wireless®. Additional example operating systems 101e for a transducer device 101 include eCos, uC/OS, LiteOs, Contiki, OpenWRT, Raspbian, and other possibilities exist as well without departing from the scope of the present invention. Although depicted as a separate element within device 101 in FIG. 1b, OS 101e may reside in RAM 101d or memory 101f during operation of device 101.

Device 101 can include a radio 101z to communicate wirelessly with networks such as access network 126 depicted and described in FIG. 1a above. Radio 101z could connect with an antenna in order to transmit and receive radio frequency signals. Although not depicted in FIG. 1b, device 101 could utilize a wired connection such as Ethernet for external communication instead of or in addition to a radio 101z. Device 101 may also optionally include user interface 101y which may include one or more devices for receiving inputs and/or one or more devices for conveying outputs. User interfaces are known in the art and may be simple for many devices such as a few LED lights or and LCD display, and thus user interfaces are not described in detail here. User interface 101y could comprise a touch screen if device 101 as more sophisticated interaction with user 101a. Device 101 can optionally omit a user interface 101y, if no user input or display is required for operating device 101 with monitored unit 106. Although not depicted in FIG. 1b, device 101 can include other components to support operation, such as a clock, power source or connection, antennas, etc.

Device 101 can include a manufactured secure processing environment (SE) 102. SE 102 may include separate components of a processor SE CPU 102a, RAM 102b, a Near Field Communications (NFC) radio 102c, an SE external bus controller 102h, a hardware random number generator 102e, an SE flash memory 102d, an SE internal bus 102i, a transducer input/output bus controller 102w, and an electrically erasable programmable read-only memory (EEPROM) 102j. In exemplary embodiments, the NFC radio 102c may support other wireless standards besides NFC (such as Wi-Fi or Bluetooth), and in those embodiments an "NFC radio 102c" can be referenced herein as a "radio 101z". Components for SE 102 such as CPU 102a, RAM 102b, radio 102c, flash memory 102d could be similar to components described above for device 101 such as CPU 101c, RAM 101d, radio 101z, and storage 101f, respectively, except the components for SE 102 could have lower capacity, bandwidth, functionalities, or costs compared to the equivalent components for device 101. Although SE 102 is depicted as a separate component within device 101, in some embodiments the functionality of SE 102 described below could be implemented in software or firmware, such that a physical SE 102 can be omitted and a device 101 can perform the functions and operations of an SE 102 as described herein.

In a first exemplary embodiment, (i) CPU 101c may operate at greater than 200 MHz, while SE CPU 102a may operate at less than 200 MHz, and (ii) RAM 101d may store more than two megabytes while RAM 102b may store a value equal to or less than two megabytes. SE CPU 102a can comprise a processor similar to CPU 101c, but embedded into SE 102 and consequently typically with less resources than a CPU 101c, such as (i) less cache memory, (ii) operating typically at a slower speed, (iii) fewer internal registers, (iv) lower power consumption compared to CPU 101c, etc. In some exemplary embodiments, SE CPU 102a can comprise a processing core within a multi-core processor CPU 101c, and in those embodiments SE CPU 102a could operate with the same or similar clock rates and memory as other cores within CPU 101c.

In a second exemplary embodiment, although depicted as separate elements for both (i) CPU 101c, and RAM 101d, and (ii) SE CPU 102a and SE RAM 102b, the two elements could comprise the same physical hardware but represent time division or time separation of the physical hardware, similar to how the same physical hardware can host multiple logical processing running concurrently In other words, CPU 101c could switch operations between a "normal" mode functioning as CPU 101c for device 101 and then a "secure" mode as SE 102 for device 101. Or, SE CPU 102a could represent a virtualized process or computer within device 101, where the OS 101e implements virtualization and operates as a host for SE 102. Switching could take place rapidly enough that CPU 101c and SE CPU 102a would appear to other components both inside and outside device 101 as separate processors, while there could be a single physical processor inside device 101.

As depicted in FIG. 1b, SE 102 can include a radio 102c, which could support NFC communication. Although illustrated as internal to SE 102, radio 102c could be external to SE 102 in some embodiments. A radio 102c that is external to SE 102 could be connected via a secure bus such as SE bus 102i. In some embodiments, SE bus 102i can extend outside SE 102 in order to connect external components for SE 102 with internal components for SE 102. Radio 102c can comprise a radio for short-distance wireless communication, and be connected with an antenna. Radio 102c, when operating to support NFC communications, could (i) transmit and receive at the globally available frequency for unlicensed use of 13.56 MHz, and (ii) be compatible with the International Standards Organization (ISO) 14443 standards and subsequent and related versions. Radio 102c can operate as any of an NFC reader, NFC writer, and NFC peer-to-peer communication, and preferably supports communication at short range such as within several inches of device 101. Radio 102c can support radio frequency communications with mobile handset 108, when mobile handset 108 is within close physical proximity of device 101, such as less than a few feet in an exemplary embodiment. An exemplary processor with an embedded NFC radio as of early 2018 would be the PN7360AUHN processor from NXP® Semiconductor. Alternatively, a regular processor (i.e. without a radio 102c) could be combined with a radio controller on a separate chip such as combining an ARM Cortex® processor with a radio chip like the CLRC663 from NXP® Semiconductor. Other possibilities for the configuration of a radio 102c with a SE 102 and device 101 are possible in order to support a configuration step 103 without departing from the scope of the present invention.

A benefit of the use of short-range communication for SE 102 is physical security, such that any external device desiring to communicate with SE 102 through radio 102c must be in close physical proximity. In exemplary embodiments radio 102c could support other short-range wireless standards besides NFC. Radio 102c could implement radio frequency protocols that utilize low power and close proximity for the other node for which SE 102 will communicate with. In exemplary embodiments, radio 102c could be a Bluetooth or Wi-Fi radio, but operate at intentionally reduced in order to require closer physical proximity an external device such as mobile handset 108 to communicate with SE 102. For embodiments where radio 102c operates as a Bluetooth or Wi-Fi radio, radio 102c could transmit at a power in an exemplary range of 0.01-1.0 watts. Other possibilities for the radio technology and power levels of radio 102c exist without departing from the scope of the present invention.

SE 102 can also include a SE external bus controller 102h, which can manage the sequence and flow of data between SE 102 and device 101. As depicted in FIG. 1b, SE external bus controller 102h could electrically connect the SE internal bus 102i with device bus 101g, such that electrical signals, pulses, or waveforms can be transferred between device 101 and SE 102, including the transfer of binary data. SE external bus controller 102h could manage and sequence the flow of data between the two sides, and include a data buffer and logic gates. SE external bus controller 102h can include security components, such that device 101 cannot feasibly read data from EEPROM 102j or SE RAM 102b. SE external bus controller 102h could operate as a "mailbox", such that (i) device 101 writes values or data to SE external bus controller 102h and then (ii) SE 102 reads the values or data from SE external bus controller 102h.

As illustrated in FIG. 1b, device 101 may also contain a random number generator 102e. Random number generator 102e can comprise a physical component that generates random or pseudo random numbers for cryptographic operations of SE 102. A random number generator 102e can also comprise a hardware random number generator. The creation of random numbers with a high degree of entropy is important in the use of subsequent steps such as generating Random1.SE 308 below and also deriving PKI keys such as step 401 below. A seed for random number generator 102e could comprise a plurality of data from within SE 102 appended together in order to accumulate information entropy. To acquire the seed, SE 102 could collect a plurality of transducer 105 measurements or states, radio 102c measurements, clock times or values for CPU 102a, RAM 102b or memory 102x states, etc. In exemplary embodiments, random number generator 102e can include a secure hash algorithm similar to message digest 230 below in FIG. 2b operating on the random number seed. In exemplary embodiments, random number generator 102e operates within SE 102 as depicted in FIG. 1b, and in this manner the random numbers used for cryptographic operations such as PKI key generation in a step 401 below in FIG. 4a can remain reasonably secure and not normally communicated outside SE 102.

SE 102 can include nonvolatile SE flash memory 102d, which can also be referred to as "nonvolatile memory 102d" or "memory 102d". Nonvolatile memory 102d can comprise a physical memory of NAND or NOR flash memory, such that data recorded in nonvolatile memory 102d continues to be recorded when electrical power is removed from device

101 or SE 102. The data within non-volatile memory 102d can subsequently be read and/or re-written when power is restored to SE 102. Memory 102d for SE 102 can be similar to memory 101f for device 101. Memory 102d can be configured for a file system, such as those listed for memory 101f above. As depicted in FIG. 1b, memory 102d can include config0.SE 102aa. Config0.SE 102aa can comprise a file or set of files with the default configuration of SE 102, such as enabling or disabling radio 102c upon startup, settings for radio 102c and credentials, and parameters for the other elements of SE 102 depicted in FIG. 1b. Config0.SE 102aa can also be referred to as an initial device configuration and include values for a device configuration. In an exemplary embodiment, config0.SE 102 comprises the firmware and software installed on device 101 upon manufacturing, similar to software package 104q below in FIG. 5, where software package 104q can provide updated software, firmware, and configuration files for device 101 and conf0.SE contains the originally installed versions of these files in device 101. In an exemplary embodiment where radio 102c operates as a Wi-Fi radio, config0.SE 102aa can include values such as an SSID, a password or security key, and a user name, or also multiple sets of those and other values.

SE 102 can also include a transducer input/output bus controller 102w (or "TR controller 102w"), which can manage the sequence and flow of data or signals between (a) SE 102 and transducers 105 via (b) transducer bus 101i and transducer interface 101h. As depicted in FIG. 1b, TR controller 102w could electrically connect the SE internal bus 102i with transducer bus 101i, such that electrical signals, pulses, or voltages can be transferred between transducers 105 and SE 102, including the transfer of digital data or analog signals. For digital data, TR controller 102w could manage and sequence the flow of data between the two sides, and include a data buffer and logic gates. For analog data, TR controller 102w could include a digital-to-analog converter (DAC) or an analog-to-digital converter (DAC). TR controller 102w can include security measures, such that transducers 105 cannot feasibly read data from EEPROM 102j or SE RAM 102b. In an alternative exemplary embodiment to that depicted in FIG. 1b, SE 102 can use a second, different bus 102i than the depicted bus 102i in order to connect with TR controller 102w. In this alternative exemplary embodiment, external transducers 105 could be physically and electrically separated from secure information such as cryptographic keys or data in memory or the processor. Although TR controller 102w is depicted in FIG. 1b as internal to SE 102 and connected to SE internal bus 102i, in another exemplary embodiment TR controller 102w could be connected to device bus 101g, and SE 102 could communicate with TR controller 102w via SE external bus controller 102h. Other possibilities exist as well for the configuration and connections of TR controller 102w without departing from the scope of the present invention.

Although not depicted in FIG. 1b, the various servers shown above in FIG. 1a such as configuration server 112 and reporting server 116 and other servers as well can include equivalent internal components as device 101 in order to operate. The servers in FIG. 1a could include a processor similar to CPU 101c, with primary differences for the processor server being increased speed, increased memory cache, an increased number and size of registers, the use of a 64 bits for datapath widths, integer sizes, and memory address widths, as opposed to an exemplary 32 or 16 bits for CPU 101c in device 101. Similarly, RAM in a server could be a RAM similar to RAM 101d in device 101, except the RAM in a server could have more memory cells such as supporting exemplary values greater than an exemplary 2 gigabytes, while RAM in device 101 could support fewer memory cells such as less than an exemplary 1 gigabtye. Non-volatile memory for storage in a server in FIG. 1*a* could comprise disks, "solid state drives" (SSDs) or "storage area networks" (SAN) for a server. Instead of a radio 101*z*, in exemplary embodiments, a server in FIG. 1*a* could use a physical, wired LAN interface such as a high-speed Ethernet or fiber optic connection.

As depicted in FIG. 1*b*, a device 101 or SE 102 can communicate with transducers 105 via a transducer interface 101*h*. Transducer interface 101*h* can comprise the physical interface between transducers 105 and device 101, and include electrical connectors or pins for transfer of electrical signals between device 101 and transducers 105. For embodiments where a transducer 105 utilizes a micro universal serial bus (USB), then transducer interface 101*h* could comprise a micro USB receptacle. Transducer interface 101*h* can utilize a transducer bus 101*i*. For digital data acquisition or control of transducers 105, transducer bus 101*i* could comprise a data bus similar to bus 101*g* for device 101 or bus 102*i* for SE 102 as described above. Exemplary buses for digital data include universal serial bus (USB), serial peripheral interface (SPI), inter-integrated circuit (I2C), and Dallas 1-wire. Transducers 105 could also be connected via wireless protocols such as Bluetooth or Wi-Fi, and in this case transducer interface 101*h* could include a radio similar to radio 101*z*.

A transducer bus 101*i* can connect components in order to communicate with transducers 105. Exemplary components for transducer bus 101*i* include general purpose input/output (GPIO) controller 101*k*, an analog to digital controller (ADC) 101*m*, a digital-to-analog controller (DAC) 101*n*, and another controller 101*j*. GPIO 101*k* could comprise electrical pins that are unused by default but could be programmed via instructions residing in SE RAM 102*b* or device RAM 101*d*, where the instructions set the pins on GPIO high or low depending on the transducer 105 connected or configuration of device 101. As one example software or firmware operating on device 101 could program GPIO 101*k* to operate as a traditional serial or RS-232 interface, and other possibilities exist as well. In an exemplary embodiment, the software package 104*q* depicted and described below in connection with FIG. 5 can include software to program GPIO 101*k*. ADC 101*m* could take analog input from transducer 105 and convert it to digital signals for further processing by device 101 or SE 102. As one example, ADC 101*m* could read a level of a voltage input by measuring the voltage level and outputting a digital value of the measured voltage level, such as an exemplary reading of 0.123 volts.

DAC 101*n* could take digital input from device 101 or SE 102 and convert it to analog signals for transducer 105. As one example, DAC 101*n* receive a digital signal from device 101 to output a voltage level, and convert the digital signal to the analog level output, such as an exemplary value of 0.123 volts. Another controller 101*j* could comprise a different controller than GPIO 101*k*, ADC 101*m*, and DAC 101*n* listed above, such as a controller customized for a particular transducer 105 or application of device 101. Another controller 101*j* could be a USB controller, military standard 1553 controller, peripheral component interconnect express (PCIe) bus, or an Ethernet networking interface including power over Ethernet. Other possibilities exist as well for another controller 101*j* operating with a transducer interface 101*h* without departing from the scope of the present invention.

In exemplary embodiments, transducer interface 101*h* can connect with several types of transducers, such as (i) a transducers input 105*b* that could comprise a sensor, or (ii) a transducer output 105*c* that could comprise an actuator, or (iii) a bi-directional transducer 105*a*. A bi-directional transducer 105*a* can transfer data (a) from device 101 to transducer 105*a* and (b) from transducer 105*a* to device 101. Exemplary bi-directional transducers 105*a* could include a radio 105*aa* or a payment terminal 105*ab*, and other examples exist as well. Radio 101*aa* could comprise a radio similar to radio 101*z* and be connected with an antenna. The transducers 105 shown in FIG. 1*b* are depicted to be illustrative as opposed to limiting. For example, another bi-directional transducer 105*a* could be a touch screen, where (x) data transmitted to the touch screen from device 101 can provide visual display information such as pixel status or color, and (y) data received from the touch screen going to device 101 is touch information such as location of manual touch on the screen.

Transducer input 105*b* could support transducers that provide digital or analog data input into transducer bus 101*i*. Exemplary devices for transducer input 105*b* depicted in FIG. 1*a* include a probe 105*ba*, a keypad 105*bb*, a sensor 105*bc*, and a switch 105*bc*. In other words, transducer input 105*b* could receive data about monitored unit 106 and forward the data to device 101 through transducer interface 101*h* and transducer bus 101*i*. Probe 105*ba* could measure values for monitored unit such as pH, salinity, humidity, voltage, 3-axis orientation, acceleration, or similar physical characteristics of monitored unit 106. Keypad 105*bb* could be a pad for a device user 101*a* to enter numbers or letters, including a keyboard or a keypad for entering a PIN code on a payment terminal, or a password. Sensor 105*bc* could be operated in an active or passive manner. Sensor 105*bc* can receive an electrical current input from device 101 in an active mode. An exemplary sensor 105 could comprise a thermistor or thermocouple. A sensor 105*bc* could also comprise a camera for generating a picture or video from the outside of device 101. Switch 105*bd* could comprise a switch operated by a user 101*a* or an external automated process associated with monitored unit 106. For example, switch 105*bd* could forward data to device 101 when electrical contacts associated with switch 105*bd* are open or closed. Other possibilities exist as well for transducer input 105*b* without departing from the scope of the present invention.

Transducer output 105*c* could support transducers that receive digital or analog data output from transducer bus 101*i*. Exemplary devices for transducer output 105 depicted in FIG. 1*b* include voltage 105*ca*, a display 105*cb*, a relay 105*cc*, and an actuator 105*cd*. Voltage 105*ca* could be a voltage output by device 101 for controlling monitored unit 106. For example, monitored unit 106 could include a physical interface similar to transducer interface 101*h*, which could receive an output voltage 105*ca* (e.g. output from device 101 but input into monitored unit 106). Voltage 105*ca* could control a level of a lighting system, a speed of a motor, or other values associated with monitored unit 106. Display 105*cb* could be a light emitting diode (LED), liquid crystal display (LCD), a computer screen or monitor, or similar systems of displaying information to users 101*a*. Relay 105*cc* could be a relay with electrical contacts that are opened or closed via input from device 101, such that the state of monitored unit 106 changes when relay 105*cc* is opened or closed. An exemplary relay 105*cc* could be a lock on a door. Actuator 105*cd* could comprise devices that receive analog or digital input from device 101 in order to change or control the state of monitored unit 106. Exemplary actuators 105*cd* include electric motors, hydraulic cylinders, piezoelectric actuator, a speaker, solenoids, etc.

Although transducers 105 in FIG. 1*b* are depicted as external to device 101, transducers 105 could be internal to device 101, or device 101 could utilize a mix of internal and external transducers 105 connected with a transducer interface 101*h*. Further, a device 101 could implement multiple different transducer interfaces 101*h*, such as a first transducer interface 101*h* connects internal transducers 105 and a second transducer interface 101*h* connects external transducers. Other possibilities exist as well without departing from the scope of the present invention.

As depicted in FIG. 1*b*, SE 102 could also include an EEPROM 102*j*. EEPROM 102*j* could comprise long-term, nonvolatile memory storage chipsets or physical units that are designed primarily for writing once or a few times, and reading many times. As contemplated within the present invention, a read-only address within EEPROM 102*j* could comprise a memory address or another hardware address for read-only operations accessible via bus 102*i*. Although depicted as using EEPROM 102*j*, the data and elements depicted within EEPROM 102*j* in FIG. 1*b* could be alternatively stored in flash memory 102*d*, where the memory within 102*d* is tagged or set as being "read only" during most of the life of operation of SE 102. In other words, a physical EEPROM chip or memory cells are not required for some embodiments in order to implement the functionality of EEPROM 102*j* depicted in FIG. 1*b*.

EEPROM 102*j* could include a certificate cert0.SE 102*k*, firmware 102*u*, and secret key SK0.SE 102*y*, symmetric encryption key 102*z* and message authentication code (MAC) key 102*za*. Cert0.SE 102*k* for SE 102 can be the default, installed certificate within SE 102 and can take a form similar to SE certificate 419 depicted and described in connection with FIG. 4*b* and FIG. 4*d* below. A device manufacturer 101*x* could deliver device 101 to user 101*a* with certificate cert0.SE 102*k* pre-installed as well as SK0.SE 102*y* recorded in a nonvolatile memory. Device manufacturer 101*x* could receive SE 102 from a processor manufacturer with certificate cert0.SE 102*k* configured within non-volatile memory of SE 102, or device manufacturer 101*x* could write certificate cert0.SE 102*k* and corresponding SK0.SE 102*y* (and/or cert0.SE 102*k*' and SK0.SE 102*y*') to SE 102 during a pre-configuration step conducted before the depicted configuration step 103 from FIG. 1*a*. SK0.SE 102*y* can also comprise two different values or numbers, where a first number is associated with a key exchange such as key exchange step 411*a* below in FIG. 4*a* and FIG. 4*b*, and a second value or number associated with a digital signature algorithm such as generating signatures 309 and 416 in FIG. 2*b*. Or, the two values or numbers could be represented by separate keys SK0.SE 102*y* and SK0.SE 102*y*', respectively.

In exemplary embodiments, SE 102 can also include, record, or store a second secret key SK0.SE 102*y*'. The first SK0.SE 102*y* from the above paragraph could be used with key exchange algorithms such as ECDH key exchange step 411*a* in FIG. 4*a* and FIG. 4*b* below. The second key SK0.SE 102*y*' could be used with digital signature algorithms such as those depicted for SE 102 in FIG. 2*b* below. Likewise, SE 102 could also include, record, or store a second certificate cert0.SE 102*k*', where the second certificate cert0.SE 102*k*' could be used with digital signature algorithms and include a public key corresponding to the second secret key PK0.SE 102*y*'. In some embodiments, the second secret key SK0.SE 102*y*' and the second certificate cert0.SE 102*k*' could be omitted, and the key SK0.SE 102*y* could be used with both key exchange step 411*a* and digital signatures.

In addition, symmetric encryption key 102*z* and MAC key 102*za* along with firmware 102*u* could be written by a manufacturer into non-volatile memory of SE 102 (such as EEPROM 102*j*) before distribution of device 101 to users 101*a*. Symmetric encryption key 102*z* can comprise a key to encrypt and decrypt ciphertext similar to symmetric encryption key 442*a* depicted in FIG. 4*b* below. Key 102*z* can be used with a symmetric encryption algorithm 444*a* depicted and described in connection with FIG. 4*b* below. The ciphertext for key 102*z* can comprise firmware 102*u* or components of firmware 102*u*, such that the firmware 102*u* or components of firmware 102*u* could be securely stored outside SE 102 in an encrypted format and loaded into SE 102 after decryption using key 102*z*. MAC key 102*za* can be associated with key 102*z* in order to verify integrity of ciphertext encrypted or decrypted with key 102*z*.

Certificate cert0.SE 102*k* can include an identity ID.SE 102*m*, public key PK0.SE 102*n*, certificate parameters 102*p*, and a signature0.CA0 102*q*. Identity ID.SE 102*m* may comprise a unique identity for SE 102, in order to identify SE 102 among a plurality of devices 101 that connect with either access network 126, configuration system 114, or reporting system 120. In exemplary embodiments, ID.SE 102*m* remains the same for a given physical SE 102, even as new or subsequent certificates are issued for SE 102. PK0.SE 102*n* can comprise a public key for SE 102, and an exemplary public key within an X.509 certificate is depicted in FIG. 4*d* below as PK1.SE 410*a*. In an exemplary embodiment, the ID.SE 102*m* is included as the field "serialNumber" (SN) in the subject of an X.509 certificate, or alternatively the ID.SE 102*m* could be in the "commonName" field (CN).

Certificate parameters 102*p* can comprise parameters associated with cert0.SE and exemplary parameters for certificate parameters 102*p* include the parameters 407 depicted in FIG. 4*b* below and also the parameters 407 in FIG. 4*d* below. Certificate parameters 102*p* can specify algorithms such as RSA or elliptic curve cryptography (ECC) values, ECC curve names, key lengths in bits, signature algorithms, validity dates, encoding rules, etc. Signature signature0.CA0 102*q* may comprise the signature of the certificate authority for SE 102, and the public key of the certificate authority for SE 102 could be included in cert.CA0 107. A node of system 100 in FIG. 1*a* can use cert0.SE and cert0.CA 107 to verify that the PK0.SE 102*n* belongs to SE 102 with identity ID.SE 102*m*. Additional details regarding the use of public keys, private keys, signatures, and certificates for the components in FIG. 1*a* and FIG. 1*b* will be discussed in figures below, including FIG. 2*b*.

In exemplary embodiments, firmware 102*u* for SE 102 can include SE bootload firmware 102*t*, and SE boot configuration 102*v*. SE bootload firmware 102*t* in EEPROM 102*j* can provide machine executable code for SE CPU 102*a* to initiate operations when electrical power is provided to device 101 and SE 102. SE bootload firmware 102*t* in EEPROM 102*j* could also include instructions for SE CPU 102*a* to load config0.SE recorded in nonvolatile memory 102*d*, if present, where config0.SE is described with SE nonvolatile memory 101*d*. SE bootload firmware 102*t* could load boot firmware for SE 102, where the boot firmware for SE 102 could be stored in either memory 102*d* or memory 102x. If boot firmware for SE 102 is stored in memory 102x (where boot firmware for SE 102 is called by bootload firmware 102t), then in exemplary embodiments boot firmware SE 102 is encrypted with key 102z since the boot firmware would be stored outside SE 102. In exemplary embodiments, bootload firmware 102t includes a set of cryptographic algorithms 141, where cryptographic algorithms 141 as a minimum supports the use of key 102z and a symmetric decryption algorithm 444b (see FIG. 4b) in order to decrypt boot firmware for SE 102 stored outside SE 102, as well as use MAC key 102za to verify integrity of a boot firmware stored in memory 102x.

Bus control libraries 142 could include software or firmware to manage and schedule the input and output of data for SE 102, such as machine code for (i) instructing processor 102a to write data to bus 102i for bus controller 102h or bus controller 102w when data is transmitted outside SE 102, (ii) read data from bus controller 102h or bus controller 102w when data from device 101 or transducer 105 is passed into SE 102, and (iii) reading SK0.SE 102y and/or SK0.SE 102y' from protected memory. Bus control libraries 142 can also include bus read instructions 142a and bus write instructions 142b. Bus read instructions 142a can provide machine executable code for SE CPU 102a to read data from either (i) device 101 using bus controller 102h, or (ii) transducer 105 using bus controller 102w. In this manner, bus read instructions 142a could provide the logical software or firmware interface for SE 102 to receive external data. Bus read instructions 142a could specify memory addresses, registers, or bus addresses where device 101 or transducers 105 can write data in order to be read by SE 102. Bus write instructions 142b can provide machine executable code for processor 102a to write data output from SE 102 in order to be read by device 101 or transducer 105.

Firmware 102u in SE 102 for device 101 can also include a SE boot configuration 102v, a certificate authority public key recorded in cert.CA0 107 and a root certificate cert.CA-.root 109, as depicted in FIG. 1b. SE boot configuration 102v can provide values for the configuration or operation of SE 102 when operating with the SE bootload firmware 102t, such as (i) parameters for using bus 102i or controllers 102h and 102w, (ii) the frequency to operate a clock or phase looped logic associated with SE 102, (iii) a firmware version number, (iv) the memory capacity of memory 102d and 102x, (v) the memory addresses, cells, or file sectors to utilize for bus controllers, and (vi) parameters specifying values for hardware within SE 102. In exemplary embodiments, SE boot configuration 102v specifies the activation of radio 102c, such that if (i) a configuration step 103 has not been conducted to configure SE 102, then radio 102c is active, but (ii) if a configuration step 103 has been conducted then SE boot configuration 102v specifies that radio 102c is inactive or turned off. Note that config.SE 102aa could specify the activation of radio 102c instead of SE boot configuration 102v. SE boot configuration 102v may specify the parameters for use of boot firmware 102u, while parameters config0.SE 102aa may specify parameters for operating firmware of SE 102 that is loaded by boot firmware 102t. Cert. CA0 107 and cert.CA.root 109 were also described above in connection with FIG. 1a. Note that by recording cert.CA0 107 and cert.CA.root 109 in EEPROM 102j for SE 102, including during manufacturing, these certificates for the certificate authority can be securely distributed along with SE 102 for subsequent use such as verifying signatures as described below.

FIG. 2a

Figure 2A:
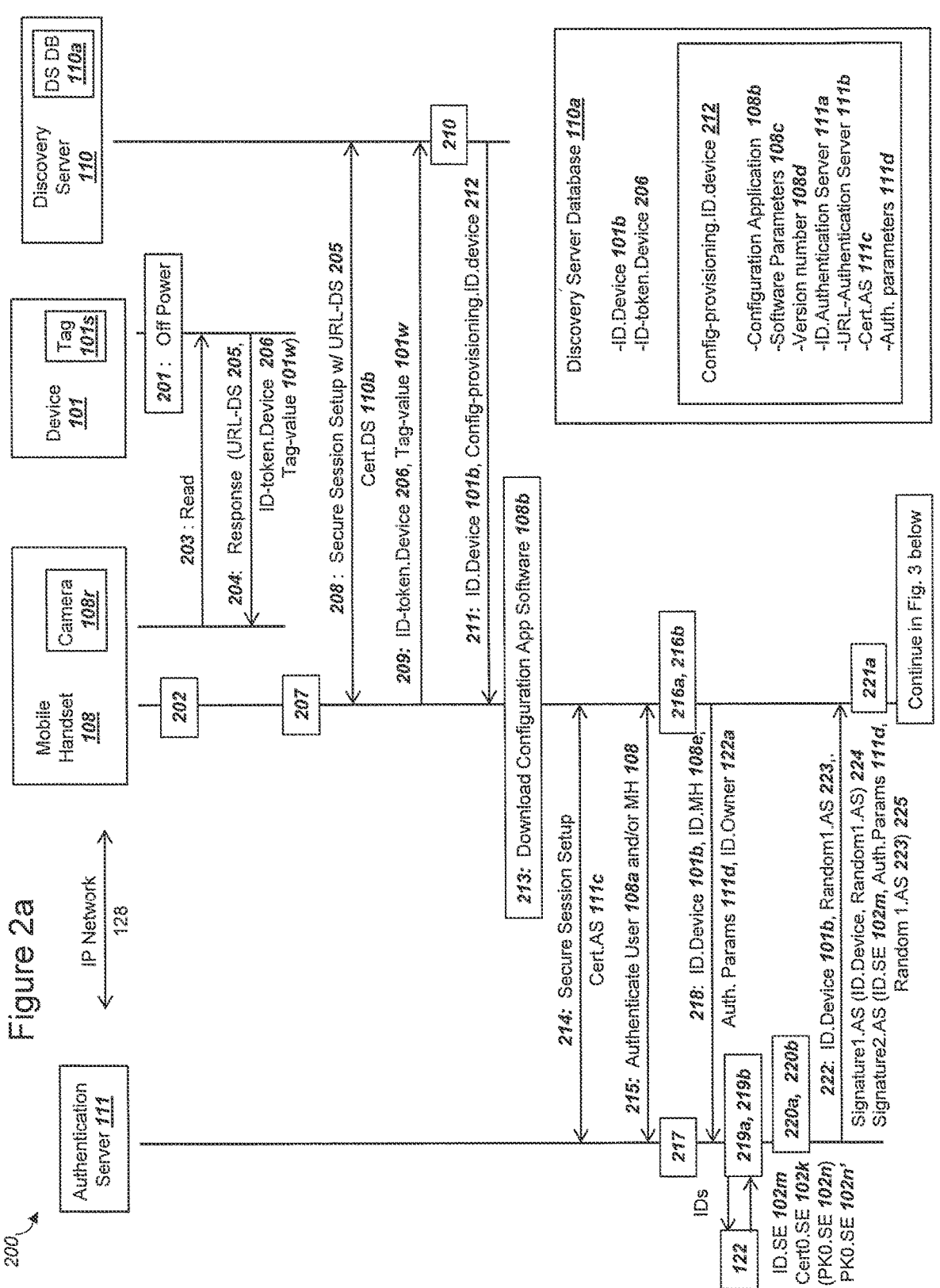
FIG. 2a is a simplified message flow diagram illustrating an exemplary system with exemplary data sent and received by a mobile handset, in accordance with exemplary embodiments.

FIG. 2a is a simplified message flow diagram illustrating an exemplary system with exemplary data sent and received by a mobile handset, in accordance with exemplary embodiments. System 200 can include a mobile handset 108, device 101, a discovery server 110 and authentication server 111. Mobile handset 108 can communicate with discovery server 110 and authentication server 111 via IP network 128. Mobile handset 108 can comprise a smart phone such as a phone based on an Android operating system from Google® or IOS from Apple®. Mobile handset 108 can include a battery, radio, and touch screen, as well as a camera 108r. Mobile handset 108 can connect with an access network similar to access network 126 in order to communicate with discovery server 110 and authentication server 111, and the access network used in a system 200 can be a different access network than access network 126 used by device 101 in FIG. 1a and FIG. 5. Device 101 in system 200 can comprise a device 101 depicted in FIG. 1a and FIG. 1b, and device 101 can also include a tag 101s. Tag 101s can comprise a recorded image on device 101 or packaging of device 101 and could be a bar code, QR code, or a serial number for device 101. Tag 101s can provide a unique identifier for device 101. In exemplary embodiments, if device 101 is a medical device, then tag 101s can correspond to a Unique Device Identification (UDI).

Figure 3:
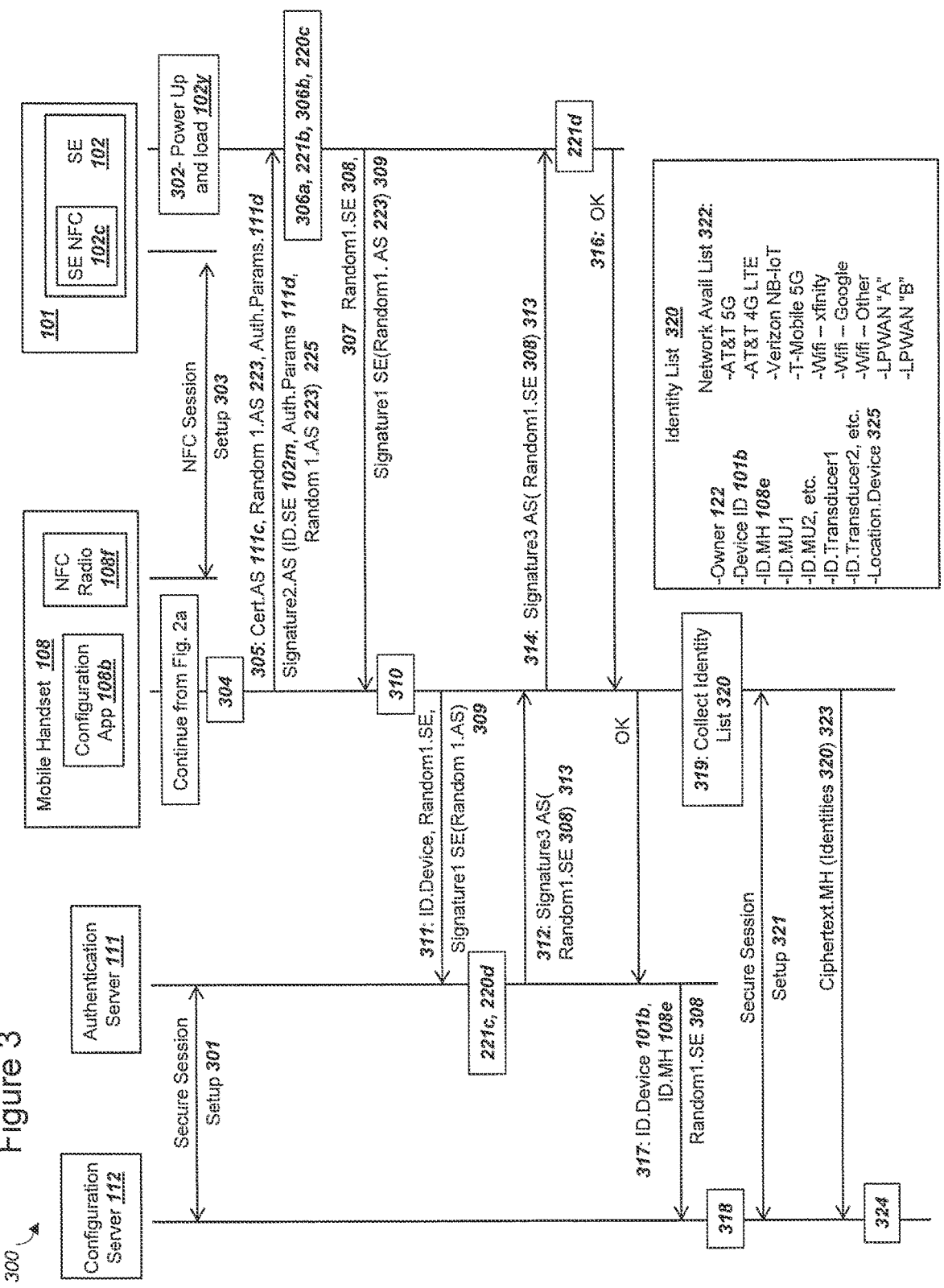
FIG. 3 is a simplified message flow diagram for an exemplary system with exemplary data sent and received by a mobile handset and a device, in accordance with exemplary embodiments.

Although FIG. 2a depicts a mobile handset 108, a configuration unit as described above in FIG. 1a could be utilized in system 200 instead of a mobile handset 108. The configuration unit could perform equivalent steps and conduct equivalent message flows as depicted in FIG. 2a, FIG. 3, and related figures below. In other words, a configuration unit could be a device that is different than a regular mobile handset 108, but perform similar steps and provide similar functionality. In an exemplary embodiment, mobile handset 108 could be a configuration unit customized for operation in systems 100, 200, 300, etc. Mobile handset 108 is depicted for preferred exemplary embodiments because mobile handset 108 could be a relatively ubiquitous piece of equipment for a device user 101a or configuration user 108a, but other equipment could provide equivalent functionality as mobile handset 108. Either a configuration unit or mobile handset 108 operating in system 200 and related systems below can implement similar elements to those depicted in FIG. 1b for a device 101, such as having a processor, memory, data bus, radio, storage, etc. The storage and memory of a configuration unit or mobile handset 108 could record an operating system to manage the hardware devices for mobile handset 108 or a configuration unit, and a software or a firmware application 101b depicted in FIG. 1a and FIG. 3 could conduct the message flows for unit 108 herein. In other words, for exemplary embodiments using a configuration unit operating instead of the depicted "mobile handset" 108, the configuration unit could also include a configuration application 108b, and an NFC radio 108f, etc. as depicted below for mobile handset 108.

In another embodiment for FIG. 2a, tag 101s could comprise an NFC tag such as a tag compatible with the NFC Forum standards for type 1 through type 5 tags (and subsequent or related standards). The NFC technology could also be NFC-A, NFC-B, or NFC-V, or subsequent standards. For these exemplary embodiments where tag 101s comprises an NFC tag, then mobile handset 108 could use an NFC reader instead of camera 108r, and the NFC reader could comprise an NFC radio 108f as depicted and described in connection with FIG. 3 below. Mobile handset 101 could utilize an NFC chip and antenna, where the NFC chip operates in read mode with tag 101s. In exemplary embodiments, discovery server 110 can include or be associated with a discover server database 110a. Database 110a could record information about a plurality of devices 101, such as ID.device 101b, and ID-token.device 206, and a dataset config-provisioning.ID.device 212, which will be described in further detail below for FIG. 2a.

At step 201 in FIG. 2a, device 101 can be in a powered off state. In alternative embodiments, device 101 could be powered on at step 201, although power for device 101 is not required for embodiments with the steps and message flows outlined in FIG. 2a. At step 202, mobile handset 108 could be powered on and placed in proximity of device 101. Mobile handset 108 could be operated by a device user 101a or a configuration user 108a at step 202. At step 203, device user 101a or configuration user 108a could use mobile handset 108 to conduct a "read" step 203, where mobile handset 108 can (i) take a picture of a tag 101s for device 101, or (ii) read a bar code, QR code, or similar code for device 101. As mentioned above, tag 101s could comprise a bar code, QR code, or other encoding of data for device 101, including a serial number. For the alternative embodiment where (i) mobile handset 108 uses an NFC reader and (i) tag 101s comprises an NFC tag, the mobile handset 108 could conduct an NFC read of tag 101s for step 203 and step 204. For some exemplary embodiments, mobile handset 108 could receive data for the tag 101s (such as URL-DS 205, ID-token.device 206, and tag value 101w) via a packet or message received over a local wireless link between mobile handset 108 and device 101. The local wireless link could comprise any of the example wireless links of Wi-Fi, Bluetooth, and near field communications, and other possibilities exist as well. With Wi-Fi networks, device 101 could periodically transmit data for tag 101s as a broadcast message, and mobile handset 108 could listen for broadcast messages in order to read the tag 101s.

At step 204, mobile handset 108 can receive data from tag 101s, such as a response, where the response can consist of a uniform resource locator (URL) for discovery server 110, URL-DS 205, an ID-token.device 206, and a tag value 101w. URL-DS 205 could include a domain name for discovery server 110 and parameters such as the use of HTTP or HTTPS and a destination TCP or UDP port number for sending packets to discovery server 110. ID-token.device 206 could be a token for ID.device 101b, or a value or unique pseudo-random number associated with device 101 and/or ID.device 101b. ID-token.device 206 could be a value that obfuscates ID.device 101b but can preferably uniquely map to ID.device 101b. Through the use of ID-token.device 206 that is readable by mobile handset 108, then the actual value for ID.device 101b can remain confidential at step 204. Tag value 101w in response can include data associated with tag 101s and device 101, such as versions of software supported, product validity or expiration dates, cryptographic parameters supported, or a subset of config-provisioning.ID.device 212. In an exemplary embodiment, tag value 101w could comprise some values of config-provisioning.ID.device 212 upon manufacturing of device 101, which could be subsequently updated at a later date in discovery server DB 110a before installation or operation of device 101.

At step 207, mobile handset 108 could process the data received in response 204. For embodiments where tag 101s is an image such as a bar code or QR code, at step 207 mobile handset 108 could process the image and extract the data or values for ID-token.device 206, URL-DS 205, and tag value 101w. Continuing at step 207, mobile handset 108 could connect with an access network 126 in order to call the URL in URL-DS 205, which could be an HTTPS/TLS session in exemplary embodiments. In exemplary embodiments, URL-DS 205 is combined with ID-token.device 206, such that the HTTPS session is a unique request to discovery server 110 for each device 101. At step 207, mobile handset 108 could perform additional checks and steps in preparation for communication with device 101, such as verifying data in tag value 101w is compatible with software in mobile handset 108, including configuration software 108b.

In message flow 208, mobile handset 108 can establish a secure HTTPS session with discovery server 110 using the URL-DS 205, and the secure session could comprise a transport layer security (TLS) session such as TLS version 1.2, TLS version 1.3, or similar and subsequent standards. As part of the setup of message flow 208, mobile handset 108 can receive a certificate cert.DS 110b from discovery server 110. Cert.DS 110b could comprise an X.509 certificate similar to the certificate depicted in FIG. 4d below, and include a signed public key for discovery server 110. In exemplary embodiments, mobile handset 108 verifies the certificate cert.DS 110b using the public key in certificate cert.CA1 115. The verification of signatures using public keys in certificates is similar to the steps for verifying signatures outlined below in step 221 for FIG. 2b. Although not depicted in FIG. 2a, in exemplary embodiments mobile handset 108 can also authenticate with discovery server 110, such as a configuration user 108a associated with mobile handset 108 entering user credentials in a web site for discovery server 110. Or mobile handset 108 could sent discovery server 110 a certificate for mobile handset 108, which the discovery server 110 could verify using a step 221 in FIG. 2b.

In message 209 and after the secure HTTPS/TLS session setup in message flow 208, mobile handset 108 can send discovery server 110 ID-token.device 206 and tag value 101w. Mobile handset could alternatively send discovery server 110 a subset of the data for ID-token.device 206 and/or tag value 101w. At step 210, discovery server 110 can use data in ID-token.device 206 to query discovery server database 110a for the values or data sets ID.device 101b and config-provisioning.ID.device 212. Discovery server database 110a may comprise a database with tables to track configuration information for a plurality of devices 101. In exemplary embodiments, Config-provisioning.ID.device 212 contains data used by mobile handset 108 for the configuration of device 101 and SE 102. Exemplary data depicted for config-provisioning.ID.device 212 in FIG. 2a includes configuration application "configuration application" 108b, software parameters 108c, version number 108d, ID.Authentication Server 111a, URL-authentication Server 111b, cert.AS 111c, auth. parameters 111d. Additional or other data for mobile handset 108 and device 101 could be included in discovery server database 110a and values for config-provisioning.ID.device 212.

Configuration application 108b can specify the name or URL of a software application for mobile handset 108 to utilize in order to configure device 101 and SE 102. Mobile handset 108 could utilize the name or URL to fetch the software for configuration application 108b. Configuration application 108b could be a public or private application for the operating system of mobile handset 108. For embodiments where mobile handset 108 utilizes an Android-based operating system, configuration application 108b could be downloaded from the Google Play store or a private web site associated with configuration system 114. For embodiments where mobile handset 108 utilizes an Apple®/IOS-based operating system, configuration application 108 could be distributed through a developer enterprise program or down-loaded through iTunes®. Other possibilities exist as well without departing from the scope of the present invention for a mobile handset 108 to download a configuration application 108*b*, where the name of configuration application 108*b* is received by a discovery server 110.

As depicted in FIG. 2*a*, config-provisioning.ID.device 212 sent to mobile handset 108 may also include software parameters 108*c* and version number 108*d*. Software parameters 108*c* may include values and data for mobile handset 108 to utilize configuration application 108*b* and communicate with device 101 using an NFC radio 108*f*. Exemplary values include parameters 108*c* for mobile handset 108 to conduct a configuration step 103, such as, but not limited to, (i) cryptographic algorithms to utilize, (ii) ECC curve names and key lengths and associated data, (iii) selection and parameters for a radio 101*z* (below) in mobile handset 108 to communicate with device 101, including the selection of one of multiple possible radios in mobile handset 108, (iv) addresses, names, and port numbers to utilize with IP network 128, (iv) timers and retry counts for communication with device 101 or configuration server 112 or authentication server 111, (v) parameters for configuration system 114, (vi) parameters for communicating with device 101, etc. Version number 108*d* for config-provisioning.ID.device 212 may specify a version number of configuration application 108*b* to utilize, or a list or dataset of version numbers of standards supported, such as IP version of IP network 128, NFC type or version for an NFC radio 108*f*, TLS version supported, etc.

As depicted in FIG. 2*a*, config-provisioning.ID.device 212 sent to mobile handset 108 may also include ID.authentication Server 111*a*, URL-authentication Server 111*b*, cert.AS 111*c*, auth. parameters 111*d*. ID.Authentication Server 111*a* could comprise an identity or name for authentication server 111, such as a domain name or multiple domain names for multiple servers. URL-Authentication Server 111*b* could comprise a URL for configuration application 108*b* to call in order to authenticate with authentication server 111. In some exemplary embodiments, URL-authentication server 111*b* includes either ID.Device 101*b* or ID-token.Device 206, so that when mobile handset 108 using configuration application 108*b* calls URL-authentication Server 111*b*, the URL includes a unique string that identifies device 101. Or, in another exemplary embodiment, mobile handset 108 can (a) call URL-authentication server 111*b* without an identity for device 101, and subsequently (b) send either ID.Device 101*b* or ID-token.Device 206. Cert.AS 111*c* could comprise a certificate for authentication server 111 in a form similar to the exemplary certificate depicted below in FIG. 4*d*, where cert.AS 111*c* could include a public key for certificate server 111 and a signature of a certificate authority. In exemplary embodiments, a certificate for a certificate authority associated with cert.AS 111*c* is sent with cert.AS 111*c*. Authentication parameters 111*d* can include parameters for configuration application 108*b* to utilize with authentication server 111, such as, but not limited to, hash or message digest algorithms, digital signature algorithms, padding schemes, key lengths, nonce or challenge lengths, timers, and retry counts, encoding rules, etc.

The above fields and values described for config-provisioning.ID.device 212 and ID.device 101*b* could be sent from discovery server 110 to mobile handset 108 in a response 211 as depicted in FIG. 2*a*. In an exemplary embodiment, discovery server 110 can send mobile handset the full configuration application 108*b* with the response 211 instead of a name or URL for configuration application 108*b*, if the current, updated configuration application 108*b* is not already downloaded by mobile handset 108. In another exemplary embodiment, mobile handset 108 can download configuration application 108*b* in a step 213 as depicted in FIG. 2*a*, if mobile handset 108 has not already installed the software for configuration application 108*b* after receiving response 211. For example, response 211 could include a version number 108*d* that is higher or different than initially utilized by mobile handset 108 and/or an initial configuration application 108*b*, and consequently the higher version number 108*d* could indicate to mobile handset 108 that a different configuration application 108*b* would be required. In exemplary embodiments, configuration application 108*b* can include a hash signature similar that is created using a signature creation 220 step as depicted in FIG. 2*b* below. Step 213 may also include mobile handset 108 launching the configuration application 108*b* and applying a subset of software parameters 108*c* or tag-value 101*w*. If any of the steps depicted in FIG. 2*a* fail, error codes or messages could be displayed through mobile handset 108 to configuration user 108*a*.

After successful launch of configuration application 108*b*, mobile handset 108 can connect with authentication server 111. Secure session setup 214 could comprise a secure HTTPS session with authentication server 111 using the URL-authentication server 111*b*, and the secure session could comprise a transport layer security (TLS) session such as TLS version 1.2, TLS version 1.3, or similar and subsequent standards. Other networking standards besides HTTPS and TLS could be utilized as well for secure session setup 214, such as an IPSec tunnel. As part of the setup of secure session setup 214, mobile handset 108 can receive a certificate cert.AS 111*c* from authentication server 111, if mobile handset 108 had not already received cert.AS 111*c* from discovery server 110. Mobile handset 108 could verify cert.AS 111*c* after receiving the certificate, such as verifying a signature from a certificate authority and parent certificates of cert.AS 111*c* as well.

In message 215, mobile handset 108 transmits authentication information to authentication server 111, and authentication server 111 verifies the authentication information in a step 217. The authentication information transmitted in a message 215 could comprise information to authenticate (i) configuration user 108*a*, (ii) mobile handset 108, or (iii) both configuration user 108*a* and mobile handset 108. The authentication information in message 215 may comprise a configuration user 108*a* entering identification and credential information in a touch screen of mobile handset 108, and the information is passed by mobile handset to authentication server 111. In exemplary embodiments, configuration user 108*a* provides biometric data such as a fingerprint, an image of the user's face, or similar data, where mobile handset 108 transmits the data through secure session setup 214 to authentication server 111, and the authentication server 111 verifies the biometric data is associated to configuration user 108*a*. Message 215 may also include the verification of mobile handset 108 with authentication server 111. In exemplary embodiments, mobile handset 108 records a certificate for mobile handset 108, where the certificate could be similar to the one depicted in FIG. 4*d* below. The certificate for mobile handset 108 includes a public key and a signature by a certificate authority. In an authentication step 217, authentication server can use the information in message 215 to verify the identity of a configuration user 108 and/or mobile handset 108. In embodiments where mobile handset 108 uses a device certificate for mobile handset 108, authentication server 111 could verify that mobile handset 108 also records the private key, by sending a challenge and verifying a signature from mobile handset 108 using the private key. Message 215 and authentication 217 could be conducted using authentication parameters 111*d*, which could be previously included in Config-provisioning.ID.device 212.

In step 216*a* of FIG. 2*a*, mobile handset 108 may also authenticate authentication server 111, using cert.AS 111*c*. In step 216*b*, configuration user 108*b* can enter device owner 122 information into mobile handset 108, such as an owner name, a DNS name associated with owner 122, or a code or other value to identify owner 122. Device owner 122 information could be automatically recorded for configuration application 108*b* before a configuration step 103 from FIG. 1*a*. The value or information associated with device owner 122 may also be acquired from monitored unit 106, for embodiments where device owner 122 also owns or is responsible for monitored unit 106. The value associate with device owner 122 could be ID.owner 122*a*. In another exemplary embodiment, device owner 122 information could be recorded in mobile handset 108 earlier than a step 216*b*, and the information could be fetched from memory in a step 216*b*. A step 216*b* can function to associate device 101 with device owner 122 for a configuration system 114 and/or reporting system 120. In exemplary embodiments, millions of devices 101 could be distributed out to thousands or more device owners 122, and configuration system 114 and reporting system 120, as well as device owner 122, may need to know which devices 101 have been configured and/or installed with monitored units 106.

In message 218, mobile handset 108 can send a first list of identities to authentication server 111 through the secure session setup in 214. The list of identities can include an ID.device 101*b*, ID.MH 108*e*, and ID.owner 122*a*, as depicted in FIG. 2*a*. In steps 219, authentication server 111 can process the list of identities received in message 218. A first sub-step 219*a* could comprise authentication server 111 verifying that mobile handset 108 with configuration user 108*a* is authorized to configure device 101. In other words, the prior step 217 could be an initial step to verify identities, and then the subsequent step 219*a* could be verifying that the authenticated identities have privileges or authorization to conduct a configuration step 103. As depicted in FIG. 2*a*, authentication server 111 may need to check or communicate with device owner 122 in order to confirm that mobile handset 108 with configuration user 108*a* is authorized to conduct configuration step 103 on device 101. Authentication server 111 can utilize the ID.owner 122*a* received in message 218 in order to identify and communicate with the correct device owner 122. Although not depicted in FIG. 2*a*, authentication server 111 could utilize a mutually authenticated secure channel such as TLS v3 with device owner 122 in a step 219*a* and 219*b*. In some exemplary embodiments, a step 219*a* could be optionally omitted, for example if device owner 122 is also device user 101*a*, such as a home owner installing a device 101 in their home. In these embodiments, an authentication step 217 may be sufficient to allow mobile handset 108 to conduct the configuration step 103. Other possibilities exist as well for an authentication server to authenticate a mobile handset 108 and/or configuration user 108*a* without departing from the scope of the present invention.

In step 219*b*, authentication server 111 can query device owner 122 for a certificate for secure processing environment 102 (SE 102), and the certificate could comprise cert0.SE 102*k* and cert0.SE 102*k'*, where cert0.SE 102*k* can record PK0.SE 102*n* and cert0.SE 102*k'* can record PK0.SE 102*n'*. Note that in some exemplary embodiments cert0.SE 102*k* can record two public keys for device 101 of both PK0.SE 102*n* and PK0.SE 102*n'*. The query could be made using ID.device 101*b*, which was previously received in message 218. Cert0.SE 102*k* could include ID.SE 102*m*, or ID.SE 102*m* could be received by authentication server 111 separately from cert0.SE 102*k*. In a different exemplary embodiment, the query in a step 219*b* could utilize ID-token.device 206, which could be (i) obtained by mobile handset 108 in read 203, and (ii) sent by mobile handset 108 in message 218. Cert0.SE 102*k* could also be a certificate for device 101 in some exemplary embodiments, where device 101 does not use separate certificates for the device and secure processing environment. If owner 122 does not record the certificate cert0.SE 102*k*, then for step 219*a* owner 122 could point authentication server 111 to another server or location for the certificate cert0.SE 102*k*, such as possibly device manufacturer 101*x*. In some exemplary embodiments, (i) a configuration system 114 could query another server associated with device 101 in order to obtain public key PK0.SE 102*n*, and (ii) the use of a cert0.SE 102*k* for recording the public key PK0.SE 102*n* is not required. Authentication server 111 could receive cert0.SE 102*k* in a step 219*b*. In another exemplary embodiment, authentication server 111 could record a plurality of certificates cert0.SE 102*k* for all devices 101 and in this embodiment then step 219*b* could represent querying a locally stored cert0.SE 102*k* with authentication server 111.

In step 220*a*, authentication server 111 can (i) create a random number random1.AS 223, and (ii) create a digital signature 224. The sub-steps for creating a digital signature are depicted in FIG. 2*b* below for a signature creation step 220. Exemplary details for authentication server 111 to create specifically create digital signature 224 in a step 220*a* are depicted and described in connection with FIG. 2*b* below.

Authentication server 111 can also conduct a step 220*b*, which comprises creating a digital signature 225 using the data received in step 219*b* above, such as the ID.SE 102*m*, where the digital signature 225 is a signature for the data of ID.SE 102*m* and a random1.AS 223. Step 220*b* is depicted in FIG. 2*b* below, and can include the data and steps for a signature creation step 220 equivalent to the step 220*a* for a signature creation. Although the use of two signatures 224 and 225 are depicted in FIG. 2*a*, where signature 224 can be used primarily by mobile handset 108 and signature 225 can be used primarily by device 101 and SE 102, the use of two separate signatures at step 220*a* and 220*b* can be optionally omitted. For example, a step 220*a* creating signature 224 to authenticate authentication server 111 with mobile handset 108 could be performed with a step 216*a* above.

As depicted in FIG. 2*a*, authentication server 111 can send mobile handset 108 a message 222 through secure connection 214, where message 222 can include ID.Device 101*b*, Random1.AS 223, Signature1.AS (ID.Device 101*b*, Random1.AS 223) 224, and Signature2.AS (ID.SE 102*m*, Random1.AS 223) 225. Although not depicted in FIG. 2*a*, a message 222 could also include cert0.SE 102*k*. Random1.AS 223 may comprise a pseudo-random number generated by authentication server 111 for message 222 and signature 224. Random1.AS 223 and other random numbers utilized by systems 100, 200, 300, and subsequent figures may preferably be unique, or with enough bits and information entropy that collisions or re-use would be sufficiently rare enough to be insignificant for the overall security of a system 100. Signature1.AS 224 is described in FIG. 2*b* below. Signature2.AS 225 was described in the paragraph above and also depicted in FIG. 2*b* below. Authentication server 111 could utilize authentication parameters 111*d* in the creation of data for message 222. Although not depicted in FIG. 2*a*, in exemplary embodiments, authentication server 111 could also include authentication parameters 111*d* for the data in signature1.AS 224 and signature2.AS 225, and in this manner authentication parameters 111*d* would be signed by authentication server 111.

In exemplary embodiments, ID.SE 102*m* is not sent either in encrypted format or as plaintext to mobile handset 108 from either (i) discovery server 110 or (ii) authentication server 111, or (iii) from other servers in a system 100. By not sending ID.SE 102*m* to mobile handset 108, ID.SE 102*m* can remain confidential, such that if mobile handset 108 is insecure and exposed to third parties, including hackers, ID.SE 102*m* can still remain confidential since it is not passed to mobile handset 108. Signature2.AS 225 (ID.SE 102*m*, random1.AS 223) is depicted in FIG. 2*b* below, and can comprise a signature by authentication server 111 over random1.AS 223 and ID.SE 102*m*.

At step 221*a* in FIG. 2*a*, mobile handset 108 can verify signature1.AS 224, where signature1.AS 224 can be over the values ID.device 101*b* and random1.AS 223. The substeps for verifying a digital signature are depicted in FIG. 2*b* below for a signature verification step 221, and the details for mobile handset 108 to verify digital signature 224 in a step 221*a* are depicted and described in connection with FIG. 2*b* below. ID.device 101*b* in message 222 can be useful to track that message 222 is properly received routed by authentication server 111 since both authentication server 111 and mobile handset 108 may connect with multiple different devices 101 over time. In step 221*a*, mobile handset 108 can take steps to verify that random1.AS 223 is unique and not reused by authentication server 111, such as checking random1.AS 223 with configuration system 114. In exemplary embodiments, authentication server 111 can create a signature 224 over a random number issued by mobile handset 108 instead of a random number generated by authentication server 111, which could be conducted in setup of secure session 214. Or, in preferred exemplary embodiments, authentication server 111 creates a signature 224 for both (i) a random number from mobile handset 108 in a step 216*a* and (ii) a random1.AS 223 in a step 220*b*. After conclusion of step 221*a* depicted in FIG. 2*a*, mobile handset 108, device 101, and the elements depicted in FIG. 2*a* could continue with the message flows and steps depicted in FIG. 3 below.

In an alternative exemplary embodiment to that depicted in FIG. 2*a*, discovery server 110 could be optionally omitted, and data within tag 101*s* or tag value 101*w* could specify authentication server 111 as well as data for Config-provisioning.ID.device 212. However, the use of a discovery server 110 can be preferred for some exemplary embodiments since a discovery server 110 could provide increased flexibility over the lifetime of device 101, which could be a decade or longer, since parameters Config-provisioning.ID.device 212 and related data could change over time. Including all data for config-provisioning.ID.device 212 in tag value 101*w* or tag 101*s* may reduce flexibility for changing or updating the data over time, such as specifying an updated configuration application 108*b*, or other updated data for configuration system 114 over time.

FIG. 2*b*

FIG. 2*b* is a flow chart illustrating exemplary steps for creating and verifying a digital signature using PKI keys, parameters, and data input, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

In FIG. 2b, signature creation 220 can comprise a step using the sub-steps of obtaining a message to sign, calculating a message digest 230, using a private key 226, using a signature algorithm 227, inputting parameters 111d, and calculating a resulting signature 224. The steps and substeps depicted for authentication server creating signature 224 in FIG. 2b can also be applied for the subsequent signatures depicted, including signature creation 220b through 220g.

Signature algorithm 227 and signature verification algorithm 228 could comprise an RSA-based digital signature algorithm (DSA) or an ECC based elliptic curve digital signature algorithm (ECDSA), and other possibilities exist as well for signature algorithm 227 and signature verification algorithm 228 without departing from the scope of the present invention. When using a DSA or ECDSA algorithm in non-deterministic mode for a signature creation 220, a value of "k" or "r", which could comprise a random number can be associated with the digital signature 224. When using a DSA or ECDSA in deterministic mode, such as specified in IETF RFC 6979 and titled "Deterministic Usage of the Digital Signature Algorithm (DSA) and Elliptic Curve Digital Signature Algorithm (ECDSA)", which are hereby incorporated by reference, then the requirement for a separately transmitted random number with digital signature 224 (such as value "k" or "r") can be optionally omitted, such that "r" can be deterministically calculated based on the message to sign. In exemplary embodiments, device 101 and servers such as authentication sever 111 can utilize deterministic ECDSA without also sending a random number along with a digital signature, although the value "r" from the deterministic mode could be sent with the digital signature 224. In other words, a value can be sent with the digital signature 224 that is deterministically derived and associated with the message to sign. In other exemplary embodiments, a random number can be generated a derived value for the random number such as "r" sent with digital signature 224.

For a signature creation 220a step, the exemplary message to sign comprises ID.device 101b and random1.AS 223. The message to sign values can be transmitted to the verifying party, such as shown for message 222 in FIG. 2a. The message to sign values can be input into a message digest algorithm 230, which could comprise a standard algorithm such as SHA-256, SHA-3, or similar algorithms. The output of message digest algorithm 230 can be input along with parameters 111d and private key 226 into signature algorithm 227. Parameters 111d can specify encoding rules, padding, key lengths, selected algorithms, curve names, and other values or fields necessary to utilize a signature algorithm 227. Both a signature creation step 220 and a signature verification step 221 use the same or equivalent values for parameters 111d. Private key 226 comprises a private key for authentication server 111. For the additional signature creation 220 instances depicted in FIG. 2b, such as signature creation 220b through 220g, the element or node creating the equivalent signature as signature 224 would utilize the private key of the element or node, such as SE 102 using a private key SK0.SE 102y' in a signature creation instance 220c. Although not depicted in FIG. 2b, a random number for values such as "k" and "r" for ECDSA and related signatures could be input as well into a signature algorithm 227. The output of a signature algorithm 227 can be a signature 224, which can be transmitted to another node for verification.

Signature verification 221 can comprise a step using the sub-steps of obtaining a message to verify, calculating a message digest 230, using a public key 228, using a signature verification algorithm 228, inputting parameters 111d and signature 224, and determining a pass/fail 229. If the signature 224 received matches a calculated signature with the public key 228 and message to sign, then the received signature 224 passes or is validated or verified. If the signature 224 does not match the calculated signature in a step 221, then the signature 224 is considered to fail or not be verified. The steps and substeps depicted for mobile handset 108 verifying signature 224 in FIG. 2b can also be applied for the subsequent signature verifications depicted, including signature verification 221b through 221g.

FIG. 3

FIG. 3 is a simplified message flow diagram illustrating an exemplary system with exemplary data sent and received by a mobile handset and a device, in accordance with exemplary embodiments. Before initiating steps and message flows depicted in FIG. 3, mobile handset 108, device 101, and the other elements depicted for system 300 in FIG. 3 may previously complete exemplary message flows and steps depicted in FIG. 2a above. System 300 can include a configuration server 112, authentication server 111, mobile handset 108, and device 101. Mobile handset 108 can communicate with authentication server 111 and configuration server 112 via IP network 128, as depicted in FIG. 2a. For system 300, configuration server 112 and authentication server 111 may establish a secure session setup 301, which could comprise establishing a secure communications link between the two servers using protocols such as TLS, IPSec, a virtual private network (VPN), a secure shell (SSH), or similar networking, transport, or application layer technologies in order to establish secure communications between configuration server 112 and authentication server 111. Secure session setup 301 can be equivalent or similar to secure session setup 214 depicted in FIG. 2a above.

Note that for some exemplary embodiments, a mobile handset 108 could be omitted, and device 101 and configuration system 114 (with authentication server 111 and configuration server 114) could communicate directly with device 101. For example, device 101 could use a radio such as a 4G or 5G radio or a Wi-Fi radio to communicate with configuration system 114 without using a mobile handset 108, and data session 303 could comprise a data session that includes WAN connectivity. For these embodiments, then the exemplary depicted messages sent or transmitted by configuration system of message 222 (from FIG. 2a), 312, etc. could be transmitted to device 101 instead of mobile handset 108. Further, messages sent or transmitted by device 101 of 307 and 314 could be sent to configuration system instead of mobile handset 108. However, for embodiments where device 101 does not have a configured WAN radio, then a system equivalent to system 200 and 300 could be preferred. Also, note that a different device than a mobile handset 108 could be used for establishing communication between device 101 and configuration system 114, and a Wi-Fi router or another node on a local wireless network could provide the same functionality of mobile handset 108 (where tag 101$s$ could be transmitted via the local wireless network).

Mobile handset 108 in system 300 can operate a running configuration application 108$b$ and an NFC radio 108$f$. Configuration application 108$b$ may previously be downloaded in a step 213 as depicted in FIG. 2$a$ and subsequently launched or activated for operation in a system 300. In exemplary embodiments, configuration application 108$b$ may be (i) included or distributed along with an operating system running on mobile handset 108$b$ or (ii) acquired at a different time than a step 213, and thus a separate download of configuration application 108$b$. NFC radio 108$f$ may comprise a radio equivalent or compatible with radio 102$c$ depicted for SE 102 in FIG. 1$b$ above. Although radio 108$f$ is depicted in FIG. 3 as a "Near Field Communications" (NFC) radio, in alternative embodiments a different radio than NFC could be utilized, such as a radio operating at ISM bands of 900 MHz, 2.4 GHz, 5.8 GHz, or other radio frequencies allowing unlicensed access at low powers such as less than 1 watt of transmitted radio power. As depicted in FIG. 3, device 101 can include a secure processing environment (or "secure enclave" or "secure element") SE 102 which may also have a NFC radio 102$c$, thereby enabling communication at short range between mobile handset 108 and device 101. In some exemplary embodiments, SE 102 may be connected with NFC radio 102$c$ and NFC radio 102$c$ may be external to SE 102, but in preferred exemplary embodiments NFC radio 102$c$ may be inside device 101.

At step 302 in FIG. 3, device 101 may power on from an unpowered or "deep sleep" state. Power could be provided from a battery or converted "wall power". Device 101 could load portions of OS 101$e$ from storage 101$f$ into RAM 101$d$. SE 102 could load SE bootload firmware 102$t$ and SE boot configuration 102$v$, and then SE firmware from SE memory 102$x$. In exemplary embodiments where SE 102 has sufficient storage memory to record SE firmware and an operating system for SE 102 in SE flash memory 102$d$, then SE firmware could be loaded from SE flash memory 102$d$ instead of SE memory 102$x$. In exemplary embodiments, SE memory 102$x$ within device memory 101$f$ is encrypted with symmetric key 102$z$.

Mobile handset 108 and SE 102 can establish an NFC session setup 303 for peers and "peer-to-peer mode". Either Mobile handset 108 or SE 102 could initiate the session once the two sides are sufficiently close for the radios to communicate. In exemplary embodiments, a screen on mobile handset 108 instructs configuration user 108$a$ to place the mobile handset near device 101 or next to a target location on device 101 that would cover an antenna for SE radio 102$c$. In a first exemplary embodiment, NFC radio 108$f$ in mobile handset 108 is the transceiver that initiates polling and in the "initiator" of NFC session setup 303. For this first exemplary embodiment SE radio 102$c$ in SE 102 comprises the target and initially listens for polling from NFC radio 108$f$. In a second exemplary embodiment, SE radio 102$c$ for SE 102 is the transceiver that initiates polling, and is the "initiator" of NFC session setup 303. After negotiating polling, NFC session setup 303 can utilize protocols for either NFC-A or NFC-F to establish a bi-directional communications channel, or subsequent and related versions of these standards. NFC-A is specified in NFC Forum-TS Digital Protocol-1.0, which is hereby incorporated by reference and provides a communications channels at baud rates of 106 kbps.

In exemplary embodiments NFC-F is utilized to provide baud rates higher than 106 kbps, such as 212 or 424 kbps. The air interface for NFC session setup 303 could comprise a session using ISO/IEC 18092/ECMA-340, "Near Field Communication Interface and Protocol-1" and ISO/IEC 21481/ECMA-352, "Near Field Communication Interface and Protocol-2 (NFCIP-2)". The air interface for NFC session setup 303 could also comprise subsequent or related versions to these standards. Data between mobile handset 108 and SE 102 could be transferred using NFC Data Exchange Format (NDEF) and support a Multipurpose Internet Mail Extensions (MIME) typed object or file transferred from mobile handset 108 to SE 102. In other words, subsequent messages and files transferred using NFC radios could utilize NDEF and MIME objects, although other possibilities exist as well for the NFC standards utilized without departing from the scope of the present invention. NFC session setup 303 could also implement additional air-interface security, such as ECMA-409 2nd edition—NFC-SEC-02: NFC-SEC and related standards, where the air interface is encrypted using AES and Diffie-Hellman key exchanges. In exemplary embodiments, NFC session setup 303 utilizes standard ECMA-352 in order to select ECMA-340, ISO/IEC 14443 and ISO/IEC 15693 as a communication mode between radio 108$f$ and radio 102$c$.

At step 304 in FIG. 3, after successful setup of NFC session setup 303, configuration application 108$b$ in mobile handset 108 could display to configuration user 108$a$ that a communication link with SE 102 has been established. The display could be notification that authentication data can be transferred with SE 102, such as the data through the physical layer and data link layer of NFC radio 108$f$ is enabled. Step 304 could also display error conditions or codes to configuration user 108$a$, for cases where NFC session setup 303 fails for exemplary reasons such as no NFC radio 102$c$ detected, incompatible radio protocols, too many collisions, too weak an RF signal or RSSI, etc. Note that in an exemplary embodiment, secure session setup 214 may be temporarily disabled or unavailable (such as mobile handset 108 moves outside of range of a mobile network providing connectivity to authentication server 111). In this case, the values subsequently transmitted in message 305 and received in message 307 could be stored in mobile handset 108 until they can be transmitted from mobile handset 108. In this manner, if device 101 is located in a place without an access network 126, such as in a basement of a building where nearby land mobile networks cannot reach, then mobile handset 108 can take subsequent steps such as step 305 while mobile handset 108 is in an offline mode for access network 126.

In message 305, mobile handset 108 can send SE 102 data comprising certificate cert.AS 111$c$, random number Random 1.AS 223, authentication parameters Auth.Params. 111$d$, and signature Signature2.AS (ID.SE, Auth.Params. 111$d$, Random 1.AS) 225. These values could be previously received and recorded by mobile handset 108 during the prior communication depicted and described in connection with FIG. 2$a$ above. Although not depicted in FIG. 3, mobile handset 108 could also send other exemplary data in a message 305 than that depicted, including parent certificates for cert.AS 111$c$, version number 108$d$, ID.device 101$b$, and/or ID.mobile-handset 108$e$. In exemplary embodiments, message 305 is transmitted without receipt of network, transport, or application layer data from SE 102, and SE 102 remains "quiet" or does not communicate data at the network, transport, or application layer with mobile handset 108 until after successfully receiving a message 305. In other words, although SE 102 may communicate at the data-link layer, such as transmitting values related to polling the NFC link, encryption of the radio air-interface for session 303, SE 102 does not respond to mobile handset 102 with application data until after message 305 has been properly received. In this manner, SE 102 would (i) remain silent or idle to a mobile handset 108 or other NFC radios without receiving a verified message 305 and thus (ii) resistant to tampering or probing by radios or handsets that have not established an authenticated session with authentication server 111.

Although not depicted in FIG. 3, in an exemplary embodiment a signature2.AS 225 could also be over an initial random number for SE 102 or device 101, which would be different than, in addition to, or in replace of the value random1.AS 223 for a signature 2.AS 225. The initial random number for SE 102 could be (i) recorded in the tag 101s depicted and described in FIG. 2a, or (ii) recorded by owner 122 such that authentication server 111 could query owner 122 in a step 219a as depicted in FIG. 2a above, or (iii) recorded with date in Config-provisioning.ID.device 212. The initial random number for SE 102 could also be recorded in memory 102d or memory 102j for SE 102 and created by a device manufacturer 101x. In this manner, the initial random number for SE 102 can be generated outside authentication server 111 and included in a signatue2.AS 225. Security can be increased since authentication server 111 can be required to sign a number that was both (i) not generated by authentication server 111 and (ii) recorded in device 101 before a configuration step 103 or step 203.

In step 306a, SE 102 can receive the message 305 via the NFC session 303 and record the data in RAM 102b or storage 102d. In step 306a, SE 102 can also verify cert.AS 111c using either (i) cert.CA1 115 directly, and/or (ii) a commonly shared certificate cert.CA.root 109 shared between SE 102 and authentication server 111. In other words, in exemplary embodiments and before a configuration step 103, SE 102 records in nonvolatile memory either (i) cert.CA1 115 or (ii) cert.CA.root 109, where a parent certificate for cert.AS 111c can be checked with cert.CA.root 109. As described in connection with FIG. 2b above, SE 102 could verify the certificate for cert.AS 111c using a signature verification step 221.

After a step 306a, SE 102 can conduct a step 221b depicted in FIG. 2b in order to verify signature 225. In exemplary embodiments, signature 225 can be over ID.SE 102m, random1.AS 223, and authentication parameters 111d, where (i) random1.AS 223 and authentication parameters 111d are received by SE 102 in a message 305 above and (ii) ID.SE 102m may optionally be not transmitted by mobile handset 108 but rather recorded by SE 102 in nonvolatile memory before configuration step 103. In this manner, SE 102 can receive a signature 225 for data (a) that has not been transmitted by SE 102 (e.g. ID.SE 102m, or optionally the initial random number for SE 102 described two paragraphs above), and also (b) mobile handset 108 would need to communicate with configuration system 114 in an authenticated manner in order to receive signature 225. In another exemplary embodiment, authentication parameters 111d may be optionally omitted from signature 225, such as both (i) not being included in the "message to sign" in signature creation 220 in FIG. 2b and (ii) not being included in the "message to verify" in signature verification 221 in FIG. 2b. However, including authentication parameters 111d in signature 225 may increase security for SE 102.

Although the use of an ID.SE 102m is depicted as being utilized for signature 225 received from mobile handset 108 and authentication server 111 (in FIG. 2a above), other data recorded by SE 102 and not previously transmitted by SE 102 to mobile handset 108 could be utilized as well for the signature 225, such as an authentication token recorded in nonvolatile memory of SE 102. The authentication token could also comprise the initial random number for SE 102 described three paragraphs above. In other words, in a different embodiment than that depicted in FIG. 3, for a message 305 SE 102 could receive a signature 225 over the authentication token recorded in nonvolatile memory of SE 102, where (i) SE 102 has not transmitted the authentication token, but (ii) configuration system 114 could receive the authentication token from device manufacturer 101x or device owner 122. By receiving a signature 225 over data recorded in nonvolatile memory of SE 102 and not transmitted by SE 102, SE 102 can be reasonable assured that mobile handset 108 has authenticated and secured communication with configuration system 114.

In step 306b, SE 102 may use a random number generator 102e from FIG. 1b to create a random number random1.SE 308, which could comprise a challenge or nonce in order to authenticate configuration system 114. As depicted in FIG. 3, SE 102 may then conduct a step 220c from FIG. 2b in order to create a signature 309 for random1.AS 223 using the initial secret key SK0.SE 102y' as the private key for signature 309 creation. Signature 309 could also be over additional data than random1.AS 223, such as random1.SE 308, although this alternative embodiment is not depicted in FIG. 3. Further, SE 102 could send separate signatures 309 such as a first signature 309 over random1.AS 223 and a second signature 309 over random1.SE 308. SE 102 may then return a message 307 though NFC session 303 to mobile handset 108, where message 307 can include random1.SE 308 and signature 309, where signature 309 can be over at least random1.AS 223. Although not depicted in FIG. 3, message 307 can also optionally include an identity for device 101 and the value of PK0.SE 102n, in order for a configuration system 114 to use with subsequent communications with device 101.

At step 310, mobile handset 108 can receive message 307 and display to configuration user 108a that application-layer data has been successfully transferred with SE 102. In other words, a first display progress indicator could be shown for configuration user 108a when NFC session setup 303 was completed, and a second display progress indictor for configuration user 108a could be shown when message 307 is received. The receipt of message 307 may indicate that message 305 was successfully received and properly processed by SE 102. For embodiments where mobile handset 108 records ID.SE 102m, mobile handset 108 could request for a cert0.SE 102k from SE 102, owner 122, or configuration system 114 before a step 310, and then authenticate signature 309 in a step 310 using the cert0.SE 102k. However, authentication of signature 309 by mobile handset 108 is not required in some exemplary embodiments. For embodiments where mobile handset 108 does not have access to access network 126 at the physical location of device 101, then mobile handset 108 could record the data from message 307 in memory and transmit the data to authentication server 111 at a later time when communication with access network 126 was re-established, such as when a mobile network comes back into range for mobile handset 108.

After a step 310, mobile handset 108 can send authentication server 111 a message 311, where message 311 can include ID.device 101b, random1.SE 308, and signature 309 over random1.AS 223. Message 311 could be transmitted over a secure session 214 depicted in FIG. 2a above. For embodiments where device 101 sends PK0.SE 102n in a message 307, then mobile handset 108 can also send PK0.SE 102n in a message 311. Authentication server 111 can previously maintain a mapping of ID.device 101b and ID.SE 102m based upon the prior steps in FIG. 2a above, such as when sending message 222. In addition, authentication server 111 can record authentication parameters 111d for authentication steps with device 101 and SE 102. In other words, a first set of authentication parameters 111d could be used with a first set of devices 101 and a second set of authentication parameters 111d could be use with a second set of devices 101. Authentication server 111 could also record cert0.SE 102k Authentication server could conduct a step 221c depicted in FIG. 2b in order to verify signature 309 using the PK0.SE 102n' recorded within cert0.SE 102k or cert0SE 102k'. Step 221c may comprise an authentication step for SE 102, such that an identity for SE 102 is verified with configuration system 114 using a "passed" 229 signature 309, since signature 309 was over the random number or "challenge" issued by authentication server 111 in random1.AS 223. In exemplary embodiments, random1.AS 223 is unique and with a sufficient length in order to reduce the possibility of reuse, such as an exemplary length of 32 or 64 bytes, and other possibilities exist as well.

Authentication server 111 may then utilize random1.SE 308 to create signature3.AS (random1.SE 308) 313. Signature3.AS 303 over random1.SE 308 could utilize a signature creation step 220d as depicted in FIG. 2b. Signature3.AS 313 can comprise the signature by authentication server 111 for the random number or challenge issued by SE 102 in order to SE 102 to authenticate configuration system 114. Authentication server 111 can send mobile handset 108 a message 312 with signature3.AS 313, where signature3.AS 313 was created in step 220d. Mobile handset 108 can then send SE 102 a message 314, where message 314 can include the signature3.AS 313 over random1.SE 308. SE 102 can receive the message 314 over the radio 102c and verify the signature3.AS 313 using a step 221d as depicted in FIG. 2b. SE 102 could input (i) the value for random1.SE 308 issued by SE 102 above into the "message to verify" in a signature verification 221 step and also input (ii) the public key recorded in certificate cert.AS 111c in order to verify signature3.AS 313. When signature3.AS 313 is verified by SE 102, then authentication server 111 and associated configuration network 114 can be authenticated with SE 102, since authentication server 111 was able to properly sign the random challenge issued by SE 102.

Upon successful verification of signature3.AS 313 in a step 221d, SE 102 can send mobile handset 108 an "OK" message in message 316 or other error code. Although not depicted in FIG. 3, SE 102 could optionally send along with the "OK" a second random number random2.SE generated by random number generator 102e in SE 102. Random2.SE could be utilized by configuration system 114. In exemplary embodiments, SE 102 could also send additional configuration data for SE 102 along with the OK, such as an updated set of authentication parameters 111d, information about device 101 that is recorded by SE 102, and other possibilities exist as well for data that SE 102 sends after successfully conducting a step 221d. Mobile handset 108 can also forward the "OK" and optional additional information to authentication server 111. After the mutual authentication depicted in FIG. 3, authentication server 111 can then send a message 317 to configuration server 112 the ID.device 101b, ID.mobile-handset 108e, and random1.SE 308. In an alternative exemplary embodiment, message 317 could include random2.SE instead of random1.SE 308, where random2.SE was described above in this paragraph. Configuration server 112 may then perform a step 318 to record that (i) device 101 with ID.device 101b and (ii) mobile handset 108 with ID.mobile-handset 108e are authenticated for configuration system 114. Message 317 could also optionally include encryption or session keys for previously established secure communications with mobile handset 108, such that the encryption or session keys could be reused from a secure session 214.

As depicted in FIG. 3, mobile handset 108 using configuration application 108b can conduct a step 319 to collect an identity list 320, where identity list 320 comprises a list of identities for elements of systems 100, 200, and 300 around or nearby to device 101 and monitored unit 106. Identity list 320 can include a networks available list 322. In order to conduct a step 319, mobile handset 108 may need to temporarily disconnect from an access network 126, such as a mobile phone network, in order to perform a full frequency scan of all available mobile network operators and network access technologies around device 101 in order to collect a networks available list 322. The networks available list 322 can be useful for configuration system 114 to select the best or a preferred access network 126 from the networks available list 322. As depicted in FIG. 3, a networks available list 322 can also include the access technology available from a plurality of access networks 126 around device 101, such as 2G, 3G, 4G LTE, 5G, Wi-Fi, NB-IoT, LPWAN, etc. In exemplary embodiments, the networks available list 322 of surrounding wireless networks also includes an associated RF signal strength for each, such as RSSI as well as a frequency band, frequency list in MHz, or RF channel for each surrounding wireless network.

A step 319 may also comprise mobile handset 108 collecting a list of identities for monitored units 106 and transducers 105 for device 101, and include the identities in the identity list 320. In exemplary embodiments, a step 319 in FIG. 3 may comprise mobile handset 108 scanning for a bar code or QR code on each of the monitored units 106 and transducers 105 in order to collect an identity for each. Mobile handset 108 could also or alternatively take a picture and record the picture for each monitored unit 106 and transducer 105. The picture for monitored unit 106 and transducer 105 could be processed by mobile handset 108 or configuration system 114 in order to identify monitored unit 106 and transducer 105. The identity of owner 122 for device 101 could be entered by the user in a screen or previously acquired by mobile handset 108, such as with a set of configuration parameters config-provisioning.ID.device 212. Further, mobile handset 108 can preferably obtain (i) geographical coordinates for a data field location.device 325 or (ii) estimated geographical coordinates for the physical location of device 101. In exemplary embodiments, mobile handset 108 can have a GPS or similar receiver for outdoor location, or use Wi-Fi or Bluetooth for approximate indoor locations, and record the location in location.device 325. Although step 319 to collect an identity list 322 for device 101 is depicted as after receiving message 316 (confirming mutual authentication between SE 102 and authentication server 111), step 319 to collect an identity list 322 could be conducted at other times, such as before FIG. 3 or after a configuration user 108a takes mobile handset 108 to the approximate physical location for installation or configuration of device 101.

As depicted in FIG. 3, configuration server 112 and mobile handset 108 could then establish a secure session setup 321 between the two nodes. Secure session setup 321 could comprise establishing a secure communications link using protocols such as TLS, datagram transport layer security (DTLS), IPSec, a virtual private network (VPN), a secure shell (SSH), or similar networking, transport, or application layer technologies in order to establish secure communications between configuration server 112 and mobile handset 108. Secure session setup 321 could utilize information received by configuration server 112 in message 317 above, such as existing encryption or session keys or certificates for mobile handset 108 from a session 214 (where authentication server 111 and configuration server 112 in turn have a secure session established of session 301). In exemplary embodiments, secure session setup 321 includes mutual authentication for both sides, and may include the transfer of a certificate from each side to the other side. After secure session setup 321, mobile handset 108 can send configuration server 112 a ciphertext.MH 323, where the plaintext inside ciphertext.MH 323 can include the identity list 320 collected by mobile handset in a step 319 above and an exemplary identity list 320 is depicted in FIG. 3. In this manner, a plurality of identifying information regarding device 101 and its operating environment can be securely transferred to configuration server 112.

Configuration server 112 could conduct a step 324 to decrypt and record the identity list 320 received in cipher-text.MH 323. In exemplary embodiments, configuration server 112 records the data from identity list 320 for device 101 in a configuration database 112b as depicted in FIG. 1a. The identity list 320 recorded in a step 324 can be utilized in subsequent steps in order to configure device 101 to use transducers 105 with monitored unit 106. Step 324 may also comprise configuration system 114 notifying device owner 122 that SE 102 has been mutually authenticated and identity list 320 has been received. Step 324 could also comprise configuration system 114 (i) processing networks available list 322 in order to select a preferred access network 126 for device 101, and (ii) querying the selected access network 126 for network access credentials 126a for use with the selected access network 126.

FIG. 4a

Figure 4A:
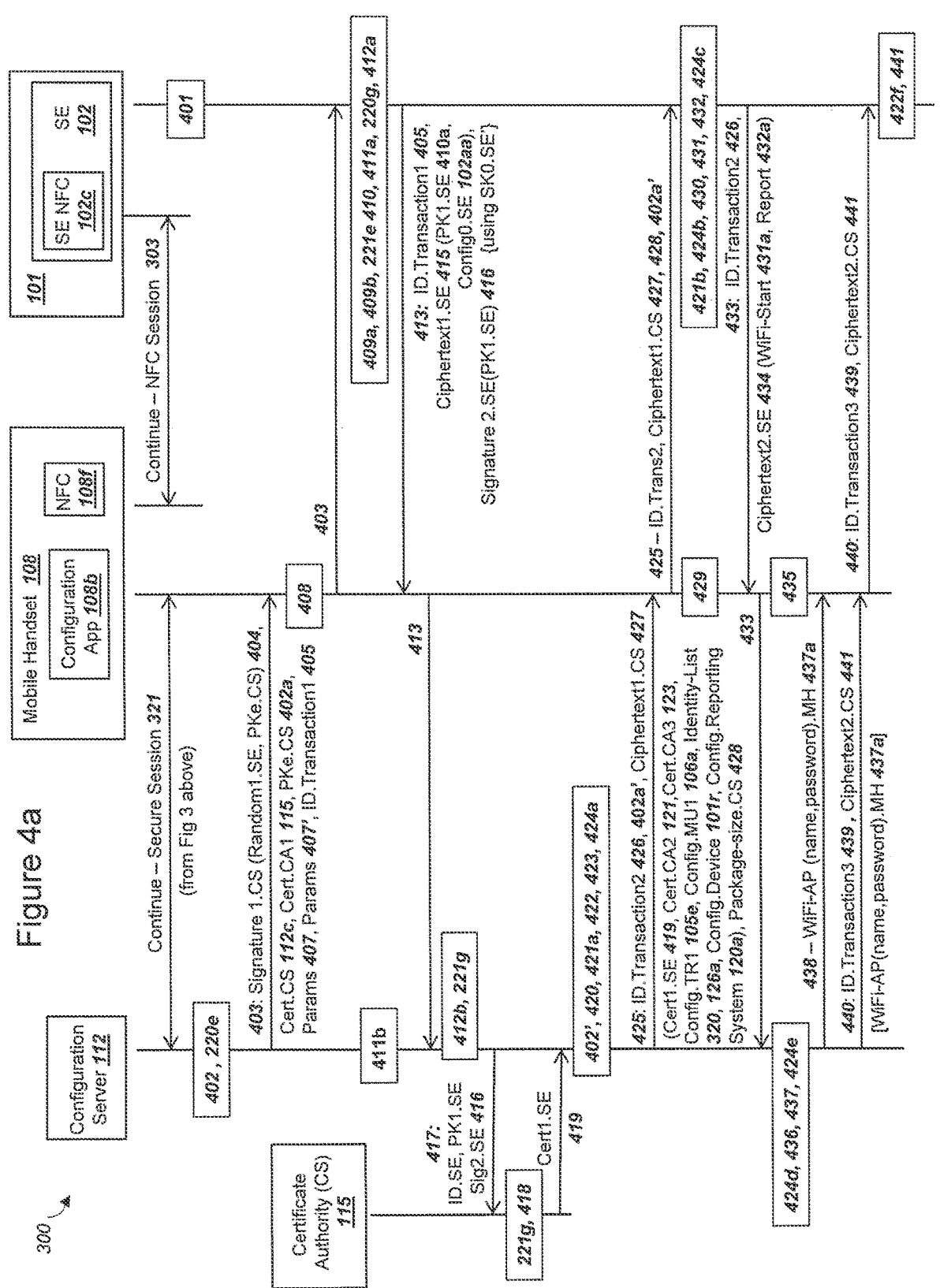
FIG. 4*a* is a simplified message flow diagram for an exemplary system with exemplary data sent and received by a mobile handset and a device, in accordance with exemplary embodiments.

FIG. 4a is a simplified message flow diagram illustrating an exemplary system with exemplary data sent and received by a mobile handset and a device, in accordance with exemplary embodiments. Before initiating steps and message flows depicted in FIG. 4a, mobile handset 108, device 101, and the other elements depicted for system 300 in FIG. 4a may previously complete exemplary message flows and steps depicted in FIG. 3 above. System 300 can include a configuration server 112, mobile handset 108, and device 101. An exemplary difference between system 300 depicted in FIG. 3 and system 300 depicted in FIG. 4a can be the authentication steps with authentication server 111 have been completed and thus no additional message flows with authentication server 111 are depicted in FIG. 4a. In other words, authentication server 111 from system 300 in FIG. 3 may also be in system 300 in FIG. 4a, but without any additional messages flowing to or from authentication server 111. Mobile handset 108 can communicate with configuration server 112 via IP network 128, using secure session 321 from FIG. 3 above. Mobile handset 108 and SE 102 in device 101 can communicate using NFC session 303, which was also depicted and described above in connection with FIG. 3 above.

At step 401, SE 102 can record authentication server 111 has successfully completed authentication above in a step 221d, in addition to a step 221c where SE 102 has successfully completed an authentication with authentication server

111. A step 401 could also include SE 102 authenticating mobile handset 108 before proceeding to subsequent steps depicted in FIG. 4a and FIG. 4b. SE 102 could request that mobile handset 108 successfully sign a random number such as random1.SE 308 for a signature creation step 220, where SE 102 could verify the signature of random1.SE 308 (or another random number from SE 102) using a signature verification step 221. For this step 401 where mobile handset 108 is authenticated with SE 102, then SE 102 could request a certificate for mobile handset 108, where the certificate authority for the certificate of mobile handset 108 can be verified using an existing certificate stored in SE 102, such as cert.CA1 115 or cert.CA.root 109. A step 401 could also comprise SE 102 utilizing Domain Name System Security Extensions (DNSEC) in order to verify domain names associated with configuration system 114. SE 102 could send DNS requests with associated security extensions to mobile handset 108, which could forward the requests to access network 126 to resolve the DNS requests and provide associated security data such as certificates for DNS servers.

At step 401, SE 102 can also wait for additional signatures of random1.SE 308 from other servers besides authentication server 111 in order to authenticate the other servers, such waiting for a signature of random1.SE 308 or random2.SE (with message 316) from a configuration server 112. In addition, SE 102 can record all used random numbers in nonvolatile memory such as SE flash memory 102d or storage memory 102y, in order to verify that random numbers are not reused and thus increase resistance to replay attacks. A device 101 with SE 102 could also store or record a second set of parameters 407', potentially different than a first set of parameters 407, where device 101 could use the second set of parameters 407' to derive PKI key pairs below such as in a step 410.

Figure 5:
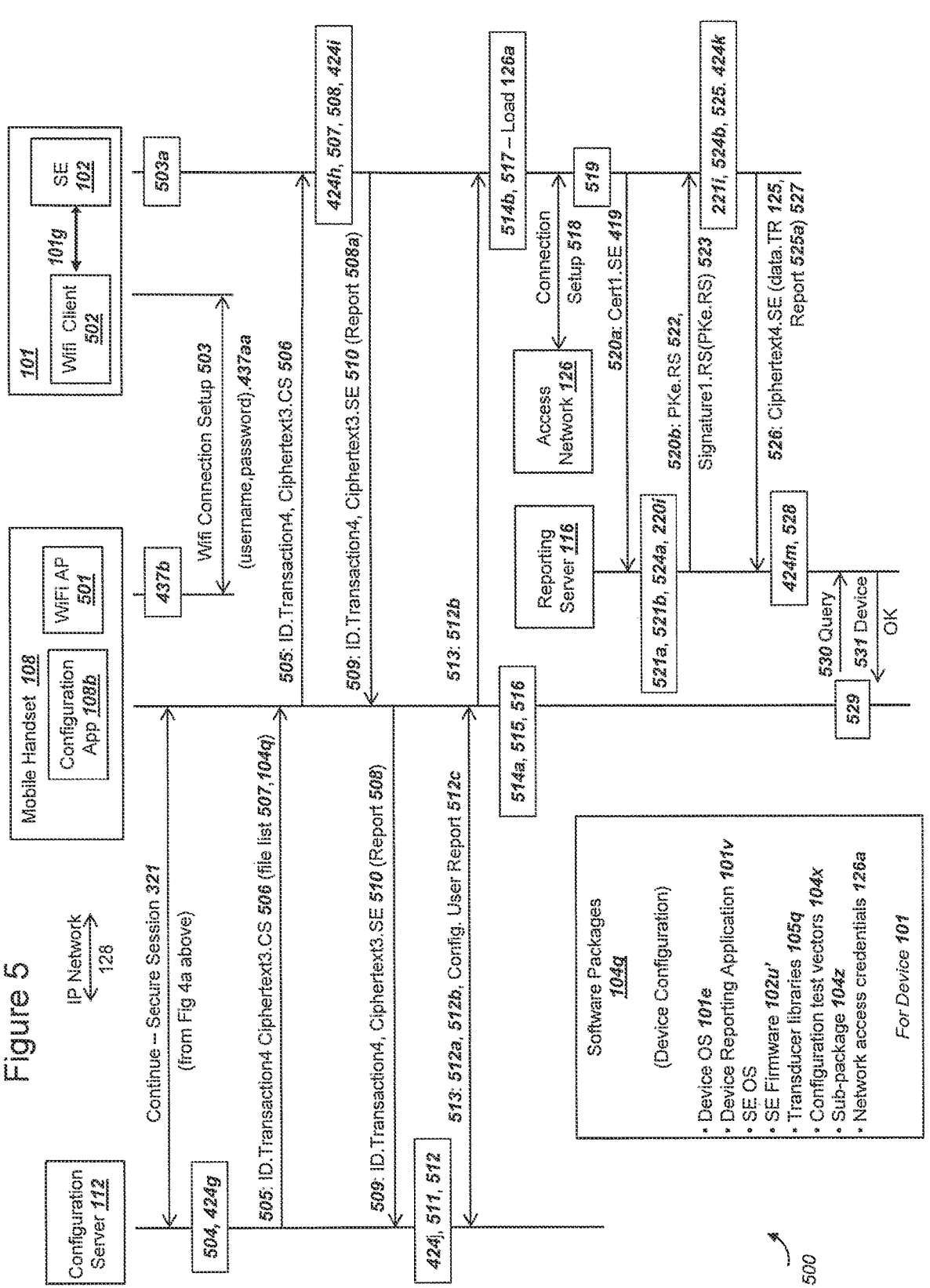
FIG. 5 is a simplified message flow diagram for an exemplary system with exemplary data sent and received by a mobile handset and a device, in accordance with exemplary embodiments.

At step 402, configuration server 112 can query a configuration database 112a for a set of parameters 407 supported by SE 102. In a system 100 and 300 which supports thousands or more devices 101 and also potentially dozens or more different models manufactures 101x for device 101, then potentially different sets of parameters 407 could be utilized or compatible for different devices 101. A first set of parameters 407 could include or be associated with a second set of parameters 407', and parameters 407' can be used with subsequent keys derived or selected by device 101 for future communications after completion of the steps depicted in FIG. 4a. For example, parameters 407' could be used by device 101 with an access network 126 or reporting server 116 as depicted in FIG. 5 below. An exemplary "large" device 101 such for an automobile may support PKI key parameters for RSA algorithms with associated longer keys and greater processor requirements (such as exemplary PKI keys of length 2048 or 4096 bits), while an exemplary "small" device 101 controlling a lock on a door could support PKI key parameters for ECC algorithms with lower processor requirements (such as an exemplary PKI key length of 256 bits). Configuration server 112 could utilize ID.device 101b or ID.SE 102m in order to query any of (i) configuration database 112a, (ii) device manufacturer 101x, or (iii) device owner 122 in order to obtain a set of parameters 407 compatible for device 101 and SE 102. ID.device 101b could be obtained from a message 211 depicted in FIG. 2a. At step 402, configuration server 112 could also utilize ID.device 101b or ID.SE 102m in order to query any of (i) configuration database 112a, (ii) device manufacturer 101x, or (iii) device owner 122 for PK0.SE 102n and PK0.SE 102n'. Note that configuration system 114 using authentication server 111 could receive PK0.SE 102n and PK0.SE $102n'$ in conjunction with a step $219a$ in FIG. $2a$, where authentication server 111 could query another server or node in a system 100 or a database with data received from the tag $101s$.

In some exemplary embodiments, configuration server 112 reads a set of parameters $102p$ from a certificate cert0.SE $102k$ and selects parameters 407 that are compatible or identical to parameters $102b$. In other words, if certificate cert0.SE $102k$ has a public key PK0.SE $102n$ with an ECC public key based on a secp256r1 curve with length 256 bits, then in a step 402 configuration server 112 can determine that a set of parameters 407 should specify an ECC key pair for the secp256r1 curve with length 256 bits. Or a step 402 could comprise configuration server selecting a subset of authentication parameters $111d$ from FIG. $2a$. Preferred exemplary embodiments in the present invention support the use of parameters 407 that are different from parameters $111d$ or parameters $102p$, since (i) parameters $102p$ may be selected by a device manufacturer $101x$, but (ii) device owner 122 may desire a different set of parameters 407 be used for device 101 after a configuration step 103 (e.g. different ECC curve names or key lengths or certificate expiration dates or different certificate authorities to sign public keys, etc.)

Note that configuration server 112 could select a first set of parameters 407 for use with PK0.SE $102n$ and/or PK0.SE $102n'$, and a second set of parameters $407'$ (such as with different curves or key lengths) could be used with a second public key for device 101 such as PK1.SE $410a$. Parameters $407'$ could also specify cryptographic algorithms that are different than classical ECC algorithms, such as algorithms for lattice-based cryptography, code-based cryptography, or supersingular isogeny based cryptography, and other possibilities exist as well. Example possible algorithms for parameters $407'$ include those described in "Post-Quantum Cryptography Standardization" from Wikipedia dated Mar. 12, 2019, which is herein incorporated by reference.

Continuing at step 402, configuration server 112 can derive an ephemeral public key PKe.CS $402a$ and an associated secret key SKe.CS $402b$, using a random number, a key pair generation function, and the set of parameters 407, where obtaining the set of parameters 407 were discussed in the paragraph above. In addition, although PKe.CS $402a$ and SKe.CS $402b$ are described above as "ephemeral" keys, the keys could comprise long-term keys. Further, PKe.CS $402a$ and SKe.CS $402b$ could be derived by another server associated with a configuration system 114 and transferred to configuration server 112 before a step 402. Configuration server 112 can utilize a random number generator similar to hardware random number generator $102e$ in FIG. $1b$ in order to derive the random number and input the random number into the key pair generation function. A key pair generation function could be included in application software running on configuration server 112 or an associated server of configuration system 114, and exemplary software for key pair generation algorithm can comprise OpenSSL, crypto++, or Mozilla libraries from Network Security Services. Other possibilities exist as well for libraries or software for elements of a system 100 or system 300 to derive a PKI key pair. Parameters 407 may specify algorithms and values associated with the PKI key pairs and their use, such as the exemplary parameters 407 depicted in FIG. $4d$ below. Parameters 407 and $407'$ can specify elliptic curve names (e.g. MST P-256, sect283k1, sect283r1, sect409k1, sect409r1, etc.), key lengths, a duration for key validity, uses of the PKI key pair such as for key derivation, signatures, encoding rules, message digest algorithms, etc. Parameters 407 and $407'$ may also include identifying information associate with the PKI key pair such as a sequence number, a serial number, a domain name of the server or element deriving or using the PKI key pair. Other possibilities exist as well for data in a set of parameters 407 without departing from the scope of the present invention.

At step $220e$ in FIG. $4a$, configuration server 112 can use a signature creation 220 algorithm as depicted in FIG. $2b$ above in order to create a signature signature1.CS (random1.SE 308, PKe.CS $402a$) 404. Note that a signature 404 could also be over parameters 407 and/or parameters $407'$ as well. In other words, configuration server 112 can sign both (i) the random challenge from SE 102, where authentication server 111 also previously signed the same random challenge, and (ii) the public key PKe.CS $402a$ generated above in step 402. The signature1.CS 404 can utilize a long-term private key for CS 112 corresponding to a public key in a certificate cert.CS $112c$. Although not depicted in FIG. $4a$, for embodiments where SE 102 sends a second random number random2.SE with the "OK" message in message 316, signature1.CS 404 could be over random2.SE instead of over random1.SE 308. For embodiments where authentication server 111 and configuration server 112 are combined into the same server or "cloud"-based service or network such as a configuration network 113 in FIG. $1a$, then step $220e$ with the associated signature1.CS 404 could be omitted. A step $220e$ in FIG. $4a$ could comprise configuration server 112 also including parameters 407 and/or parameters $407'$ in the "message to sign" for signature1.CS 404. For embodiments where authentication server 111 and configuration server 112 are combined, the IP address utilized by configuration system 114 for message 312 above and message 403 herein could be the same IP address. The use of separate servers for configuration server 112 and authentication server 111 can increase security and scalability for large networks with tens of thousands or more devices 101 for some embodiments.

Configuration server 112 can then send mobile handset 108 a message 403, where message 403 can include or comprise the signature 1.CS (Random1.SE, PKe.CS) 404, a certificate cert.CS $112c$, a certificate authority certificate cert.CA1 115, PKe.CS $402a$, parameters 407, parameters $407'$ and ID.Transaction1 405. Parameters $407'$ in message 403 could be omitted if device 101 records parameters $407'$ before a message 403, such as described above with a step 401. In other words, either a configuration system 114 or a device 101 can specify the parameters $407'$ which could be used in a subsequent step 410 with a SK1.SE and PK1.SE. Although not depicted in FIG. $4a$, message 403 could also include additional parent certificates for cert.CA1 115, such that SE 102 could verify the certificates with a certificate stored in SE 102. In exemplary embodiments, configuration database $112a$ includes the certificates recorded by SE 102 such that configuration server 112 can determine if any parent certificates for cert.CA1 115 are required in order to be verified up through a root certificate recorded in SE 102. In exemplary embodiments, configuration system 114 can (A) query device manufacturer $101x$ or device owner 122 in system 100 using ID.SE $102m$ or ID.device $101b$ for a list of certificates recorded by SE 102 in order to (B) include certificates in message 403 where the public key for a certificate authority matches the public key installed and recorded by SE 102. ID.Transaction1 405 can comprise a preferably unique transaction identity or session identity, such that configuration server 112, mobile handset 108, and SE 102 can track the flows of data and messages between the elements.

At step 408, mobile handset 108 can receive the message 403 using configuration application 108*b*. Note that message 403 may be transmitted between mobile handset 108 and configuration server 112 using secure session 321 and the data in message 403 may be transmitted as a ciphertext. Mobile handset 108 can optionally verify the signature signature1.CS 404 using a signature verification 221 depicted in FIG. 2*b*, although verification by mobile handset 108 may not be required because mobile handset 108 can utilize secure session 321 for communication with configuration server 112. After step 408, mobile handset 108 can transmit message 403 with the data described in the paragraph above to SE 102 using NFC session 303, as depicted in FIG. 4*a*. In exemplary embodiments, the data within message 403 (such as the data depicted in message 403 from configuration server 112 to mobile handset 102) can be sent over the NFC session 303 link, where the message 403 over the NFC session 303 can be formatted according to the data-link layer of NFC session 303. Further a subset or superset of the data for message 403 received by mobile handset 108 could be in message 403 transmitted by mobile handset 108.

At step 409*a* SE 102 can receive message 403 and record values from message 403 into both volatile memory RANI 102*b* and storage 102*d*. Exemplary data recorded by SE 102 in step 409*a* includes recording in memory by SE 102 both certificates cert.CS 112 and cert.CA1 115. SE 102 can verify certificate cert.CS 112*c* using certificate cert.CA1 115, and then either (i) verifying cert.CA1 115 with a certificate already recorded in SE 102 before step 409*a*, such as cert.CA.root 109 (assuming CA1 has its certificate signed by the root certificate authority shown in FIG. 1*a*), or (ii) requesting mobile handset 108 to fetch a parent certificate for cert.CA1 115 that would link cert.CA1 115 to a certificate already recorded and authenticated within SE 102. SE 102 could use a signature verification 221 step in step 409*a* to verify certificates. In exemplary embodiments, SE 102 records a plurality of "previously approved" root certificates 109 (in FIG. 1*b*) from different certificate authorities, and step 409*a* could comprise SE 102 selecting a parent root certificate that matches cert.CA1 115. In exemplary embodiments, the plurality of "previously approved" root certificates 109 for SE 102 could be recorded by a device manufacturer 101*x* during manufacturing of device 101 or before distribution of device 101 to device user 101*a*.

In exemplary embodiments, if SE 102 does not record a parent root certificate 109 (or grandparent, or great-grandparent, etc.) for cert.CA1 115 or cert.CS 112, then in step 409*a* SE 102 can (i) send an error message to mobile handset 108 and (ii) optionally stop the configuration step 103. The error condition to mobile handset 108 could notify configuration user 108*a* that procedures may be required in order to load a new or different root certificate 109 or parent certificate in order to proceed. The root certificate 109 can be the foundation of security for SE 102. If hackers or adversaries could load a fake root certificate 109, or have SE 102 accept a certificate authority certificate that is not chained to an authenticated root certificate previously installed in SE 102, then potentially any non "genuinely" authenticated public key could be subsequently loaded, and SE 102 could then be considered no longer secure.

At step 409*b*, SE 102 can process parameters 407. SE 102 can verify that parameters 407 are compatible with the set of cryptographic algorithms 141. For example, if parameters 407 specify the use of an elliptic curve that is not supported by SE 102, then SE 102 could send mobile handset 108 and error of the unsupported parameters. In step 409*b*, SE 102 could also select a subset of parameters 407 that are supported by cryptographic algorithms 141 and send mobile handset 108 and configuration server 112 a report of the selected subset. In exemplary embodiments, where parameters 407 are compatible with cryptographic algorithms 141 and/or certificate parameters 102*p* then SE 102 accepts parameters 407 and records them in nonvolatile memory.

At step 221*e*, SE 102 can verify the signature1.CS 404 using a step 221*e* as depicted in FIG. 2*b*. SE 102 could input (i) the value for random1.SE 308 issued by SE 102 above message 307 from FIG. 3 into the "message to verify" in a signature verification 221 step and also input (ii) the public key ephemeral PKe.CS 402*a* received in message 403 into in order to verify signature1.CS 404. In this manner, SE 102 can confirm that PKe.CS 402*a* is authentically from CS 112. Step 221*e* in FIG. 4*a* can comprise SE 102 using a public key for configuration server 112 from cert.CS 112*c*. As mentioned above with message 316, if SE 102 issues a second, different random2.SE with message 316 or related messages, then signature1.CS 404 could be over the different random2.SE instead of random1.SE 308 as depicted in FIG. 4*a*. Although not depicted in FIG. 4*a*, in exemplary embodiments signature1.CS 404 verified in a step 221*e* can also be over parameters 407, and thus SE 102 can know that parameters 407 are authenticated (since they are signed along with random1.SE 308).

At step 410, SE 102 can derive a public key PK1.SE 410*a* and an associated secret key SK1.SE 410*b*, using a random number, a key pair generation function, and data from the set of parameters 407'. The parameters 407' could be received in message 403, or also previously stored by device 101 and SE 102 before the receipt of a message 403, as noted above. For some embodiments, PK1.SE 410*a* could use parameters 407 instead of parameters 407', and the selection of parameters 407 versus 407' could be based on the receipt of parameters 407' in a message 403 or recording of parameters 407' by SE 102 before receipt of a message 403. SE 102 can utilize a random number generator 102*e* in FIG. 1*b* in order to derive the random number and input the random number into the key pair generation function. A key pair generation function could (i) be included in cryptographic algorithms 141, and (ii) utilize data from parameters 407. SE 102 can then record both PK1.SE 410*a* and SK1.SE 410*b* in a nonvolatile memory, such as memory 102*d*. In exemplary embodiments, SK1.SE 410*b* is not transferred outside SE 102 (including SK1.SE 410*b* not being transferred to device 101 outside SE 102) and thus SK1.SE 410*b* can remain reasonably secure.

SE 102 can conduct a key exchange 411*a* step with configuration server 112 using PKe.CS 402*a* and SK0.SE 102*y*. Details for key exchange 411*a* are depicted and described in connection with FIG. 4*b* below. As depicted in FIG. 4*b* below, the output of a key exchange 411*a* step can be a mutually derived symmetric encryption key 442*a* and MAC key 442*b*. SE 102 can then perform a signature creation step 220*g* in order to create signature2.SE 416, where the "message to sign" data in a step 220*g* includes PK1.SE 410*a*, and the private key utilized by SE 102 to create signature2.SE can be SK0.SE 102*y'*. In this manner, (i) the derived public key for SE 102 can be signed by the previously recorded secret key (SK0.SE 102*y'*), and (ii) configuration server 112 can have access to corresponding PK0.SE 102*n'* in order to verify signature2.SE 416. In preferred exemplary embodiments, the parameters 111*d* used with a signature creation 220*g* step are equal or equivalent to parameters 102*p* recorded in cert0.SE 102*k'*. Note that PK1.SE 410*a* that is signed in a step 220*g* may be associated with a different set of parameters 407 than the parameters 102p, such as PK1.SE 410a using the second set of parameters 407'. For a signature creation step 220g, SE 102 could also include a random number received from configuration system 114, such as random1.AS 223, such that signature2.SE 416 can be over at least PK1.SE 410a and random1.AS 223, thereby ensuring a signature 416 is not replayed.

SE 102 can then create a ciphertext1.SE 415 using an encryption step 412a, where encryption step 412a is depicted and described in connection with FIG. 4b below. SE 102 can use the derived symmetric encryption key 442a and MAC key 442b (from key exchange 411a in FIG. 4b below) with encryption step 412a. The encrypted data in ciphertext1.SE 415 can include the derived public key PK1.SE 410a and also optionally configuration data for SE 102 such as data config0.SE 102aa. Data for config0.SE 102aa was described above in connection with FIG. 1b, and in exemplary embodiments, config0.SE 102aa includes a list of all root certificates recorded by SE 102. Including both (i) ciphertext1.SE 415 of PK1.SE 410a and (ii) signature2.SE 416 may appear redundant to those of ordinary skill in the art, since a subsequent decryption of ciphertext1.SE 415 by configuration server 112 would normally mean that only SE 102 sent the ciphertext1.SE 415 (encrypted using SK0.SE 102y). But, creating a separate signature2.SE 416 for PK1.SE 410a can allow configuration server 112 to send the signature2.SE 416 to other servers, such a certificate authority 115 as depicted in FIG. 4a. Additional details for using signature2.SE 416 are described below in connection with FIG. 5.

SE 102 can then send mobile handset 108 a message 413, where message 413 can include ID.Transaction1 405, ciphertext1.SE 415, and signature2.SE 416. As depicted in FIG. 4a, ciphertext1.SE 415 comprise plaintext values or data for PK1.SE 410a and config0.SE 102aa, where the plaintext values are encrypted with symmetric encryption key 442a. Signature2.SE 416 can be over derived public key PK1.SE 410a. ID.transaction1 405 can correspond to the transaction ID received in a message 403 and could comprise a session ID or token for SE 102 and configuration server 112 to track the data flow. Although not depicted in FIG. 4a, signature2.SE 416 can also be over the transaction ID 405 in addition to PK1.SE 410a. As depicted in FIG. 4a, message 413 can be sent over NFC session 303 to mobile handset 108. Mobile handset 108 can then forward the data from message 413 to configuration server 112 using secure session 321. For embodiments where device 101 and/or SE 102 stores parameters 407' before the receipt of a message 403 and uses the parameters 407' to generate SK1.SE 410b and PK1.SE 410b, then message 413 can also include the parameters 407'.

Before or after receipt of message 413, configuration server can conduct a key exchange 411b step, which is depicted and described in connection with FIG. 4b below. A key exchange 411b step can allow configuration server 112 to mutually derive a same symmetric encryption key 442a that was derived by SE 102 in a key exchange step 411a. For step 411b, configuration server 112 can use SKe.CS 402b and PK0.SE 102n in order to derive symmetric encryption key 442a. FIG. 4a depicted step 411a before receipt of message 413 but step 411a could be conducted after receipt of message 411a. After receipt of message 413, configuration server 112 can then perform a decryption 412b step of received ciphertext1.SE 415 using the derived symmetric encryption key 442a, and the operation of a decryption 412b step is depicted and described in connection with FIG. 4b below. After step 412b, configuration server 112 can read the plaintext values of PK1.SE 410a and config0.SE 102aa. Configuration server 112 can then also optionally perform a signature verification step 221g, where signature2.SE 416 over PK1.SE 402a can be verified. Note that configuration server 112 can optionally omit signature verification step 221g since successful decryption of ciphertext1.SE 415 could only normally be conducted with an authentic SE 102 (e.g. the entity holding SK0.SE 102y). However, other elements in a system 100 and other systems herein can later use signature2.SE 416 to authenticate that PK1.SE 410a is truly from SE 102.

At step 417, configuration server 112 can send a certificate authority 115 for configuration system 114 a message with ID.SE 102m, PK1.SE 410a and signature2.SE (PK1.SE 410a) 416. Although not depicted in FIG. 4a, the message to certificate authority 115 could be over a secure session similar to secure session 321. Although not depicted in FIG. 4a, the message to certificate authority 115 could also include (i) data for (a) parameters 407 or 407' for use with PK1.SE 410a and (b) signature2.SE 416, and (ii) a certificate cert0.SE 102k or cert0.SE 102k'. Certificate authority 115 could then conduct a signature verification step 221g for signature2.SE 416 using PK0.SE 102n from cert0.SE 102k (or a PK0.SE 102n' from a cert0.SE 102k' for digital signatures), such that PK1.SE 410a is authenticated for being from SE 102 using ID.SE 102m (since ID.SE 102m is preferably in certificate cert0.SE 102k). Once signature2.SE 416 over PK1.SE 410a is verified, certificate authority 115 can conduct a step 418 to create certificate cert1.SE 419, where cert1.SE 419 can be signed by certificate authority 115. Note that for embodiments where signature 416 is also over a random number from configuration system 114, such as random1.AS 223, then (i) the message in a step 417 can include the random number, such that CA 115 can verify signature2.SE 416 is over both PK1.SE 410a and the ransom number from configuration system 114.

Step 418 can use parameters 407' in order to create certificate cert1.SE 419, and in exemplary embodiments parameters 407 are different than parameter 102q, including specifying (i) different key lengths in bits, (ii) different named ECC curves, and (iii) different validity dates. An exemplary certificate cert1.SE 419 for SE 102 using derived PK1.SE 410a is depicted in FIG. 4d below. Certificate authority 115 can send cert1.SE 419 to configuration server 112. Cert1.SE 419 for SE 102 can facilitate SE 102 to begin using PK1.SE 410a and SK1.SE 410b in an authenticated manner with other elements of a system 100, including reporting system 120. The use of cert1.SE 419 can provide additional security for a device owner 122 or device user 101a, since (i) SK1.SE 410 has been derived after receipt of device 101 from device manufacturer 101x, and also with (ii) the security for device 101 no longer depending on SK0.SE 102y, which has physically been in control of other parties besides device owner 122 or device user 101a before delivery of device 101.

At step 420, configuration server 112 can receive cert1.SE 419 and conduct a signature verification step 221 over the signature created by step 220 depicted in FIG. 4d. Configuration server 112 can also query configuration database 112a for parent certificates for cert1.SE 419 and cert.CA1 115 that would link to a root certificate recorded in SE 102. In other words, configuration server 112 in a step 420 finds and records intermediate certificate authority certificates that could be verified by a root certificate listed in config0.SE 102aa. As mentioned above, config0.SE 102aa received by configuration server 112 can contain a list of all root certificates recorded by SE 102. Further, at step 420, configuration server 112 can query for intermediate certificates that link cert.CA2 121 to a root certificate listed in config0.SE 102*aa*, such that SE 102 can verify a certificate from reporting system 120 with a root certificate already installed in SE 102, such as a root certificate 109 burned into EEPROM 102*j* during manufacturing.

For embodiments where PK1.SE 401*a* use a different set of cryptographic parameters 407' than parameters 407, then configuration server 112 can conduct a second key derivation step 402' with the parameters 407' in order to generate PKe.CS 402*a*' and SKe.CS 402*b*'. At a second key exchange 421*a* step, configuration server 112 could conduct second a key exchange where (i) the derived, authenticated, and previously signed PK1.SE 410*a* is used for the key exchange instead of the original PK0.SE 102*n*, and (ii) the SKe.CS 402*b*' from a step 402'. Details for the second key exchange 421*a* step are depicted and described in connection with FIG. 4*c* below. For embodiments where PK1.SE 410*a* use parameters 407, then configuration server 112 could continue to utilize the ephemeral SKe.CS 402*b* in a key exchange step 421*a*. The output of a key exchange step 421*a* can be a new, second symmetric encryption key 442*b* and also a new MAC key 442*b*. In other words, the second key exchange step 421*a* can be utilized so that configuration server 112 can derive the new symmetric encryption key 442*b* using PK1.SE 410*a* and SKe.CS 402*b*'.

The present invention as depicted in FIG. 4*a* provides an embodiment for security that may also be generally applicable for a server communicating with a node, even outside the use of a configuration 103 step. Specifically, the configuration server has (i) derived an ephemeral key PKI key pair (e.g. PKe.CS 402*a* and SKe.CS 402*b*), where the ephemeral key is signed with a static private key, (ii) conducted a first key exchange 411*b* with the derived SKe.CS 402*b* for a first symmetric key 442*a*, (iii) received a derived PK1.SE 410*a* from SE 102 where PK1.SE 410*a* can be either (iii.a) encrypted with the first symmetric key 442*a*, or (iii.b) verified with PK0.SE 102*n*', or (iii.c) both iii.a and iii.b, (iv) conducted a second key exchange 421*b* using the ephemeral SKe.CS 402*b*' and the received, derived PK1.SE 410*a* in order to obtains a second symmetric key 442*b*, and then (v) encrypting ciphertext with the second symmetric key 442*b*. In other words, the steps the configuration server 112 herein has taken can be applicable generally to a server communicating with a node and using both static and ephemeral PKI keys for the server to derive a first symmetric encryption key, and then securely receiving a derived key from the node and using that derived key with the ephemeral keys to derive a second symmetric encryption key.

At step 422, configuration server 112 with other elements in configuration system 114 can select or obtain network access credentials 126*a*. Configuration server 112 could query configuration database 112*a* using the networks available list 322 depicted and described in connection with FIG. 3 above, where the networks available list 322 provide information about wireless networks around device 101. A response to a query to configuration database 112*a* could provide a selected access network 126 that is preferred based on criteria such as bandwidth cost, expected energy or power requirements (i.e. 3G/4G may use more power than LPWAN), signal strength measurements for networks available list 322, and commercial terms such as agreements between device owner 122 and networks in a networks available list 322. Configuration server 112 could also query other servers in a configuration system 114 or a system 100 in order to obtain a selected access network 126 from networks available list 322 in addition to network access credentials 126*a* for access network 126.

In an exemplary embodiment, network access credentials 126*a* received by configuration server 112 or configuration system 114 are encrypted using either PK0.SE 102*n* or PK1.SE 410*a* before being received by configuration server 112. A second symmetric encryption key 442 (with a different value than the first symmetric encryption key 442*a* below in FIG. 4*b*) could be asymmetrically encrypted using PK0.SE 102*n* or PK1.SE 410*a*, and the network access credentials 126*a* could be encrypted with the second symmetric encryption key 442*a* by an access network 126. In exemplary embodiments, the second symmetric encryption key 442 can be asymmetrically encrypted by a configuration system using PK1.SE 410*a* and Elgamal asymmetric encryption. Other possibilities exist as well such as another element besides configuration server 112 deriving a second symmetric encryption key 442 using PK0.SE 102*n* or PK1.SE 410*a* and then encrypting the network access credentials 126*a* using the derived second symmetric encryption key 442. In that manner, the encrypted network access credentials 126*a* can be encrypted uniquely for SE 102 and cannot be read by configuration server 112 or mobile handset 108. In some exemplary embodiments, the network access credentials 126*a* can include an identity such as an international mobile subscriber identity (IMSI) and a shared secret key "K", and each of the IMSI and the key K can be asymmetrically encrypted with PK1.SE 401*a*, where device 101 with SE 102 could asymmetrically decrypt the IMSI and key K with SK1.SE 401*b*.

At step 423, configuration server 112 can collect a software package 104*q* for device 101 and SE 102. An exemplary software package 104*q* for device 101 is depicted and described in FIG. 5 below. Configuration server 112 could use data from an identity list 320 to query other servers from a system 100 in order to obtain the software. Different components of software package 104*q* could come from different servers or elements in a system 100. Configuration server 112 can also use data from configuration file config0.SE 102*aa* in order to select software for software package 104*q*. The data collected by or queried by configuration server 112 could be stored in a configuration database 112*a*. An updated device 101 operating system 101*e* could be obtained from a device manufacturer 101*x*. Configuration data config.device 101*r* could be obtained from servers associated with either device owner 122 or device manufacturer 108*x*.

At step 423 configuration server 112 can also use ID.transducer from identity list 320 to query a configuration database 112*a* or configuration database 112*b* for in order to obtain a configuration file or dataset for device 101 to use with transducer 105, and the dataset could comprise config.TR1 105*e*. Although not depicted in FIG. 1*a* a system 100 could include a transducer manufacturer similar to device manufacturer 101*x*, and a configuration server 101 could use ID.transducer to query the transducer manufacturer for data to be included in config.TR1. 105*e*. Data for config.TR 105*e* could comprise a transducer electronic datasheet (TEDS). At step 423 configuration server 112 can use ID.MU to query a configuration database 112*a* or configuration database 112*b* for in order to obtain a configuration file or dataset for device 101 to use with monitored unit 106, and the dataset could comprise config.MU1 106*a*. The dataset for config.MU1 106*a* can specify parameters associated with monitored unit 106, such as timer values for device 101 to collect data, a range of maximum or minimum values an actuator for transducer 105 could use with monitored unit 106. In exemplary embodiments, the dataset for config.MU1 contains thresholds for alarm values or conditions, such that if device 101 detects signals outside acceptable levels and within an alarm range in config.MU1, then device 101 immediately reports the alarm condition to reporting server 116 and/or takes other actions as well, including potentially adjusting a transducer output 105c to mitigate the alarm condition. Other possibilities exist as well for data within config.MU 106a without departing from the scope of the present invention.

Further, at step 423 configuration system 112 could request device owner 122 to specify the reporting system 120 for device 101, and subsequently (A) configuration server 112 could send data from identity list 320 or config0.SE 102aa to reporting system 120 and (B) reporting system 120 could send back a dataset to configure device 101 to work with reporting system 120, and the dataset could comprise config.reporting-system 120a. Data within config.reporting-system 120a could specify domain names or IP addresses of reporting server 116, credentials for device 101 to utilize with reporting server 120 such as a user name, password, encryption keys, or a public key, reporting timers, etc. In some exemplary embodiments, network access credentials 126a could be received by configuration server 112 in a step 423 from reporting system 120. In other exemplary embodiments where PKI-based authentication is used for connectivity of device 101 to access network 126, then a step 423 could also comprise configuration server 112 sending access network 126 the certificate cert1.SE 419. Data within config.reporting-system 120a could also specify cryptographic parameters similar to parameters 407 such as algorithms to utilize, key lengths, curve names, padding schemes, encoding rules, versions of standards to implement (such as TLV v2 versus TLS v3). Configuration server 112 could also query device owner 122 in order to obtain some data for config.reporting-system 120a.

In addition, configuration server 112 could query configuration user 108a at mobile handset 108 for additional data or user input if the software package 104q could not be automatically assembled or fully created. Note that software package 104q could include sub-packages, such as a sub-package 104z, where sub-package 104z could depend or be determined based on transducers 105 attached to device 101, or monitored unit 106, or reporting system 120. In an exemplary embodiment, identity list 320 could specify a transducer identity ID.transducer that requires a specific transducer library 105q (or driver) for device 101 with OS 101e to support a selected transducer 105. Configuration server 112 could query a transducer manufacturer for the most current or appropriate transducer library 105q for device 101, and include that transducer library 105q in a software package 104q. In exemplary embodiments a software package 104q can include a set of configuration test vectors 104x, which can comprise software for verifying the functionality of transducers 105 with transducer bus 101i and transducer library 105q. A configuration test vector 104x could provide an instruction to verify signal strength for data received, noise levels for data received, or dynamic range for signals output, etc. Other possibilities exist as well for a configuration server 112 or configuration system 114 to assemble software for device 101 in a software package 104q, without departing from the scope of the present invention. After software package 104q is assembled, configuration server can calculate the size of software package 104q, which could comprise the value package-size.CS 428, where package-size.CS represents the size of the software package 104q in bytes.

At step 424a, configuration server 112 can encrypt data for SE 102 using the derived symmetric encryption key 442b from a previous step 421a. An encryption step 424a is depicted and described in connection with FIG. 4c below, and the encryption step 424a can create a ciphertext1.CS 427. At step 424a, plaintext input into a symmetric encryption algorithm 444a could include at least one of (i) certificates cert1.SE 419, cert.CA2 121, and cert.CA3 123, and (ii) device 101 configuration data config.TR1 105e, config.MU1 106a, config.device 101r, and config.reporting-system 120a. In other words, plaintext input could include one or more of (i) certificates cert1.SE 419, cert.CA2 121, and cert.CA3 123, and (ii) device 101 configuration data config.TR1 105e, config.MU1 106a, config.device 101r, and config.reporting-system 120a. The data for plaintext in a step 424 can comprise a device configuration. In addition, plaintext input into a symmetric encryption algorithm 444a at a step 424a could include identity list 320 and network access credentials 126a (or an encrypted network access credentials 126a, where the encrypted network access credentials were encrypted using a public key for SE 102). A step 424a could also include configuration server 112 using plaintext of additional parent certificates for cert.CA1 121 and/or cert CA3 123 that would be signed by an existing cert.CA.root 109 recorded by device 101. The parent certificates would be determined in the prior step 420 as described above.

Figure 4B:
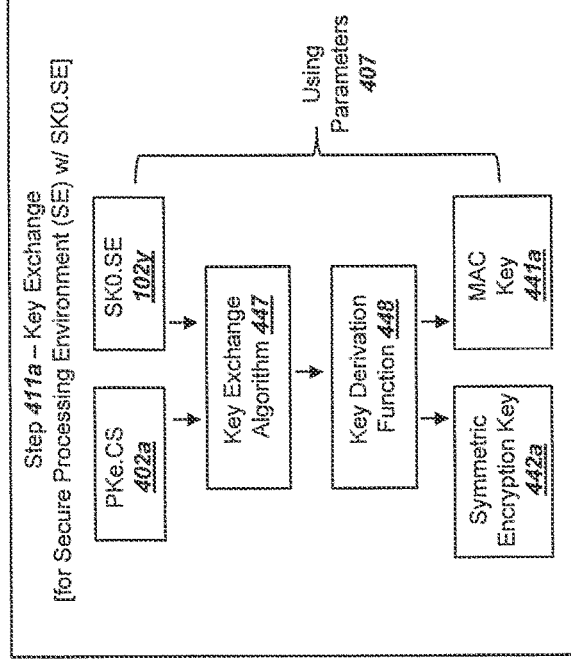
FIG. 4*b* is a series of flow charts illustrating exemplary steps for a device and a configuration server to derive keys and then use the derived keys to encrypt and decrypt data, in accordance with exemplary embodiments.
Figure 4B:
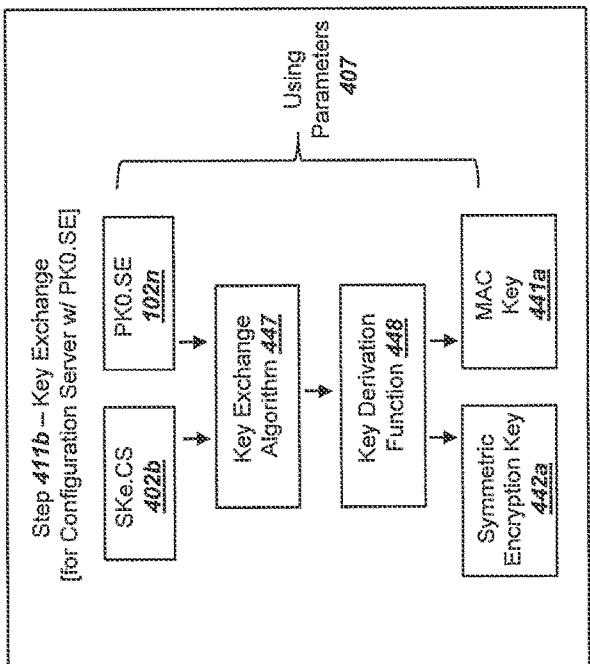
Figure 4C:
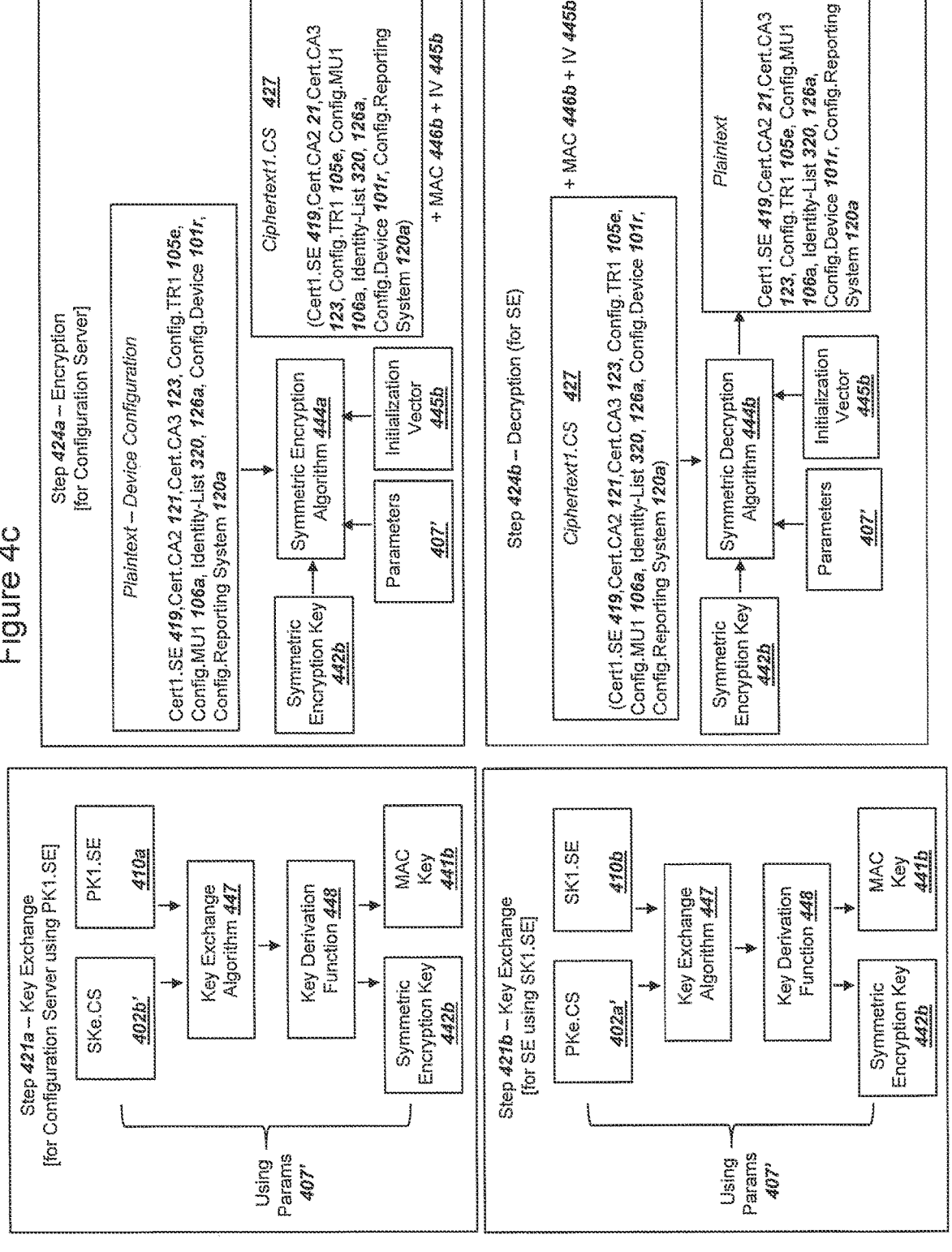
FIG. 4*c* is a series of flow charts illustrating exemplary steps for a device and a configuration server to derive keys and then use the derived keys to encrypt and decrypt data, in accordance with exemplary embodiments.

Configuration server 112 can then send message 425 to mobile handset 108, where message 425 can contain an ID.transaction2 426, PKe.CS 402a', ciphertext1.CS 427, where cipertext1.CS 427 can include the ciphered data described in the above paragraph and depicted in both FIG. 4a and FIG. 4c. Other or additional data could be included in a ciphertext1.CS 427 as well, such as the ID.transaction2 426, and identity of configuration server 112 or SE 102 or device 101, or other values as well. Message 427 can also include the value package-size.CS 428, and package-size.CS 428 may also optionally be in ciphertext1.CS 427. In exemplary embodiments, package-size.CS 428 is preferably outside ciphertext1.CS 427 in order for mobile handset 108 to read the value and make decisions or prompt configuration user 108a based on the value of package-size.CS 428. If package-size.CS 428 was only inside ciphertext1.CS 427, then mobile handset 108 would not normally be able to read the plaintext data since mobile handset 108 does not hold or record a symmetric encryption key for ciphertext1.CS 427. Upon receiving message 425, mobile handset 108 can forward data in message 425 to SE 102, as depicted in FIG. 4a.

At step 429, mobile handset 108 can process package-size.CS 428 in order to make a decision about subsequent data transfer between mobile handset 108 and device 101 through NFC session 303. Although depicted in FIG. 4a as occurring after mobile handset 108 sending message 425, a step 429 could occur before the mobile handset 108 sends message 425 to SE 102. Configuration application 108b can read package-size.CS 428 to determine if the upcoming software package size 104a in bytes should be transmitted to SE 102 via either (A) the existing NFC session 303 or alternatively (B) via a new, different Wi-Fi or Bluetooth session between mobile handset 108 and device 101. For example, if package-size.CS 428 is less than an exemplary one megabyte, then a configuration user 108a for mobile handset 108 could reasonably wait for the future software package 104q to be transmitted over NFC session 303 (such as less than an exemplary 30 seconds). However, if package-size.CS 428 is relatively large, such as greater than an exemplary ~15 megabytes, then a configuration user 108a may prefer to setup a Wi-Fi or Bluetooth session with device

101 in order to transfer the upcoming software package 104q. A step 429 could also comprise a display on mobile handset 108 prompting configuration user 108a for a decision or threshold for determining the use of Wi-Fi or Bluetooth (instead of using NFC session 303) in order to transfer upcoming software package 104q based on package-size.CS 428.

In exemplary embodiments, a step 429 can take place before mobile handset 108 sends message 425, and message 425 to SE 102 can include a signal or command regarding the use of Wi-Fi or Bluetooth to download software package 104q. Note that SE 102 could separately make a decision regarding the use of Wi-Fi or Bluetooth to download software package 104q based on package-size.CS 428, where SE 102 can consider factors that may not be available to configuration application 108b, such as the Wi-Fi and Bluetooth capabilities of device 101, internal security policies of device 101 and SE 102, etc. FIG. 4a depicts an embodiment where SE 102 makes the decision regarding physical layer to utilize for transfer of upcoming software package 104q using a step 431 below. However, the present invention also contemplates that mobile handset 108 can make the decision regarding physical layer to utilize for upcoming transfer of software package 104q as well for other embodiments. Further, configuration server 112 could make the decision based on parameters in a configuration database 112a, such as a maximum time allowed for transfer of software package 104q through NFC session 303, such as an exemplary maximum time of 120 seconds before an alternative physical layer to NFC would be attempted such as Wi-Fi or Bluetooth.

After receipt of message 425, at step 421b, SE 102 can derive symmetric encryption key 442b as depicted and described in connection with FIG. 4c below. Note that SE 102 utilizes PKe.CS 402a' and SK1.SE 410b as input into the key exchange algorithm 447. In other words, SE 102 can utilize the secret key SK1.SE 410b derived in step 410 with PKe.CS 402a' received in message 425 above in order to obtain symmetric encryption key 442b. In this manner, SE 102 and device 101 can optionally end dependence on a SK0.SE 102y that likely had been physically been outside the control of device owner 122 and device user 101a. In exemplary embodiments, although SK1.SE 410b provides an updated secret key, SE 102 continues to record SK0.SE 102y with corresponding cert0.SE 102k, such that use of SK0.SE 102y could be enabled for a "rollback" or "fallback" scenario such as if nonvolatile memory 102d storing SK1.SE 410b gets corrupted or erased. For embodiments where parameters 407 are used with SK1.SE 401b, then a step 421b can be conducted with PKe.CS 402a from a message 403 and the use of a PKe.CS 402a' from a message 425 could be omitted.

SE 102 can then use a decryption 424b step with the derived symmetric encryption key 442b in order to decrypt the ciphertext1.CS 427 and read the plaintext inside ciphertext1.CS 427. Although not depicted in FIG. 4a but depicted in FIG. 4c, a message 425 with ciphertext1.CS 427 can also include an initialization vector 445b. As contemplated for all messages depicted in the present invention, a message with a ciphertext can also include in initialization vector 445 and a message authentication code 446. At step 430 SE 102 can record the decrypted plaintext data from message 425 in nonvolatile memory 102d, including the new cert1.SE 419, which can comprise the new, primary certificate for SE 102 and cert0.SE 102k can be considered deprecated at step 430. In exemplary embodiments the new cert1.SE 419 received be SE 102 can utilize a different set of parameters 407 than cert0.SE 102k. For example, if (a) a device manufacturer 101x may use a different ECC named curve than configuration system 112, then (b.1) a new cert1.SE 102k would normally be required for file transfers with configuration system 112, and (b.2) different values for parameters 407 can be utilized in cert1.SE 419 than cert0.SE 102k. The selection of a set of parameters 407 by a configuration server 112 were depicted and described in connection with step 402 above.

Also at step 430, SE 102 can verify certificates received in message 425, as well as check a certificate revocation list for both cert1.SE 102. In exemplary embodiments, (X) all parent certificates through a root certificate are included in message 425, for all certificates received such as cert1.SE 419, cert.CA2 121, cert.CA3 123 in order for (Y) the public key in a root certificate 109 recorded in device 101 or SE 102 before configuration step 103 can be used to verify all the certificates receive in message 427. Further, in exemplary embodiments contemplated herein, each time a node or component is described as checking verifying a certificate, the node can also check with a certificate revocation list (CRL) recorded in the certificate to verify that the certificate remains valid before an expiration date. A step 430 can also comprise SE 102 sending a request through NFC session 303 to configuration server 112 to check CRL of certificates received in a message 425. Or, in other exemplary embodiments, a message 425 can include a confirmation that CRL for certificates in message 425 have been checked, and in step 430 SE 102 can also verify that message 425 includes the confirmation that CRL for certificates have been checked by configuration system 114. In another embodiment, any certificate received in a ciphertext1.CS 427 is accepted by SE 102 since SE 102 has authenticated configuration server 112 using random1.SE 308 above in FIG. 3.

In exemplary embodiments for a step 430 depicted in FIG. 4a, (A) message 425 includes a certificate received by SE 102 that cannot be verified by SE 102 using an existing cert.CA0.root 109 inside SE 102 (including possibly due to unsupported parameters 407), but (B) SE 102 accepts the certificate since it was received from an authenticated server (e.g. configuration server 112). In another exemplary embodiment, SE 102 accepts a second, new root certificate cert.CA1.root and/or cert.CA2.root in a ciphertext1.CS 427 since the message 425 and ciphertext is from configuration server 112, which has been authenticated. The inclusion of a second, new root certificate cert.CA1.root and/or cert.CA2.root in a message 425 can be secure for device 101 and SE 102 since the certificates are within a ciphertext1.CS 427 and thus cannot feasibly be altered or tampered with by mobile handset 108 or other nodes. Note that FIG. 4a and related figures depict mobile handset transmitting ciphertext across a local wireless link such as NFC session 303.

Continuing at step 430, SE 102 can continue processing plaintext data from message 425 while loading the data into memory and also verifying the data. In exemplary embodiments, SE 102 applies network access credentials 126a received in message 427, as well as configuration parameters received, such as config.device 101r. Note that device 101 with radio 101z may utilize network access credentials 126a, and for those embodiments then SE 102 can pass network access credentials 126a and/or config.device 101r to device 101 via bus controller 102h and device data bus 101g. Device 101 could store network access credentials 126a and config.device 101r in nonvolatile memory storage 101f. In exemplary embodiments, step 430 also comprises device 101 rebooting in order to apply config.device 101r and network access credentials 126a. In this embodiment, NFC session 303 may temporarily close but reopen upon successful reboot of device 101 and SE 102.

In exemplary embodiments, network access credentials 126a received in a message 425 and includes at least one additional, backup set of network access credentials 126a, such that device 101 can connect with a second access network 126 if the first access network 126 becomes unavailable. The second or backup set of network access credentials 126a could be (i) from configuration server 112 and (ii) selected by configuration server 112 using the networks available list 322 in FIG. 3. Step 430 may also comprise device 101 using config.reporting-system 120a in order to communicate with reporting system 120 while activating and accessing an access network 126 using the received network access credentials 126a. In this manner, device 101 can perform an "end-to-end" test to verify the supplied configuration values in a message 425 will provide network connectivity to enable the flow of transducer data 125 from device 101 to reporting server 116 as depicted in FIG. 1a. For embodiments where device 101 includes a WAN radio such as a 4G, 5G, 6G radio, etc., then network access credentials 126a could be used by device 101 to connect with an access network 126. Device 101 could receive subsequent configuration data such as that depicted in FIG. 5 from access network 126.

At step 431, SE 102 can use package-size.CS 428 to determine if NFC session 303 or a separate physical layer should be used for downloading the upcoming software package 104q. An exemplary decision process for SE 102 using package-size.CS 428 in a step 431 was also described above in connection with step 429. Separate wireless physical layers that SE 102 or device 101 could utilize for downloading software package 104q could be any of Wi-Fi, Bluetooth, a land mobile network such as 4G, 5G, etc., or a LPWAN, and other possibilities exist as well without departing from the scope of the invention. The selection of a physical layer by SE 102 for transfer of a software package 104q based on package-size.CS 428 could comprise a networking command 431a. The exemplary embodiment depicted in FIG. 4a illustrates the use of Wi-Fi with mobile handset 108 for download of software package 104q and an associated networking command 431a for use of Wi-Fi with mobile handset 108, but other possibilities exist as well. Device 101 with SE 102 could connect with a Wi-Fi network from an access point in the vicinity of installed device 101, such as the exemplary Wi-Fi networks detected and depicted for a networks available list 322 in FIG. 3 (where network access credentials 126a could be for the exemplary Wi-Fi network in the list 322). Alternatively, device 101 with SE 102 could use a set of network credentials 126a in message 425 to connect with a land mobile network as access network 126 and subsequently download software package 104q via the land mobile network, and in this case the networking command from device 101 and SE 102 could specify use of the land mobile network for software package 104q. FIG. 4a depicts a decision in a step 431 where SE 102 selects activation of a Wi-Fi radio in device 101, such as radio 101z, in order to download software package 104q. As mentioned above, any of configuration server 112, mobile handset 108, configuration user 108a, or SE 102 could make the selection for the physical layer to utilize for software package 104q, or they could make the selection in conjunction.

At step 432, SE 102 can generate a configuration report 432a for configuration system 112 regarding the installation and application of certificates, configuration files, and network parameters and credentials received in message 425.

For example, report 432a could confirm the success, bandwidth, signal strength, and other values from using both a primary and a backup set of network access credentials 126a with selected access networks 126 from the networks available list 322. Further report 432a can confirm the success, errors, or other states measured from device 101 implementing the configuration parameters for reporting system 120 in the data config.reporting-system 120a, such as the ability to send or receive transducer data 125. Config.reporting-system 120a can include credentials for device 101 to connect with reporting system 120, such a certificate for reporting server 116. Report 432a could also include data regarding success or errors related to loading and verifying the exemplary certificates in ciphertext1.CS 427 of cert1.SE 419, cert.CA2 121, cert.CA3 123, etc. Report 432a can also include available memory for SE 102 or device 101 (e.g. memory 102b, 102d, 102x, or 101f), such that configuration server 112 can confirm resources are sufficient for the planned transfer of software package 104q. Other possibilities exist as well for a report 432a to contain data pertaining to the status and resources of device 101 or SE 102 without departing from the scope of the present invention.

At step 424c, SE 102 can use an encryption step equivalent to encryption step 424a depicted in FIG. 4c in order to create a ciphertext2.SE 434. The symmetric encryption key 442b from a prior step can continue to be utilized for encryption step 424c. The plaintext inside ciphertext2.SE 434 can include a networking command 431a which was determined in step 431 above, and the depicted embodiment shows a network command 431a of "Wi-Fi start", or for mobile handset 108 to activate a Wi-Fi connection for device 101 in order for SE 102 to receive software package 104q. The plaintext inside ciphertext2.SE 434 can also include a report 432a, where an exemplary report 432a was described in the above paragraph. SE 102 can then send mobile handset 108 a message 433, where message 433 can contain ID.transaction2 426 and ciphertext2.SE 434. Although the exemplary embodiment depicted in FIG. 4a has SE 102 sending network command 431a in an encrypted format that cannot normally be read by mobile handset 108, the network command 431a could also be sent at plaintext to mobile handset 108.

Mobile handset 108 can forward message 433 to configuration server 112 and then also conduct a step 435. In step 435, mobile handset 108 can store or backup the currently applied network access credentials for Wi-Fi clients when mobile handset 108 operates as a Wi-Fi access point or "hotspot". In other words, a configuration user 108a may have mobile handset 108 operate as a Wi-Fi access point with specified credentials outside of the purpose of configuring a device 101 (such as when configuration user 108a has mobile handset 108 at their home or office). At step 435 the existing credentials for mobile handset 108 to operate as that Wi-Fi access point are backed up, and step 425 enables (i) a new set of access point credentials to be temporarily utilized for a Wi-Fi access point created by mobile handset 108, where (ii) the "backed up" Wi-Fi access point credentials from this step 435 can be later restored for mobile handset 108.

Configuration server 112 can receive message 433 and conduct a series of steps to process the data in message 433. Configuration server 112 can conduct a decryption step 424d in order to convert ciphertext2.SE 434 into plaintext and read networking command 431a and report 432a. The decryption step 424d can correspond to decryption step 424b depicted and described in connection with FIG. 4c below, such as using the same symmetric decryption key 442b that was previously derived by configuration server in a step 421a also depicted in FIG. 4c below.

At step 436 configuration server 112 can process networking command 431a and report 432a. Data from report 432a can be recorded in a database 112b. Configuration server 112 can send confirmation data or portions of report 432a to other elements in system 100, such as informing device owner 122 or reporting system 120 or access network 126 of the preliminary configuration of device 101, where the preliminary configuration can be a check that configuration files, certificates and network access credentials delivered in a message 425 were properly received and loaded by device 101 and/or SE 102. In an exemplary embodiment, step 436 could include configuration system 114 notifying reporting system 120 that device 101 should be activated (since the completion of a configuration step 103 is pending). Using report 432a, configuration server 112 can also evaluate or confirm that certificates, configuration data, and network access credentials delivered in the previous message 425 were properly received and applied.

In a step 436 configuration server 112 could use networking command 431a and report 432a to determine that mobile handset 108 should activate a Wi-Fi access point for download of software package 104q to SE 102, instead of continuing to use NFC session 303. In a different exemplary embodiment than that depicted in FIG. 4a, configuration server 112 could use networking command 431a and report 432a to determine that SE 102 and device 101 should use a land mobile network such as access network 126 in order to download software package 104q. In yet another exemplary embodiment, configuration server 112 could use networking command 431a and report 432a to determine that SE 102 and device 101 should continue using the existing NFC session 303 in order to download the software package 104q.

At step 437 configuration server 112 can select the access point name (e.g. SSID) and password, as well as other parameters such as security schemes (e.g. WPA2 or WPA3, etc.) for mobile handset 108 to utilize in order to have device 101 connect with mobile handset 108 over Wi-Fi. The data for mobile handset to operate a Wi-Fi access point can be recorded in a dataset Wi-Fi-AP.MH 437a. Configuration server 112 can then conduct an encryption step 424e to create ciphertext2.CS 441, where the plaintext comprises dataset Wi-Fi-AP.MH 437a. Configuration server can utilize previously derived symmetric encryption key 442b to convert the plaintext into the ciphertext2.CS 441. Step 424e could correspond to encryption step 424a depicted in FIG. 4c below. Configuration server 112 can then send message 438 to mobile handset 108, where message 408 includes dataset Wi-Fi-AP.MH 437a. Note that dataset Wi-Fi-AP.MH 437a can be encrypted inside secure channel 321 between configuration server 112 and mobile handset 108, so another layer of encryption can be omitted for message 438. Mobile handset 108 would not normally be able to ready ciphertext communicated between configuration server 112 and SE 102 as depicted in FIG. 4a. Mobile handset 108 can record and process the data received in message 438.

Configuration server 112 can then send mobile handset 108 another message 440, where message 440 includes an ID.transaction3 439 and the ciphertext2.CS 441, where the creation of ciphertext2.CS 441 was described in the above paragraph. Mobile handset 108 can receive message 440 and subsequently send the data for message 440 to SE 102 and SE 102 can receive message 440. SE 102 can then conduct a decryption step 424f in order to convert ciphertext2.CS 441 into plaintext and read dataset Wi-Fi-AP.MH 437a. Decryption step 424f can correspond to decryption step 424b depicted and described in connection with FIG. 4c below, where SE 102 can utilize the derived symmetric encryption key 442b. SE 102 could process the decrypted plaintext Wi-Fi-AP.MH 437a in order to know the credentials to use with a Wi-Fi radio 101z for device 101 and connect with mobile handset 108 using Wi-Fi. Data from the decrypted plaintext Wi-Fi-AP.MH 437a can be stored in nonvolatile memory for SE 102. The successful processing of Wi-Fi-AP.MH 437a by SE 102 could also be a signal for SE 102 to activate Wi-Fi for device 101, and utilize the credentials within Wi-Fi-AP.MH 437a.

At step 441, SE 102 can instruct device 101 to activate Wi-Fi through a radio 101z in order for the hardware and software for device 101 to (i) enable Wi-Fi session 503 depicted below in FIG. 5, and (ii) receive the additional data and software package 104q to complete a configuration step 103 as depicted in FIG. 1a. In other words, Wi-Fi-AP.MH 437a can provide information (i) for mobile handset 108 to activate a Wi-Fi access point with the credentials for an access point and (ii) for device 101 to activate a Wi-Fi client with the credentials for an access point. Wi-Fi-AP.MH 437a can also provide information such as a maximum power level to utilize in a Wi-Fi session 503, such as a typically lower power level due to the close proximity of the two devices. In exemplary embodiments, Wi-Fi-AP.MH 437a specifies a power level less than 1 milliwatt for either or both nodes maximum transmit power, although other possibilities exist as well.

In an alternative exemplary embodiment, device 101 can use radio 101z to activate a Wi-Fi access point with the credentials for Wi-Fi-AP.MH 437a, and then mobile handset 108 can activate a Wi-Fi client with the credentials for Wi-Fi-AP.MH 437a. In another embodiment for the present invention, either mobile handset 108 or device 101 can activate a Wi-Fi access point and the other side can operate as the Wi-Fi client. Benefits of device 101 activating the Wi-Fi access point for a Wi-Fi session 503 below in FIG. 5 is that device 101 can potentially retain greater control and thus security for the Wi-Fi session 503, but device 101 activating the Wi-Fi access point is not required in order to gain benefits from the present disclosure. Further, although Wi-Fi-AP.MH 437a is depicted in FIG. 4a as credentials and parameters for a Wi-Fi network, other local wireless connectivity technologies could be utilized as well, including Bluetooth. For embodiments where NFC session 303 remains open and utilized for the transfer of software package 104q, then the use of Wi-Fi-AP.MH 437a and activation of a Wi-Fi access point and client between mobile handset 108 and device 101 can be optionally omitted.
FIG. 4b

FIG. 4b is a series of flow charts illustrating exemplary steps for nodes to mutually derive keys and then use the mutually derived keys to encrypt and decrypt data, in accordance with exemplary embodiments. Exemplary steps for nodes to mutually derive keys can comprise (i) a key exchange 411a step for SE 102 to derive a symmetric encryption key 442a and (ii) a key exchange 411b step for a configuration server 112 to derive the same symmetric encryption key 442a. Exemplary steps for nodes to encrypt and decrypt data can comprise (i) an encryption 412a step for SE 102 to utilize the symmetric encryption key 442a to convert plaintext to ciphertext, and (ii) a decryption 412b step for configuration server 112 to utilize the symmetric encryption key 442a to convert the ciphertext received from SE 102 into plaintext. The use of all steps a key exchange 411a, a key exchange 411b, encryption 412a, and decryption 412b were also depicted and described in connection with FIG. 4*a* above. Additional detail regarding the use of these steps will be provided herein. Further, although the steps are depicted specifically for the use of particular keys and plaintext/ciphertext combinations in FIG. 4*b*, the steps illustrated can be used with different keys and plaintext/ciphertext combinations. For example, FIG. 4*c* below depicts the same functionality used by the nodes as in FIG. 4*b*, but with (i) different PKI keys input to mutually derive a different symmetric encryption key, and (ii) different plaintext encrypted and different ciphertext decrypted.

A key exchange 411*a* step for SE 102 to derive a symmetric encryption key 442*a* can utilize a set of cryptographic algorithms 141 as depicted and described in connection with FIG. 1*b* above. As depicted in FIG. 4*b*, an SE 102 can input both of ephemeral public key from configuration server PKe.CS 402*a* and initial secret key SK0.SE 102*y* into a key exchange algorithm 447. The key exchange algorithm 447 could comprise a Diffie Hellman key exchange (DH), an Elliptic Curve Diffie Hellman key exchange (ECDH), and other possibilities exist as well without departing from the scope of the present invention. For some exemplary embodiments, the key exchange algorithm 447 could comprise a supersingular isogeny Diffie-Hellman key exchange (SIDH). A key exchange algorithm 447 can support either PKI keys based on elliptic curves or RSA algorithms, although support of elliptic curves may be preferred in some exemplary embodiments due to their shorter key lengths and lower processing requirements. A summary of ECDH is included in the Wikipedia article titled "Elliptic Curve Diffie-Hellman" from Mar. 9, 2018, which is herein incorporated by reference. An exemplary embodiment of key exchange algorithm 447 could comprise a "One-Pass Diffie-Hellman, C(1, 1, ECC CDH)" algorithm as described in section 6.2.2.2 on page 81 of the National Institute of Standards and Technology (NIST) document "MST SP 800-56A, Recommendation for Pair-Wise Key Establishment Schemes Using Discrete Logarithm Cryptography" from March, 2007 which is hereby incorporated by reference its entirety. Other key exchange algorithms in NIST SP 800-56A could be utilized as well for a key exchange algorithm 447 in FIG. 4*b* and FIG. 4*c* without departing from the scope of the present invention. For some exemplary embodiments, a key exchange 447 could comprise a key encapsulation mechanism (KEM), where a node such as configuration server 112 encrypts data such as key 442*a* with a public key such as PK0.SE 102*n*, and then key 442*a* can be decrypted with SK0.SE 102*y*. The ciphertext of key 442*a* could be sent in message 403.

Other algorithms to derive a shared symmetric encryption key 442*a* using public keys and private keys may also be utilized in a key exchange algorithm, such as, but not limited to, the American National Standards Institute (ANSI) standard X-9.63. Cryptographic parameters 407 can also include information for using a key exchange algorithm 447 in order to derive a commonly shared symmetric encryption key 442*a*. Parameters 407 input into a key exchange algorithm 447 can include the key length in bits, an elliptic curve utilized for ECC, a time-to-live for a key 442*a* that is derived, and similar settings. Additional cryptographic parameters 407 for a PKI keys input into key exchange algorithm 447 can include a supported point formats extension, where the supported point formats extension could comprise uncompressed, compressed prime, or "compressed char2" formats, as specified in ANSI X-9.62. In other words, an ECC keys input into a key exchange algorithm 447 may have several different formats and a set of parameters 407 can be useful to specify the format.

As depicted in FIG. 4*b*, the output of a key derivation function 447 such as an ECDH key exchange can be input into a key derivation function 448. Key derivation function 448 can process the output of a key exchange algorithm 447 in order to further obfuscate and optimize a derived shared secret from the key exchange algorithm 447. For example, the number of bits output from a key exchange algorithm 447 (such as an exemplary 256 bits) may not match the number of bits utilized for a symmetric encryption key 442*a* (such as an exemplary 192 bits), and consequently a key derivation function 448 could reduce, process, or truncate the output of a key exchange algorithm 447. In exemplary embodiments, key derivation function 448 could also utilize a secure hash algorithm such as, but not limited to SHA-256, SHA3, or similar algorithms operating on the output of key exchange algorithm 447 in order to make a resulting symmetric encryption key 442*a* more secure. Further, key derivation function 448 could utilize multiple rounds of XOR logic or processing on the sequence of bits output from the key derivation function 447. Parameter 407 can specify values for the operation of key derivation function 448 such as the number of bits for keys, a hash algorithm to utilize, the number of rounds of XOR on a sequence of bits, and other values as well. As depicted in FIG. 4*b*, the output of a key derivation function 448 can be both a symmetric encryption key 442*a* and a MAC key 441*a*, where MAC key 441*a* can function to verify message integrity of ciphertexts generated with the symmetric encryption key 442*a*.

As depicted in FIG. 4*b*, an encryption 412*a* step could be utilized by SE 102 with the derived symmetric encryption key 442*a* in order to convert plaintext 443 into ciphertext 415. An encryption 412 step can utilize a symmetric ciphering algorithm 444*a*, where symmetric ciphering algorithm 44*a* could comprise an algorithm according to the Advanced Encryption Standard (AES), Blowfish, and Triple Data Encryption Standard (3DES), and other possibilities exist as well. Parameters 407 could specify the algorithm for a symmetric ciphering algorithm 444*a* as well as key length and a block cipher mode such as ECB, CBC, OFB, and CFB. Parameters 407 may also specify an authenticated encryption mode such as CCM (MST SP800-38C), GCM (NIST SP800-38D), and other examples exist as well. Symmetric encryption algorithm 444*a* can accept input of (i) plaintext 443, (ii) symmetric encryption key 442*a*, (iii) parameters 407, and (iv) initialization vector (IV) 445*a*, and output ciphertext 415. As depicted in FIG. 4*b*, and encryption 412*a* step can output a message authentication code (MAC) of 446*a*, where the MAC 446*a* was calculated with the MAC key 441*a*. MAC 446*a* allows the other party to verify message integrity of ciphertext 415 by calculating the same MAC 446*a* value using the MAC key 441*a*. IV 445*a* can comprise a random number to introduce randomness into the ciphertext 415, and IV 445*a* can be transmitted as a plaintext along with the ciphertext 415 in exemplary messages, such as message 413 that contains ciphertext1.SE 415 as depicted in FIG. 4*a* above.

Key derivation 411*b* step for configuration server 112 depicted in FIG. 4*b* can correspond to key derivation 411*a* step by SE 102. Key derivation 411*b* step can comprise the use of ephemeral secret key SKe.CS 402*b* and the secure element public key PK0.SE 102*n*. Other elements or algorithms within a key derivation 411*b* step can be equivalent to a key derivation 411*a* step above, including the use of shared parameters 407. In this manner, configuration server 112 and SE 102 can securely derive the same symmetric encryption key 442*a* as depicted in FIG. 4*b*. A decryption 412*b* step for configuration server 112 allows configuration server 112 to convert the ciphertext 415 received into plaintext 443. Decryption 412*b* step can utilize a symmetric decryption algorithm 444*b*, which could comprise the same algorithm used in symmetric encryption algorithm 444*a* except the algorithm being used for decryption instead of encryption. For example, if symmetric encryption algorithm 444*a* in FIG. 4*b* comprises an AES-192 encryption, and symmetric decryption algorithm 444*b* can comprise an AES-192 decryption. Note that the same values are input into symmetric decryption algorithm 444*b* as symmetric encryption algorithm 444*a*, such as symmetric encryption key 442*a*, parameters 407, and IV 445*a* in order to convert ciphertext 415 back into plaintext 443. Configuration server 112 can the read and process plaintext 443 after a decryption 412*b* step. Configuration server 112 can also verify MAC code 446*a* using MAC key 441*a* from a step 411*b* in order to verify the integrity of ciphertext 415.

FIG. 4*c*

FIG. 4*c* is a series of flow charts illustrating exemplary steps for nodes to mutually derive keys and then use the mutually derived keys to encrypt and decrypt data, in accordance with exemplary embodiments. Exemplary steps for nodes to mutually derive keys can comprise (i) a key exchange 421*a* step for configuration server 112 to derive a symmetric encryption key 442*b* and (ii) a key exchange 421*b* step for SE 102 to derive the same symmetric encryption key 442*b*. Exemplary steps for nodes to encrypt and decrypt data can comprise (i) an encryption 424*a* step for configuration server 112 to utilize the symmetric encryption key 442*b* to convert plaintext to ciphertext 427, and (ii) a decryption 424*b* step for SE 102 to utilize the symmetric encryption key 442*b* to convert the ciphertext 427 received from configuration server 112 into plaintext. The use of all steps for a key exchange 421*a*, a key exchange 421*b*, encryption 424*a*, and decryption 424*b* were also depicted and described in connection with FIG. 4*a* above. Further, although the steps are depicted specifically for the use of particular keys and plaintext/ciphertext combinations in FIG. 4*c*, the steps illustrated can be used with different keys and plaintext/ciphertext combinations. For example, FIG. 4*b* above depicts the same functionality use by the nodes as in FIG. 4*c*, but with (i) different PKI keys input to mutually derive a different symmetric encryption key, and (ii) different plaintext encrypted and different ciphertext decrypted.

As depicted in FIG. 4*c*, a key exchange 421*a* step can comprise configuration server 112 using ephemeral secret key SKe.CS 402*b*' and a new, updated SE 102 public key PK1.SE 410*a* with key exchange algorithm 447. SKe.CS 402*b*' could be derived in a step 402*b*' using parameters 407'. As described above in connection with FIG. 4*a*, the output of key exchange algorithm 447 can be input into key derivation function 448. The output of key derivation function 448 can be both a new, second symmetric encryption key 442*b* and a new, second MAC key 441*b*. Parameters 407 can be the same for a key exchange 421*a* and a key exchange 411*a* in exemplary embodiments, but the parameters 407 could also be different. For embodiments where parameters 407 are the same as a key exchange 411*a*, then SKe.CSS 402*b* could be used in step 421*a*. For embodiments with a different set of parameters 407', then a second SKe.CS 402*b*' could be used with step 421*a*. For example, parameters 407' in key exchange 421*a* could specify longer key length for key 442*b* compared to key 442*a* (such as an exemplary 256 bits instead of an exemplary 192 bits), and in this case a key derivation function 448 in key exchange 421*a* and key exchange 421*b* could output a longer symmetric encryption key 442*b* with an exemplary length of 256 bits. Other possibilities exist as well for parameters 407 to change between a key exchange 421*a* and a key exchange 411*a* without departing from the scope of the present invention. A key exchange 421*b* step can comprise SE 102 using the derived secret or private key SK1.SE 410*b* with the ephemeral public key from configuration server of PKe.CS 402*a*' in order to derive the same symmetric encryption key 442*b*, using the same parameters 407' as key exchange 421*a* step. The same MAC key 441*b* can be derived in both a key exchange 421*a* and a key exchange 421*b*.

As depicted in FIG. 4*c*, an encryption 424*a* step for configuration server 112 can utilize the new, second symmetric encryption key 442*b* for input into the symmetric encryption algorithm 444*a*. The plaintext may comprise data depicted with message 425 in FIG. 4*a*, and the resulting ciphertext can comprise ciphertext1.CS 427. The plaintext for an encryption step 424*a* can comprise a device configuration. MAC key 441*b* can be used to calculate MAC 446*b* in order to check and confirm validity and integrity of the transmission and proper receipt of ciphertext1.CS 427, such as the presence of any bit errors from the transmission for ciphertext1.CS 427 from configuration server 112 to SE 102. In exemplary embodiments, a new, second initialization vector 445*b* is created by configuration server 112 and utilized with ciphertext1.CS 427. A decryption 424*b* step for SE 102 can utilize the new, second symmetric encryption key 442*b* from step 421*b* for input into the symmetric decryption algorithm 444*b*. The ciphertext ciphertext1.CS 427 can be input by SE 102 into the symmetric decryption algorithm 444*b* along with the symmetric encryption key 442*b* in order to output and read the plaintext values. SE 102 can also verify the integrity of ciphertext1.CS 427 by computing a MAC value 446*b* using the MAC key 441*b* with the plaintext and a MAC algorithm to confirm the computed MAC value 446*b* matches the received MAC value 446*b*, where equal values for the computed and received MAC value 446*b* means that the integrity of received ciphertext1.CS 427 is confirmed.

FIG. 4*d*

FIG. 4*d* is an illustration of a certificate for a device public key, where the device derived the public key and a corresponding private key, in accordance with exemplary embodiments. Public and private keys in system 100 can utilize PKI techniques based on either RSA or ECC algorithms. A certificate cert1.SE 419 based on an ECC public key for SE 102, such as PK1.SE 410*a* is illustrated in FIG. 4*c*, although RSA keys could be utilized instead. One benefit of using ECC is that an equivalent level of security can be obtained for a much smaller key length. Also, energy may be conserved using ECC algorithms compared to RSA algorithms. Smaller key lengths save bandwidth, memory, processing resources, and power, which are all valuable for a device 101 to conserve a battery and usage of radio-frequency spectrum. For example, an ECC key length of 283 bits can provide security similar to an RSA key length of approximately 2048 bits. Public key PK1.SE 410*a* can comprise an ECC key in an X.509 certificate, as illustrated in FIG. 4*c*. The values to determine an elliptic curve defining equation could be stored in parameters 407 or 407', and the defining equation or curve name utilized with the key can be disclosed in the certificate. In addition, although the certificate is depicted as cert1.SE 419, the certificate can be used to authenticate device 101 since SE 102 and the identity 102*m* in cert1.SE 419 can be uniquely and permanently bound to device 101. In other exemplary embodiments, the device identity 101*b* can be used instead of or in conjunction with ID.SE 102*m* in a cert1.SE 419, and in those embodiments the device identity 101*b* could be directly inside a certificate cert1.SE 419.

Certificate 419 could include a signature 220, where signature 220 can be signed using ECC signature techniques, such as the Elliptic Curve Digital Signature Algorithm (ECDSA) for signature algorithm 227 with a secure hash such as SHA256 for a message digest 230. The creation of a signature 220 is depicted and described in connection with FIG. 2*b* above. In order to generate signature 220, the private key associated with certificate authority 115 may also be an ECC-based private key using similar parameters 407. Note that the parameters 407 for a parent public key/certificate do not have to be identical, and the parent key/certificate belonging to CA 115 could have a longer validity or different key lengths, as examples. Note that the public key PK1.SE 410*a* in a certificate 419 could be based on different algorithm or curve than the private key used for signature 220 in certificate 419. For example, that the public key 410*a* can be an ECC key, while the signature 220 in certificate 419 could be generated with RSA algorithm and key. Certificate 419 may also include parameters 407, where parameters 407 can specify an elliptic curve utilized with the public key PK1.SE 410*a*. Parameters 407 could also include the start and end times for the validity of either public key PK1.SE 410*a* or certificate 419. Other parameters 407 can be utilized in a certificate 419 as well, and parameters 407 may specify values that are not included or external to a certificate 419.

Certificate 419 illustrated in FIG. 4*c* illustrates exemplary embodiments of the present invention. Over the lifetime of a device 101, which could be a decade or longer, multiple device public keys such as PK1.SE 410*a* may be utilized. In other words, future public keys for device 101 could include a PK2.SE, PK0.SE, etc., and these keys could be signed by a certificate authority 115. The potential use of multiple different module public keys such as key 410*a* include (i) the expiration of a certificate 419 (including expiration of a public key associated with a certificate authority used in signature 220), (ii) a need to change an elliptic curve specified in a parameters 407, (iii) adding a new public/private key pair for connection with a different reporting system 120, (iv) increasing a key length utilized in a public/private key pair, (v) the transfer of ownership or control of device 101, where a new or different device owner 122 may require or prefer that keys with devices be rotated or renewed, and/or (vi) device 101 connecting to a new server that utilizes a different cryptographic algorithms (i.e. RSA-based instead of ECC-based). Other possibilities exist as well for reasons an SE 102 to derive a new public key PK1.SE 410*a*. Further, although only one public key PK1.SE 410*a* is depicted in FIG. 4*a* and FIG. 4*c*, a device 101 may utilize multiple public keys concurrently, and thus required multiple different certificates 419 for each of the different public keys. In exemplary embodiments (i) a first device public key PK1.SE 410*a* in a first certificate 419 can be utilized with a first reporting system 120, and (ii) a second device public key PK1.SE 410*a* (possibly derived using a different set of parameters 407 including using a different elliptic curve) with a second certificate 419 can be utilized with a second reporting system 120 and/or access network 126.

As illustrated in FIG. 4*c*, an identity associated with device 101 could be included in the "Common Name" (CN) field, which is depicted as ID.SE 102*m*. The identity associated with device 101 could be ID.device 101*b* and used instead of ID.SE 102*m* in a certificate 419. Either ID.device

101*b* or ID.SE 102*m* could be recorded with a "Serial Number" (SN) field in the certificate. Alternatively, ID.SE 102*m* or ID.device 101*b* could be recorded in the "Organizational Unit" (OU) field, and other locations for storing or recording identities within a certificate as illustrated in FIG. 4*c* exist as well. In addition, a specific identity or sequence count or sequence number for the public key of SE 102 and device 101 could be recorded in a certificate 419, so that PK0.SE 102*n* can be differentiated from PK1.SE 410*a*. Also, as noted previously herein, the use of a certificate 419 may optionally be omitted, such that device 101 and reporting system 120 or configuration system 114 share public keys without using certificates 419, or the certificates could take a form different than that depicted in FIG. 4*c*. A signature portion 220 of a certificate 419 can also include a value for "r" or similar value used with a non-deterministic use of a digital signature algorithm 227, where the value of "r" was described in FIG. 2*b* above. In other words, an "r" value in a signature 220 of a certificate 419 or other ECDSA certificates described herein can comprise (i) a random number used once in a non-deterministic mode, or (ii) a fixed, deterministic value based on a message digest 230 in FIG. 2*b* which could comprise a deterministic mode. Further, in exemplary embodiments, certificate 419 with a certificate authority signature 220 can comply with IETF RFC 5480 standard "Elliptic Curve Cryptography Subject Public Key Information".

FIG. 5

FIG. 5 is a simplified message flow diagram illustrating an exemplary system with exemplary data sent and received by a mobile handset and a device, in accordance with exemplary embodiments. Before initiating steps and message flows depicted in FIG. 5, mobile handset 108, device 101, and the other elements depicted for system 500 in FIG. 5 may previously complete exemplary message flows and steps depicted in FIG. 3 and FIG. 4*a* above. System 500 can include a configuration server 112, mobile handset 108, and device 101. An exemplary difference between system 300 depicted in FIG. 4*a* and system 500 depicted in FIG. 5 can be the use of a Wi-Fi access point 501 for mobile handset 108 and a Wi-Fi client 502 for device 101.

In a system 500, mobile handset 108 and configuration server 112 can continue secure session 321 from FIG. 4*a* above, which was also established in FIG. 3 above. If a first secure session 321 terminates, such as device 101 is in a location without connectivity to an access network 126 when NFC session 303 is established, then mobile handset 108 could move "back and forth" or between (i) a first location with device 101 and (ii) a second location with communication to access network 126 for communication with configuration server 112. In this embodiment, secure session 321 may (i) close as mobile handset 108 moves to the location with device 101 and (ii) reopen as mobile handset 108 moves to the location with communication to access network 126 for mobile handset 108.

As depicted in FIG. 5, mobile handset 108 can conduct a Wi-Fi access point activation step 437*b*. Configuration data for mobile handset 108 to utilize with Wi-Fi access point 501 could be included in data Wi-Fi-AP.MH 437*a* from configuration server 112. Values or data in Wi-Fi-AP.MH 437*a* could comprise frequencies or channels to utilize, a service set identifier (SSID) or network name, user identities and passwords, and/or public certificates for client 502 and access point 501, etc. In exemplary embodiments, Wi-Fi access point 501 does not broadcast the SSID such as in a broadcast frame, and the only client allowed can be device 101 using client 502. In addition, by using an obfuscated and non-broadcasted SSID (possibly a pseudo random string) that has only been shared outside mobile handset 108 with device 101 via ciphertext 441 with Wi-Fi-AP.MH 437*a*, then only device 101 could reasonably connect with Wi-Fi access point 501. Further, an access list of allowed users for Wi-Fi access point 501 can result in only device 101 being able to connect via Wi-Fi connection setup 503 in FIG. 5. Further, Wi-Fi connection setup 503 can utilize standard Wi-Fi security protocols such as, but not limited to, WPA2, WPA3, or subsequent standards. In exemplary embodiments, Wi-Fi connection setup 503 utilizes a preshared secret key (PSK), where the PSK is received by mobile handset 108 in message 438 in FIG. 4*a* above and sent to device 101 in message 440 in FIG. 4*a*. As depicted in FIG. 5, in exemplary embodiments, mobile handset 108 and device 101 can utilize network credentials of "user name, password 437*aa*" to secure connection setup 503.

In exemplary embodiments, Wi-Fi-AP.MH 437*a* can specify a low maximum output power for Wi-Fi access point 501, such as an exemplary 1 milliwatt or less. Wi-Fi-AP.MH 437*a* can also specify the Wi-Fi standard to utilize within the family of 802.11 standards from IEEE, such as version g, n, ac, etc. During use of a Wi-Fi access point 501 as depicted with system 500, device 101 may normally be in close physical proximity of mobile handset 108, such as less than an exemplary few meters, and consequently relatively lower transmit power for mobile handset 108 could be utilized, compared to the typical maximum power typical for standard Wi-Fi usage in 2018 of approximately 200 milliwatts. In addition, although a Wi-Fi access point 501 is depicted in FIG. 5, mobile handset 108 and device 101 could implement a Bluetooth network, where either device 101 or mobile handset 108 can function as the master. For this embodiment, parameters and credentials for a Bluetooth network for connection setup 503 could be passed in the data Wi-Fi-AP.MH 437*a*. Other short-range and LAN wireless network protocols besides Wi-Fi and Bluetooth could be utilized as well without departing from the scope of the present invention. A configuration database 112*a* could record if device 101 should utilize Wi-Fi, Bluetooth, or another wireless protocol for connection setup 503. As mentioned above, in exemplary embodiments where the size of software package 104*q* is deemed to be sufficiently small to be supported by NFC session 303, then a separate connection setup 503 could be omitted and the NFC session 303 could be utilized instead for a system 500 in FIG. 5.

For device 101 in system 500, device 101 could use a step 503*a* in order to activate a Wi-Fi client 502. Parameters and credentials for Wi-Fi client 502 could be received in a message 440 above with Wi-Fi-AP.MH 437*a*. For a step 503, SE 102 which received data in Wi-Fi-AP.MH 437*a* could send (i) data to device 101 CPU 102*c* and radio 101*z* via (ii) data bus 101*d* as depicted in FIG. 5 in order to activate Wi-Fi client 502. In exemplary embodiments, the radio 101*z* for Wi-Fi client 502 in device 101 resides outside of SE 102 as depicted in FIG. 1*b*. However, other embodiments and configurations for SE 102 and radio 101*z* are possible and also depicted and described below in connection with FIGS. 6*a* and 6*b*. Consequently, other configurations of internal elements such as SE 102 and Wi-Fi client 502 are possible without departing from the scope of the present invention. A step 503 could include the use of a firewall for SE 102 and/or device 101, such that SE 102 would not normally respond to packets, queries, data, or probes via connection 503 unless the data successfully includes a properly decrypted ciphertext3.CS 506 below.

At step 504 in FIG. 5, configuration server 112 can prepare software package 104*q* for transfer to device 101 via mobile handset 108. An exemplary software package 104*q* is depicted in FIG. 5, and was also described above in FIG. 4*a*. Software package 104*q* could also be referred to as a second device configuration, where a first device configuration could be the plaintext in a step 424*a* above. Configuration server 112 could use a configuration database 112*a*, an identities list 320, data from device owner 122 and device manufacturer 101*x*, and data from reporting system 120 in order to assemble software package 104*q*. Configuration server 112 or configuration system 114 could include an updated secure element firmware 102*u*' in software package 104*q*. Software package 104*q* can comprise a compressed format such as using gzip or other compression techniques. Configuration server 112 can also create a full file list 507 for software package 104*q* in a step 504. The file list 507 can also include a signature 220 from configuration server 112 using a secret key SK.CS, such that SE 102 can use a signature verification step 221 with the PK.CS from cert.CS 112*c*. In this manner, SE 102 can verify that software package is from previously authenticated configuration server 112.

In preferred exemplary embodiments, configuration server 112 also conducts a signature verification 221 step on individual software components for software package 104*q* that configuration server 112 receives from other nodes in a system 100. For example, before (a) configuration server 112 signs software package 104*q* for device 101, which could include files for an updated device OS 101*e* where the files for the updated device 101*e* were received by a device manufacturer 101*x*, (b) configuration server 112 could conduct a signature verification 221 step for a signature by device manufacturer 101*x* on the files for updated device OS 101*e*. In other words, in exemplary embodiments, configuration server 112 verifies signatures on files received for software package 104*q* before configuration server 112 conducts a signature creation step 220 for the software package 104*q*. In this manner, elements for software package 104 may be sourced from multiple different parties in a system 100, and configuration server 112 could verify authenticity for each element and provide an overall signature or "stamp of approval" of software package 104*q* for device 101. In this manner, device 101 may not need to check the signatures on individual elements within software package 104*q*, which could be difficult if device 101 or SE 102 does not have all the intermediate and root certificates for each of the individual element signatures in a software package 104*q*.

Configuration server 112 can then conduct an encryption step 424*g* to create ciphertext3.CS 506. The encryption step 424*g* can be equivalent to encryption step 424*a* depicted and described in connection with FIG. 4*c*, where the plaintext to be encrypted can comprise both file list 507 and software package 104*q* (where software package 104*q* may be previously compressed). Note that second symmetric encryption key 442*b* can continue to be used with encryption step 424*g*. In exemplary embodiments, a different, updated value for initialization vector 445*b* is used with an encryption step 424*g*. Configuration server 112 can then use connection 321 to send a message 505 to mobile handset 108, where message 505 includes an ID.transaction4 and ciphertext3.CS 506, where ciphertext3.CS was created in step 424*g*.

Mobile handset 108 can receive message 505 via connection 321 and forward message 505 to device 101 via connection 503. In exemplary embodiments where device 101 is out of range from an access network 126 utilized by mobile handset 108, mobile handset 108 can receive message 505 and store or cache the data contained such as ciphertext3.CS 506. Mobile handset 108 could then temporarily close connection 321 and move to device 101 and re-establish connection 503, and then subsequently send ciphertext3.CS 506 to device 101. In this manner, secure connection 321 and connection 503 as depicted in FIG. 5 do not need to be operating concurrently in exemplary embodiments. The present invention allows device 101 to securely conduct a configuration step 103 even when device 101 is outside the range of an access network 126 (e.g. device 101 is in a physical location where mobile handset 108 cannot reach an access network 126 to connect with configuration server 112 when mobile handset 108 has a connection 503 or 303 established).

Device 101 can receive message 505 over connection 503. Device 101 using SE 102 can conduct a decryption step 424*h* for ciphertext3.CS 506, where decryption 424*h* can be equivalent to decryption 424*b* depicted and described in connection with FIG. 4*c* above. The symmetric encryption key 442*b* in a decryption step 424*h* for SE 102 can be the same symmetric encryption key 442*b* for a decryption step 424*f* in FIG. 4*a* above. Note that in exemplary embodiments, the same symmetric encryption key 442*b* can be used by SE 102 to (i) decrypt ciphertext2.CS 441 received through NFC session 303 and (ii) decrypt ciphertext3.CS 506 received a different radio link than ciphertext2.CS 441. SE 102 can use decryption 424*h* to read the plaintext values of file list 507 and software package 104*q*.

SE 102 can then conduct a step 507, where step 507 can include both (i) SE 102 decompressing software package 104*q* using an exemplary library such as gzip, and (ii) SE 102 conducting a signature verification 221 step over software package 104*q*, where software package 104*q* was previously signed by configuration server 112 in a step 504 above. In this manner, SE 102 and device 101 can be reasonably assured that files and components in software package 104*q* are genuine or authenticated/approved by configuration server 112. SE 102 can (A) report an error or (B) refuse to process software package 104*q* or elements within software package 104*q* if (C) a signature verification step 221 fails. Step 507 can also comprise SE 102 verifying that software package 104*q* contains all the data and files listed in a file list 507

At step 508 in FIG. 5, SE 102 and device 101 can record the data within software package 104*q* in either SE storage memory 102*d* or device storage memory 101*f*. In exemplary embodiments, files for device OS 101*e* can be recorded in device storage memory 101*f* and files for SE firmware can be recorded in SE storage memory 102*d*, and other possibilities exist as well. A step 508 can also comprise SE 102 and device 101 backing up or storing the running configuration for each before loading data in a software package 104*q*, and in this manner the system can be restored if applying the updated files for software package 104*q* fails. After internally storing or loading the files for software package 104*q*, device 101 and SE 102 can perform a reboot, so that both restart with the new files from software package 104*q*. Upon a reboot in a step 508, connection 503 may temporarily terminate with the reboot, but device 101 can re-establish connection 503 using the radio 101*z* and Wi-Fi client 502. A step 508 can then also comprise device 101 and/or SE 102 creating a report 508*a*, where report 508*a* includes a status code with success or errors for each file in file list 507 for software package 104*q*. In other words, report 508*a* can record the success or errors of applying each of the files in software package 104*q*, which may be useful for configuration server 112 or other authorized elements in system 100 to know the state of device 101.

SE 102 can then conduct an encryption step 424*i*, which could correspond to encryption step 424*a* depicted in FIG. 4*c*. Encryption step 424*i* could comprise using report 508*a* as plaintext and the symmetric encryption key 442*b* in order to create ciphertext3.SE 510. The symmetric encryption key 442*b* in an encryption step 424*i* for SE 102 can be the same symmetric encryption key 442*b* for a decryption step 424*f* in FIG. 4*a* above. MAC codes 446*b* and initialization vectors 445*b* can also be processed with encryption step 424*i* and also all steps 424 where encryption or decryption takes place. SE 102 can then send mobile handset 108 a message 509 over connection 503, where message 509 includes the transaction identity ID.transaction4 and the ciphertext3.SE 510. As depicted in FIG. 5, mobile handset 108 can then forward the data received in a message 509 over connection 321 to the configuration server 112. Configuration server 112 can then conduct a decryption step 424*j* in order to convert ciphertext3.SE 510 into plaintext, and thereby read the report 508*a* as plaintext. Decryption 424*j* can be equivalent to decryption 424*b* depicted and described in connection with FIG. 4*c* above. The symmetric encryption key 442*b* in a decryption step 424*j* for configuration server 112 can be the same symmetric encryption key 442*b* for an encryption step 424*g* above in FIG. 5.

Upon reading the plaintext report 508*a*, configuration server 112 can conduct a step 511 as depicted in FIG. 5. Configuration server 112 could record in a configuration server database 112*b* each of the files in a file list 507 for software package 104*q* that were successfully installed. For embodiments where some non-fatal errors or warnings were recorded in report 508*a*, then codes or logs of errors in a report 508*a* could also be recorded in a configuration server database 112*b*. A step 511 can also comprise configuration server 112 sending messages to other elements in system 100 in FIG. 1*a* regarding the status of device 101, such as sending (i) device owner 122 a notice of successful load of device reporting application 101*v* from software package 104*q*, (ii) reporting system 120 a notice that device 101 should begin reporting, and (iii) access network 126 that device 101 will begin connecting with network access credentials 126*a*, and other possibilities exist as well for configuration server 112 to use or process data received in a report 508*a* from device 101 and SE 102. If error codes are for the installation of software are received in a report 508*a*, such as some software in package 104*a* not being successfully installed, then configuration server 112 could use a step 511 with a configuration database 112*a* or 112*b* to determine next steps, such as potentially re-sending message 505 or resending a portion of the software package 104*q* with error codes or conditions identified in a report 508*a*.

After processing step 511, configuration server 112 could perform a step 512, which can comprise a series of steps to close communications for mobile handset 108 and SE 102. Configuration server 112 could generate a command 512*a* for mobile handset 108, where command 512*a* instructs mobile handset 108 to close connection 321. Configuration server 112 could generate a command 512*b* for device 101, where command 512*b* instructs device 101 to close connection 503 and also being reporting through reporting system 120 using access network 126 in FIG. 1*a*. Configuration server 112 could generate a configuration user report 512*c*, where report 512*c* could be for the configuration user 108*a* operating mobile handset 108. Report 512*c* could provide a human readable status for display on mobile handset 108 regarding the status of device 101 and a configuration step

103. Report 512c can also provide manual instructions for any modifications of transducers 105 or manual changes for configuration user 108a to perform for device 101, monitored unit 106, or connected equipment in order to complete the configuration step 103. In an exemplary embodiment, a report 512c could request that configuration user 108a attach an external antenna to device 101 in order to improve RF signal strength with access network 126. In another exemplary embodiment, report 512c could instruct configuration user 108a to perform a manual power cycle of device 101 or monitored unit 106. Other possibilities exist as well regarding instructions for a configuration user 108a in a report 512c to complete a configuration step 103 without departing from the scope of the present invention.

After completing a step 512, configuration server 112 can send mobile handset 108 a message 513 through connection 321, where message 512 can include (i) command 512a for mobile handset 108 to close connection 321, (ii) command 512b for device 101 to close connection 503 and begin reporting through reporting system 120 using access network 126 and credentials 126a, and (iii) configuration user report 512c for configuration user 108a. Mobile handset 108 can receive message 512 and forward the portions of the message 513 for (ii) command 512b to SE 102 in device 101. Mobile handset 108 can then conduct a step 514a to close connection 321 with configuration server 112. Mobile handset 108 can then conduct a step 515, where the configuration user report 512c is displayed to configuration user 108a, and a step 515 can also comprise configuration user 108a entering information in a display for mobile handset 108 confirming any manual changes for device 101 or monitored unit 106. In some embodiments, a step 515 can take place before a step 514a, such that mobile handset 108 can send information back to configuration server 112 and a configuration database 112a regarding any manual changes performed as requested in the configuration user report 512c.

At step 516, mobile handset 108 can then restore the previous Wi-Fi access point credentials for Wi-Fi access point 501 recorded in a step 435 above in FIG. 4a. In other words, the original Wi-Fi access point credentials used by mobile handset 108 before a configuration step 103 and connection 503 would preferably be restored, to reduce interruption of services for configuration user 108a. For example, configuration user 108a could have a laptop or tablet that periodically connects with mobile handset 108 using a Wi-Fi access point 502 and credentials that were recorded in step 435. If those credentials from step 435 were not restored for mobile handset 108 in a step 516, then credentials in Wi-Fi-AP.MH 437a would continue to be used and the exemplary laptop or tablet would not normally be able to connect with mobile handset 108.

SE 102 and device 101 can receive the portions of message 513 as depicted in FIG. 5, where a portion could comprise command 512b for device 101 to close connection 503. SE 102 and device 101 could then perform a step 514b and close connection 503. In exemplary embodiments, device 101 then loads network access credentials 126a for connecting with access network 126. Device 101 could then select an access network 126 for conducting a connection setup 518. Device 101 could select the access network based upon network access credentials 126a or from a networks available list 322 received in an identity list 320 from a message 425. Other possibilities exist as well for device 101 to select an access network for a connection setup 518 without departing from the scope of the present invention.

Device 101 then conducts a connection setup 518 with access network 126. For a connection setup 518, device 101 can use either (i) the network access credentials 126a or (ii) the private key SK1.SE 410b with cert1.SE 419. For example, with 5G networks that support EAP-TLS, then with connection setup 518, device 101 can (i) authenticate with an access network 126 using SK1.SE 410b and cert1.SE 419 and also (ii) mutually derive a symmetric ciphering key with access network 126 using SK1.SE 410b and cert1.SE 419. In some exemplary embodiments, network access credentials 126a could comprise a profile for an embedded universal integrated circuit card (eUICC). In addition, network access credentials 126a could comprise a pointer, URL, or another identifier of an eUICC profile for device 101 to load. The transfer of network access credentials 126a from a message 426 in FIG. 4a above could comprise a transfer of the pointer, URL, or another identifier for the eUICC profile.

In addition, although FIG. 5 depicts a step 514b of closing connection 503 before connecting with access network 126, device 101 could connect with access network 126 before closing connection 503. In this manner of device connecting with access network 126 before closing connection 503, device 101 can report error conditions or problems for connecting to access network 126 to mobile handset 108 and configuration user 108a. At step 517, device 101 can load the network access credentials 126a in order to connect with access network 126. Note in exemplary embodiments, the access network 126 used by device 101 can be different than the access network 126 used by mobile handset 108, although the two access networks 126 could be the same in other embodiments.

After loading network access credentials 126a in a step 517, device 101 can connect with access network 126 in a step 518. Although an SE 102 is depicted as conducting the connection 518, device 101 may perform the connection 518 such as using a radio 101z for device 101 as depicted in FIG. 1b. Connection 518 could be through either a wireless LAN such as Wi-Fi, where network access credentials 126a can comprise data equivalent or similar to data in Wi-Fi-AP.MH 437a, or connection 518 would be through a wireless WAN such as any of a 3G, 4G, or 5G wireless network, including a low power wide area network over non-licensed spectrum such as in the 900 MHz ISM band. As depicted in FIG. 5, connection 518 can connect device 101 securely with access network 126 using network access credentials 126a.

At step 519, device 101 can process data in order to connect with reporting server 116, where reporting server 116 can be a server or set of servers in a reporting system 120. Data processed in a step 519 can include collecting data from transducers 105 using device reporting application 101v via a transducer bus 101i, which can include startup or initialization data for transducers 105. In exemplary embodiments, a step 519 also includes a calibration of transducers 105 with assistance of configuration user 108a and mobile handset 108. Mobile handset 108 could display to configuration user 108a instructions or steps related to calibration, such as providing a known reference signal to a transducer 105. An example of providing a known reference signal for transducer 105 could be putting a temperature probe 105ba such as a thermocouple or thermistor in an ice water bath, and other examples exist as well. In other exemplary embodiments, a calibration of transducers in a step 519 can be omitted. SE 102 in device 101 for a step 519 could also verify a certificate for reporting server 116, reading a DNS name for reporting server 116, a TCP or UDP port number to connect with at reporting server 116, and other steps or data for device 101 or SE 102 could be in the config.reporting-system 120a received in a message 425 depicted in FIG.

4*a*. A certificate for reporting system 120 or reporting server 116 could be included in config.reporting system 120*a*. In exemplary embodiments, config.reporting-system 120*a* contains a list of cryptographic parameters to utilize when communicating with reporting system 120 and reporting server 116 (such as a subset or superset of parameters 407).

Device 101 can then conduct a series of steps in order to establish a secure communications link with reporting server 116. FIG. 5 depicts an overview of the connection between device 101 and both access network 126 and reporting server 116, and consequently only a subset of the steps and message flows between those elements are depicted in FIG. 5. In exemplary embodiments, the connection between device 101 and reporting server 116 comprises a "datagram TLS" (DTLS) connection as specified in IETF RFC 6347, although other protocols could be used as well. In exemplary embodiments, device 101 sends reporting server 116 the certificate cert1.SE 419 in a message 520, where cert1.SE 419 was received by device 101 and SE 102 above in a message 425 depicted and described in connection with FIG. 4*a*. In other words, device 101 can begin communicating with reporting server 116 and reporting system 120 using a certificate based on a PKI key pair that was derived by device 101 and SE 102 during a configuration step 103. Cert1.SE 419 can include PK1.SE 410*a*, and SE 102 can use SK1. 410*b* in with internal, secure, private operations for data in cert1.SE 419. The previously installed certificate cert0.SE and private key SK0.SE 102*y* can be deprecated or replaced with the new credentials. In this manner, security for device 101 can be increased, since SK0.SE 102*y* could physically be in the hands or control of other parties besides device owner 122 before installation or operation with monitored unit 106. Further, preferred security practices may require that secret keys and certificates get rotated over time, especially when validity dates for certificates expire, and thus sending anew certificate cert1.SE 419 to reporting server 116 may be periodically required. An exemplary certificate cert1.SE 419 is depicted in FIG. 4*c*. Further, in other exemplary embodiments, message 520 comprises device 101 sending an identity of device 101 such as ID.device 101*b* to reporting server 116, and reporting server 116 then uses ID.device 101*b* to fetch the certificate cert1.SE 419 from configuration system 114 or device owner 122.

Reporting server 116 can receive the certificate cert1.SE 419 and then use a step 521*a* to verify the certificate, including using a signature verification step 221 depicted in FIG. 2*b*. Step 521*a* could also comprise reporting server 116 and reporting system 120 verifying that device 101 is authorized to use reporting system 120, after device 101 with device identity 101*b* has be authenticated. Since message 520*a* could comprise an initial receipt of data from device 101 using ID.device 101*b*, step 521*a* could also comprise reporting system fetching or querying configuration system 114 using ID.device 101*b* for configuration data pertaining to device 101. The device configuration data for reporting server 116 received in a step 521*a* could be stored in the configuration database 112*a* or 112*b*, and can include identity list 320, networks available list 322, software package 104*q*, files list 507, authentication parameters 111*d*, and parameters 407. With data from a step 521*a*, reporting server 116 can select subsequent steps or procedures in order to communicate with device 101 and SE 102 inside device 101.

Step 521*b* for reporting server 116 can comprise reporting server 116 generating an ephemeral public key PKe.RS 522 and an associated ephemeral secret key SKe.RS. For a step 521*b*, reporting server 116 could use a similar set of steps described in step 402 above for configuration server 112 to derive a PKI key pair, including the use of a random number generator, a random number, a key pair generation function, and a set of parameters 407. Further, although FIG. 5 depicts reporting server generating and sending an ephemeral key PKe.RS 522, in exemplary embodiments, SE 102 can (i) generate the ephemeral key pair using similar steps as described above for reporting server 116 or configuration server 112 in a step 402, and (ii) send the signed ephemeral public key to reporting server 116. Step 524*a* for reporting server 116 can comprise reporting server 116 using a key exchange 421*a* step as depicted in FIG. 4*c*, except reporting server 116 would utilize PKe.RS 522 as the ephemeral key input into key exchange algorithm 447, along with PK1.SE 410*a*. The output of step 524*a* would be a new symmetric encryption key 442*b* for use by reporting server 116 with device 101 and SE 102. Note that a key exchange step 524*a* could continue to use PK1.SE 410*a*, which could be received in cert1.SE 419. For the alternative embodiment where the ephemeral public key is derived by SE 102, then a key exchange 524*a* step for reporting server 116 can comprise reporting server 116 inputting an ephemeral key PKe.SE and a secret key SK.RS into key exchange algorithm 447.

Step 220*i* for reporting server 116 can comprise reporting server 116 using a signature creation 220*i* step in order to create signature1.RS 523. The secret key used to create signature1.RS 522 can correspond to the public key in a certificate for reporting server 116. The message to sign for signature1.RS 522 can comprise the ephemeral public key PKe.RS 522, which could be derived in a step 521*b* above. Reporting server 116 can then send PKe.RS 522 and signature1.RS 523 to SE 102 as depicted in FIG. 5. SE 102 can receive the data, and conduct a signature verification step 221*i* in order to verify signature1.RS 523, using a public key for reporting server 116 in a certificate for reporting server 116. A certificate for reporting server 116 could be received with Config.Reporting System 120*a* in message 425. At step 524*b*, SE 102 can conduct a key exchange 524*b* step which corresponds to the key exchange 524*a* step conducted by reporting server 116. Step 524*b* for SE 102 can comprise SE 102 using a key exchange 421*b* step as depicted in FIG. 4*c*, except SE 102 would utilize PKe.RS 522 as the ephemeral key input into key exchange algorithm 447. The output of step 524*b* would be a new symmetric encryption key 442*b* for use by SE 102 and device 101 with reporting system 116.

Device 101 can then conduct at step 525, which can comprise device 101 collecting or sending transducer data 125 for transducers 105. A step 525 could also comprise device 101 running through a set of configuration test vectors 104*x* and generating a report 525*a*. Configuration test vectors 104*x* could comprise device 101 testing dynamic range of transducers 105, having configuration user 108*a* provide test data for transducers 105, or also having transducers 105 collect initial, "production" data regarding monitored unit 106. Report 525*a* can comprise a set of data generated by device 101 using transducers 105 with monitored unit 106, including via a configuration test vector 104*x*. In other exemplary embodiments, a configuration test vector 104*x* could be omitted and transducers 105 and device 101 could simply begin operation with monitored unit and data could be recorded in a report 525*a*.

Device 101 using SE 102 can then conduct an encryption step 424*k* as depicted in FIG. 5, and SE 102 can conduct an encryption step 424*k* to create ciphertext4.SE 527. The encryption step 424*k* can be equivalent to encryption step 424*a* depicted and described in connection with FIG. 4*c*, where the plaintext to be encrypted can comprise transducer data 125 and/or report 525a. Note that symmetric encryption key 442b computed in step 524b can be used with encryption step 424k, which can also be equal to the symmetric encryption key 442b computed in step 424m below for reporting server 112. Device 101 can then send reporting server 116 a message 526, where message 526 can include ciphertext4.SE 527, where the plaintext for ciphertext4.SE 527 can comprise transducer data 125 and report 525a.

As depicted in FIG. 5, reporting server 116 can receive message 526 and conduct a decryption step 424m. Decryption step 424m can utilize the symmetric encryption key 442b derived in a step 524a above, and decryption step 424m can be equivalent to decryption step 424b depicted in FIG. 4c. After decryption step 424m reporting server 116 can read the plaintext values of transducer data 125 and report 525a. At step 528, reporting server 116 can record plaintext data from message 526 in a reporting database 118 or also send data to device owner 122. If expected values for transducer data 125 are received and report 525a meets acceptance criteria, then at step 528 (i) reporting server 116 and reporting system 120 can record that configuration step 103 has been successfully completed, and (ii) reporting system 120 could inform device owner 122 and/or configuration system 114 in FIG. 1a that a configuration step 103 of device 101 has been successfully completed. In exemplary embodiments, upon successful completion of a configuration step 103 of SE 102 then SE 102 can be depicted as a secure processing environment 104 or SE 104 as shown in FIG. 1a. If error conditions are noted for transducer data 125 or report 525a, then configuration user 108a, device owner 122, and configuration system 114 could be notified by reporting server 116. Upon conclusion of step 528 in FIG. 5, both (i) device 101 with SE 104 and (ii) reporting server 116 can proceed with regular operation of device 101 with monitored unit 106 since the configuration step 103 has been completed.

Mobile handset 108 can conduct a step 529, where step 529 can comprise the configuration application 108b sending a query 530 to reporting server 116 in order to confirm successful completing of configuration step 103. As described in the paragraph above, reporting server 116 could determine that configuration step 103 is complete based on the successful receipt of transducer data 125 and report 525a. Receipt of a repot 525a can confirm any of: (i) network access credentials 126a for access network 126 function, (ii) device 101 has wireless or wired connectivity properly established, (iii) transducers 105 are connected to device 101 and functioning, (iv) that transducers 105 are collecting transducer data 125 for monitored unit 106, (v) a secure processing environment (SE) 102 within device 101 has been configured with updated keys such as PK1.SE 410a and SK1.SE 410b, (vi) software package 104q has been downloaded and applied for device 101 and SE 102, (vii) a complete set for an identity list 320 has been received, including physical location of device 101 such as geographical coordinates 325, (viii) an updated certificate cert1.SE has been processed and received by reporting system 116, (ix) reporting system 116 can communicate with device 101 in a secure manner, (x) device 101 can utilize a "backup" or second access network 126 with a second set of network access credentials 126a if the first access network 126 becomes unavailable, and (xi) a configuration step 103 for device 101 properly functions, such that a configuration step 103 could be conducted a second time in the future if required, and/or (xii) device 101 records root and intermediate certificates in order to verify a certificate for reporting server 116, configuration server 112, and authentication server 111.

As depicted in FIG. 5, reporting server 116 can reply to query 530 with a message 531 of "device OK", if configuration step 103 has been confirmed by reporting system 116 as completed, such as through any of (i) through (xii) in the paragraph above. Not all of (i) through (xii) are required for some embodiments. In exemplary embodiments, upon successful receipt of a message 531 with a status of "device OK" for device 101 or an equivalent message 531, then mobile handset 108 can display to configuration user 108a that a configuration step 103 for device 101 has been completed and device 101 can be left in operation, potentially without additional steps or manual changes to be performed by configuration user 108a. For embodiments where message 531 provides a status of "device not OK", then mobile handset 108 could display to configuration user 108a an error status and configuration user 108a could work with device 101 and configuration system 114 in order to diagnose and rectify the error code in order to receive a subsequent message 531 "device OK".

FIG. 6a

FIG. 6a is a graphical illustration of components for a device, in accordance with exemplary embodiments. Device 101 as depicted in the above FIG. 1a through FIG. 5 may comprise several different physical and logical embodiments in the present invention, and FIG. 6a depicts a different physical configuration for device 101 than that depicted in FIG. 1b. Device 101 as depicted in FIG. 6a herein and FIG. 6b below can still utilize the components and sub-steps for a configuration step 103 as contemplated herein. As depicted in FIG. 6a, a device 101 could include a central processing unit (CPU) 101c, a radio 101z, a transducer bus TR bus 101i, an NFC radio 102c, and a nonvolatile memory storage 101f. The elements for device 101 in FIG. 6a can provide equivalent functionality for the elements depicted in FIG. 1b above.

As depicted in FIG. 6a, a secure processing environment (SE) 102 can be included within CPU 101c in exemplary embodiments. In other words, a separate, dedicated processor for SE 102 is not required in order to obtain the benefits from a configuration step 103 in the present invention, and the functionality of SE 102 could be provided by CPU 101c. In exemplary embodiments, the functionality of SE 102 could either be (i) physically separate hardware within CPU 101c, such as a dedicated processing core or memory registers and transistors that are dedicated to the functionality of SE 102, or (ii) logically separate functions within CPU 101c, such as dedicated "time slices" during the operation of CPU 101c. For a logically separate function of SE 102 within CPU 101c, CPU 101c can switch from a first mode to a second mode, where operation in the first mode can comprise function as a CPU 101c for device 101, and the second mode can comprise a secure processing environment 102. For example, a memory register within SE 102 in FIG. 6a could (X) record secret key SK0.SE 102y or SK1.SE 410b in order to process cryptographic algorithms 141 such as encryption step 412a or 424b when (Y) CPU 101c in FIG. 6a operates in the second mode described in the sentence above. At a later time, CPU 101c could switch to the first mode where CPU 101c does not operate as SE 102 and in that case the memory register recording a secret key could be "invisible" or "not available" to CPU 101c. Other possibilities exist as well for a CPU 101c and an SE 102 to be combined without departing from the scope of the present invention.

A radio 101*z* for device 101 could operate in any mode supporting 2G, 3G, 4G, 5G, or subsequent wireless standards in order to connect with an access network 126. Radio 101*z* could also support other wireless standards such as the 802.11 "Wi-Fi" standards, or low power wide area networking such as Sigfox, LoRa, or NB-IoT. A device 101 could also use multiple radios 101*z* in order to connect with different wireless networks. A second radio in device 101 in FIG. 6*a* can comprise NFC 102*c*, which could utilize standards supporting "near field communications". The radio NFC 102*c* can include components similar to radio 101*z*, but supporting operating at a frequency near 13 MHz and also at low power. Either radio 101*z* or radio NFC 102*c* can include standard radio components such as RF filters, RF amplifiers, a clock, and phased loop logic (PLL), and may be connected with an antenna. As described above, although radio 102*c* is depicted as "NFC 102*c*", in other exemplary embodiments, radio 102*c* can operate using wireless standards other than "near field communications". In exemplary embodiments radio 102*c* could operate as a Bluetooth radio (e.g. IEEE 802.15.1 or subsequent), or a Wi-Fi radio supporting standards within the family of standards IEEE 802.11. In addition, although FIG. 1*b* depicted radio 102*c* as operating within SE 102, a device 101 can also support a radio 102*c* operating outside SE 102 and connected to CPU 101*c* via bus 101*g*.

FIG. 6*b*

FIG. 6*b* is a graphical illustration of components for a device, in accordance with exemplary embodiments. Device 101 as depicted in the above FIG. 1*a* through FIG. 6*a* may comprise several different physical and logical embodiments in the present invention. FIG. 6*b* depicts a different physical configuration for device 101 than that depicted in FIGS. 1*b* and 6*a*, while device 101 can still utilize the components and sub-steps for a configuration step 103 as described herein. As depicted in FIG. 6*b*, a device 101 could include a "system on a chip" (SOC) 601, a transducer 105, and a Radio RF 602*b*. SOC 601 could comprise a package soldered onto a circuit board within device 101 which integrates the various components depicted for SOC 601. Radio RF 602*b* can comprise a radio front end for a radio 101*z*, where radio RF 602*b* is coupled to radio baseband 602*a*, where radio baseband 602*a* comprises a baseband processor for a radio RF 602*b*. In exemplary embodiments, radio RF 602*b* and radio baseband 602*a* can operate in conjunction to provide the functionality of a radio 101*z* as depicted and described in connection with FIG. 1*b*. The transducer 105 in a device 101 could comprise a transducer 105 as depicted and described in connection with FIG. 1*b* above, including any of transducer 105 that comprises a bi-directional transducer 105*a*, transducer input 105*b*, or transducer output 105*c*.

A system on a chip (SOC) 601 in FIG. 6*b* could include a processor CPU 101*c*, a secure processing environment 102, a transducer interface 102*h*, nonvolatile memory storage 101*f*, random access memory 101*d*, and radio baseband 602*a*, where the components for SOC 601 can be linked via bus 601*a*. Bus 601*a* could comprise a data bus similar to bus 101*g* or bus 102*i* as depicted and described in connection with FIG. 1*b* above, and bus 601*a* can have bandwidth and signal connections necessary to support the internal operation of the different components within SOC 601. The processor CPU 101*c*, SE 102, transducer interface 102*h*, and random access memory 101*d* can operate and provide the functionality as depicted and described in connection with FIG. 1*b* above for the same elements shown. Although CPU 101*c* and SE 102 are depicted as separate elements in FIG. 6*b*, in exemplary embodiments CPU 101*c* and SE 102 within a SOC 601 could be combined into a single processing environment, such as the combined CPU 101*c* and SE 102 as depicted and described in connection with FIG. 6*a*. Either (X) CPU 101*c* and SE 102 could operate with separate physical transistors, logic gates, and memory registers in exemplary embodiments, or (Y) SE 102 and CPU 101*c* could share physical resources within SOC 601 and operate in a logically separate manner. In other exemplary embodiments for a device 101 in FIG. 6*a* and also other figures herein, a separate SE 102 could be optionally omitted, and the functionality of SE 102 could be provided by a CPU 101*c*. As one example, instead of a set of cryptographic algorithms 141 within SE 102 as depicted in FIG. 1*b* being loaded into an EEPROM 102*j*, the set of cryptographic algorithms 141 could be performed by CPU 101*c* and stored in a nonvolatile memory 101*f* for device 101. Other possibilities exist as well for the configuration of a CPU 101*c* and SE 102 without departing from the scope of the present invention.

In exemplary embodiments such as that depicted in FIG. 6*b*, the function of an NFC radio 102*c* could operate within separate elements within a device 101. The operation of a radio 102*c* could be divided into a RF baseband 102*ca* processor and an RF front end 102*cb*. RF baseband 102*ca* can provide baseband processing functionality for radio 102*c*, and RF front end 102*cb* can provide RF front end functionality such as RF filters and RF amplifiers. RF front end 102*cb* can be connected to an antenna, which could also be located inside the physical housing of device 101, or an antenna can be external to device 101 and electrically connected to radio RF 602*b*. The divided NFC radio 102*c* could also support other relatively short-range wireless communication protocols appropriate for a device 101 communicating with a mobile handset 108. Other protocols besides NFC could comprise Bluetooth, Bluetooth Low Energy (BLE), ZigBee, Z-Wave, 6LoWPAN, Thread, Wi-Fi, Wi-Fi-ah (HaLow), LoRA, and ANT (from ANT Wireless). Other possibilities exist as well for a short range wireless communications protocol supported by radio 102*c* (or RF baseband 102*ca* and RF front end 102*cb*) without departing from the scope of the present invention.

CONCLUSION

Various exemplary embodiments have been described above. Those skilled in the art will understand, however, that changes and modifications may be made to those examples without departing from the scope of the claims.

The invention claimed is:

1. A wireless device comprising a housing which comprises within the housing:
   (a) at least one radio;
   (b) at least one transducer;
   (c) at least one processor;
   (d) a first computer-readable storage medium storing (i) an authentication token associated with the wireless device and (ii) a list of root certificates; and
   (e) a second computer-readable storage medium operatively connected to the at least one processor and having stored thereon instructions that, when executed by the at least one processor, cause the wireless device to perform a method for the wireless device to securely receive, from a mobile handset, configuration data over a first wireless connection between the wireless device and the mobile handset, the method comprising:
   storing a first device private key, wherein the first device private key corresponds to a first device public key;

storing a second device private key for a digital signature algorithm, the authentication token, and a first set of cryptographic parameters, wherein the second device private key corresponds to a second device public key;

establishing the first wireless connection with the mobile handset, wherein the first wireless connection is encrypted;

receiving, via the first wireless connection and from the mobile handset, (i) a first server public key for a first server (ii) a second set of cryptographic parameters, and (iii) a random number;

authenticating (i) a signature received from the mobile handset using at least the authentication token, and (ii) the wireless device using at least the received random number and the second device private key;

deriving a first symmetric ciphering key using at least (i) the first device private key and the first server public key, (ii) an elliptic curve Diffie-Hellman (ECDH) key exchange algorithm, and (iii) the first set of cryptographic parameters;

deriving a third device private key and a third device public key using the second set of cryptographic parameters;

generating a device digital signature over at least the third device public key using the second device private key;

encrypting at least the derived third device public key and the list of root certificates for the wireless device into a first ciphertext using the derived first symmetric ciphering key;

sending, via the first wireless connection and to the mobile handset, the first ciphertext and the device digital signature;

receiving, via the first wireless connection and from the mobile handset, a second ciphertext comprising (i) a device certificate for the derived third device public key and (ii) a certificate authority (CA) certificate for a second server comprising a new root certificate, wherein the wireless device decrypts the second ciphertext using at least the first symmetric ciphering key; and establishing a second wireless connection to the second server, wherein the wireless device authenticates the second server using the new root certificate, and wherein the wireless device uses the received device certificate and the derived third device private key in order to authenticate over the second wireless connection.

2. The wireless device of claim 1, wherein the wireless device does not transmit the authentication token through the first wireless connection.

3. The wireless device of claim 1, wherein a secure element in the wireless device stores the device certificate and the CA new root certificate in the nonvolatile memory.

4. The wireless device of claim 3, wherein the secure element sends and receives through the wireless device using an external bus controller for the secure element, wherein the wireless device and the secure element are connected via a data bus, and wherein the wireless device communicates with the mobile handset and the second server through a radio.

5. The wireless device of claim 3, wherein the secure element includes a hardware random number generator, and wherein the hardware random number generator uses at least a transducer measurement in order to generate a device random number, and wherein the secure element uses the device random number to derive the third private key.

6. The wireless device of claim 1, further comprising in step 5), deriving the first symmetric ciphering key using a key derivation function, wherein the first symmetric ciphering key comprises data for encrypting the first ciphertext and decrypting the second ciphertext.

7. The wireless device of claim 1, further comprising: 12) receiving, via the second wireless connection, a second server public key for a third set of cryptographic parameters; 13) deriving a second symmetric ciphering key using (i) the derived third device private key the second server public key, (ii) the ECDH key exchange algorithm, and (iii) the third set of cryptographic parameters; and 14) receiving a third ciphertext of a device configuration, wherein the second ciphertext is decrypted by the wireless device using the derived second symmetric ciphering key.

8. The wireless device of claim 7, wherein the device configuration includes a set of network parameters, and wherein the wireless device authenticates with a wireless access network using the set of network parameters.

9. The wireless device of claim 7, wherein the device configuration includes at least one file for the wireless device, wherein the at least one file is used by the wireless device with at least one of a device operating system, a device reporting application, a secure element firmware, a secure element operating system, a transducer library, and a configuration test vector.

10. The wireless device of claim 7, wherein the device configuration includes at least one file for a secure element, wherein the at least one file is used by the secure element with at least one of a secure element firmware, a secure element operating system, a transducer library, and a configuration test vector.

11. The wireless device of claim 1, wherein the first set of cryptographic parameters specifies at least a first elliptic curve defining equation, and wherein the second set of cryptographic parameters specifies at least a second elliptic curve defining equation.

12. The wireless device of claim 1, wherein the authentication token comprises a random number for a QR code.

13. The wireless device of claim 1, wherein the wireless device receives via the first wireless connection, (i) the first server public key for the first server (ii) the second set of cryptographic parameters, and (iii) the random number with a server digital signature, and wherein the wireless device authenticates the server digital signature using at least the authentication token.

14. The wireless device of claim 1, wherein the wireless device authenticates the wireless device (i) using the received random number and the second device private key, and (ii) by sending the second device public key with an authenticating digital signature.

15. The wireless device of claim 1, wherein the first wireless connection uses one of "Near Field Communications" (NFC), Bluetooth, and Wi-Fi technology.

16. The wireless device of claim 1, wherein the wireless device derives the first device private key after establishing the first wireless connection, and wherein the wireless device stores the first device private key after deriving the first device private key.

17. The wireless device of claim 1, wherein the second set of cryptographic parameters specifies values for algorithms associated with a key encapsulation mechanism, and wherein the algorithms comprise one of lattice-based cryptography and code-based cryptography.

18. The wireless device of claim 1, wherein the third device public key supports at least one of lattice-based cryptography, code-based cryptography, and elliptic curve cryptography.

19. The wireless device of claim 1, wherein the wireless device derives the third public key before the wireless device authenticates the second server.

20. The wireless device of claim 1, wherein the first computer-readable storage medium and the second computer-readable storage medium are different.

* * * * *